US009268849B2

(12) United States Patent
Siedlecki et al.

(10) Patent No.: US 9,268,849 B2
(45) Date of Patent: Feb. 23, 2016

(54) APPARATUS AND METHODS FOR WEB MARKETING TOOLS FOR DIGITAL ARCHIVES—WEB PORTAL ADVERTISING ARTS

(76) Inventors: Alexander Siedlecki, Seggiano (IT); Marco Depaoli, Seggiano (IT)

( * ) Notice: Subject to any disclaimer, the term of this patent is extended or adjusted under 35 U.S.C. 154(b) by 611 days.

(21) Appl. No.: 12/205,864

(22) Filed: Sep. 6, 2008

(65) Prior Publication Data

US 2009/0106234 A1    Apr. 23, 2009

Related U.S. Application Data

(60) Provisional application No. 60/970,767, filed on Sep. 7, 2007.

(51) Int. Cl.
*G06F 17/30*    (2006.01)

(52) U.S. Cl.
CPC ...... *G06F 17/30864* (2013.01); *G06F 17/3089* (2013.01); *G06F 17/30294* (2013.01); *G06F 17/30321* (2013.01); *G06F 17/30731* (2013.01); *G06F 17/30911* (2013.01)

(58) Field of Classification Search
CPC .............. G06F 17/30722; G06F 17/30707; G06F 17/30914; G06F 17/30734; G06F 17/3089; G06F 17/30867; G06F 17/30958; G06F 17/30705; G06F 17/30923; G06F 17/30292
USPC ................. 707/600, 705–780, 791–812; 705/1.1–500
See application file for complete search history.

(56) References Cited

U.S. PATENT DOCUMENTS

| | | | |
|---|---|---|---|
| 7,246,104 B2* | 7/2007 | Stickler | G06F 17/30867 |
| 7,349,913 B2* | 3/2008 | Clark et al. | |
| 7,526,504 B2* | 4/2009 | Sedky | G06F 3/1203 |
| 7,640,220 B2* | 12/2009 | Acharya | 706/45 |
| 7,716,174 B2* | 5/2010 | Lee et al. | 707/600 |
| 7,849,049 B2* | 12/2010 | Langseth et al. | 707/602 |
| 7,908,281 B2* | 3/2011 | Marceau et al. | 707/751 |
| 2003/0018650 A1* | 1/2003 | Priestley | 707/102 |
| 2003/0177481 A1* | 9/2003 | Amaru et al. | 717/148 |
| 2005/0203931 A1* | 9/2005 | Pingree | G06F 17/30997 |
| 2005/0234889 A1* | 10/2005 | Fox et al. | 707/3 |
| 2005/0251533 A1* | 11/2005 | Harken et al. | 707/104.1 |
| 2006/0041661 A1* | 2/2006 | Erikson | G06F 17/30887 709/225 |
| 2006/0053098 A1* | 3/2006 | Gardner et al. | 707/3 |
| 2006/0212475 A1* | 9/2006 | Cheng | 707/104.1 |
| 2007/0198564 A1* | 8/2007 | Blackstone | G06F 17/30557 |
| 2007/0214048 A1* | 9/2007 | Chan et al. | 705/14 |
| 2008/0097843 A1* | 4/2008 | Menon et al. | 705/14 |
| 2008/0168420 A1* | 7/2008 | Sabbouh | G06F 17/30893 717/104 |
| 2008/0201338 A1* | 8/2008 | Castro et al. | 707/100 |
| 2008/0215542 A1* | 9/2008 | Lim et al. | 707/3 |
| 2008/0304808 A1* | 12/2008 | Newell et al. | 386/52 |
| 2008/0313229 A1* | 12/2008 | Taswell | G06Q 20/208 |

* cited by examiner

*Primary Examiner* — Michelle Owyang
(74) *Attorney, Agent, or Firm* — Muncy, Geissler, Olds & Lowe, PC; Laurence E. Stein

(57) ABSTRACT

This invention relates to the creation of a software application to: facilitate the creation, representation and publication of digital objects; in particular, methods and apparatus that improve digital resource retrieval on the part of end users and to provide a new system for the web based marketing of digital assets and the online distribution of metadata enriched advertising.

12 Claims, 9 Drawing Sheets

Figure 1:
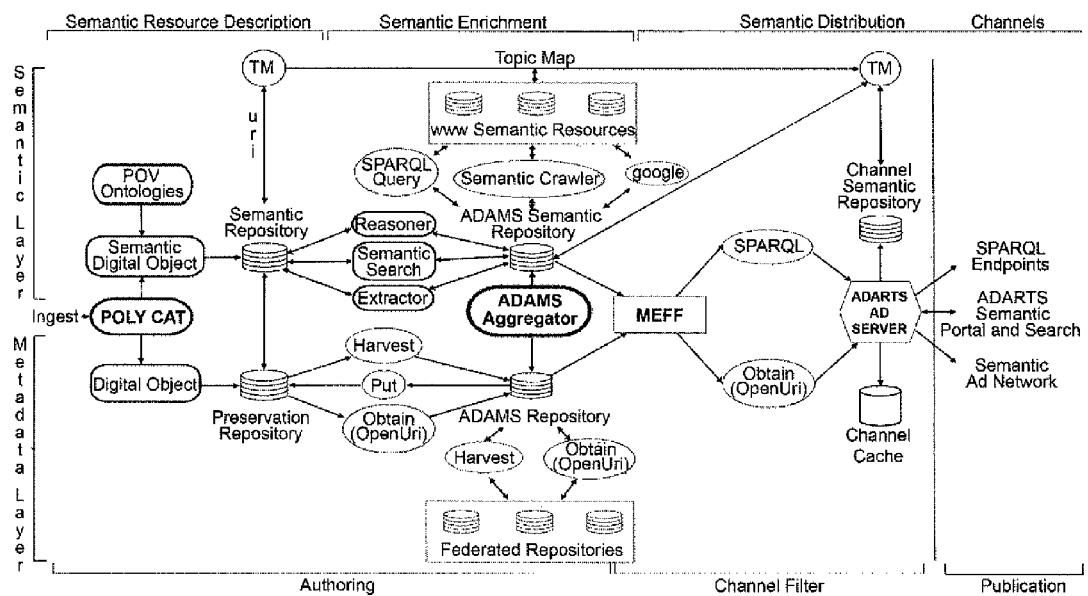

APPARATUS AND METHODS FOR WEB MARKETING TOOLS FOR DIGITAL ARCHIVES—WEB PORTAL ADVERTISING ARTS

CROSS-REFERENCES TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

PRIORITY TO PROVISIONAL APPLICATION

This Utility Application claims priority from Provisional Patent Application 60/970,767 filed on Sep. 7, 2007 and incorporates said application in its totality herein by reference.

Portions of the disclosure of this patent document contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. BACKGROUND

The accurate description of a digital object is vital to its preservation, discovery, management and distribution. Even though a schema, such as, for instance the Dublin Core®, may be used to provide a generally accepted standard for an "accurate description" of an object, the description is (intentionally) limited by the schema itself. Therefore, to adhere to this standard does not provide the possibility of either a very broad or very granular detailed description (metadata) of the object.

Cataloging schema also has inherited limitations. For example, information collected within a schema is limited by the subjective perspective of the cataloger or to the domain in which the cataloger is a recognized expert. Although a domain expert may be a recognized with regard to a particular object or object type, he may not have an extensive knowledge of, for example, a historic perspective of the class to which the object type belongs. Additionally, the cataloging process itself may be strictly limited in scope, perhaps due to limited resources; thus the policy adopted to catalog the objects may also be limiting by design.

Digital object representation is becoming increasingly significant in the distribution of product information. That is to say, the effective dissemination of information related to products (for instance through search engines) has become one of the primary means of its "distribution", with the World Wide Web representing one of the primary channels of distribution of this information and a market of exchange for the information and commerce. This represents what can be called the "semantic market place". So, as objects are now in part distributed through the effectiveness of their digital representations, the construction of these representations is becoming increasingly significant. With the advent of semantic technologies, which permit the extraction of this information and "reasoning" related to the information extracted, the construction of detailed semantic representations of digital objects (semantic digital objects or SDO) represents a significant challenge for ensuring an efficient distribution of the digital objects, for instance utilizing an improved organic search engine indexing for retrieval of the objects by the next generation of semantic and meta—semantic search engines.

The inventive system, FIG. 1, described herein, addresses these issues with an application for a complete value chain for the creation of information enriched Digital Objects referred to here as "Semantic Digital Objects" or SDO. The application implements a multi schematic and multi layered approach to metadata management ontologies, thesauri and controlled vocabularies to create polyhierarchical semantic representations. This multi layered approach refers to a multi-level (multi-level) Digital Object (DO) submission process, creating three "semantic" versions for each object. Also, described herein are two marketing methods referred to as semantic marketing methods, Semantic or Metasemantic Advertising and Quantistic Marketing, which utilizes the polyhierarchical Semantic Digital Objects (SDO) produced by the platform to provide and locate associated detailed product descriptions, such as information relating to a product's brand, company, cultural context, historical context, historic context, among others, or a combination thereof, and enhancing their representation to improve the likelihood of a potential consumer finding the product he wants to purchase or research. This list is not exclusive.

Figure 2:
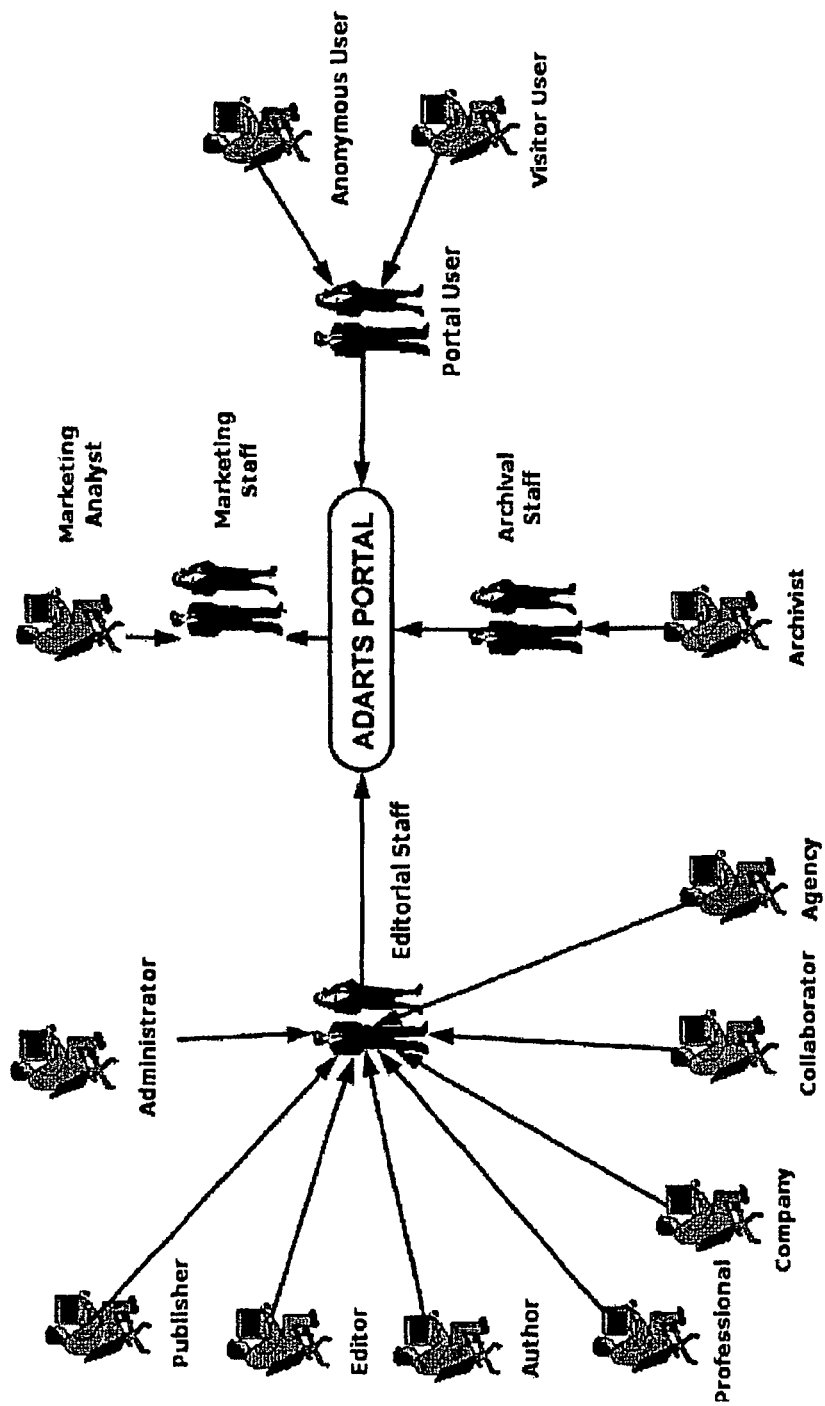
Figure 3:
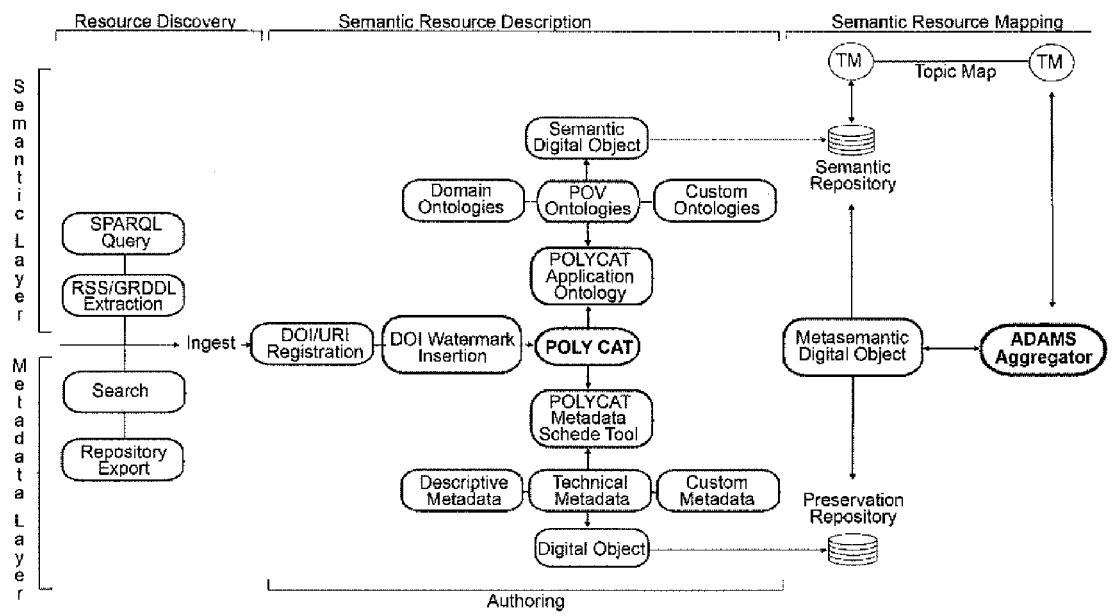
Figure 4:
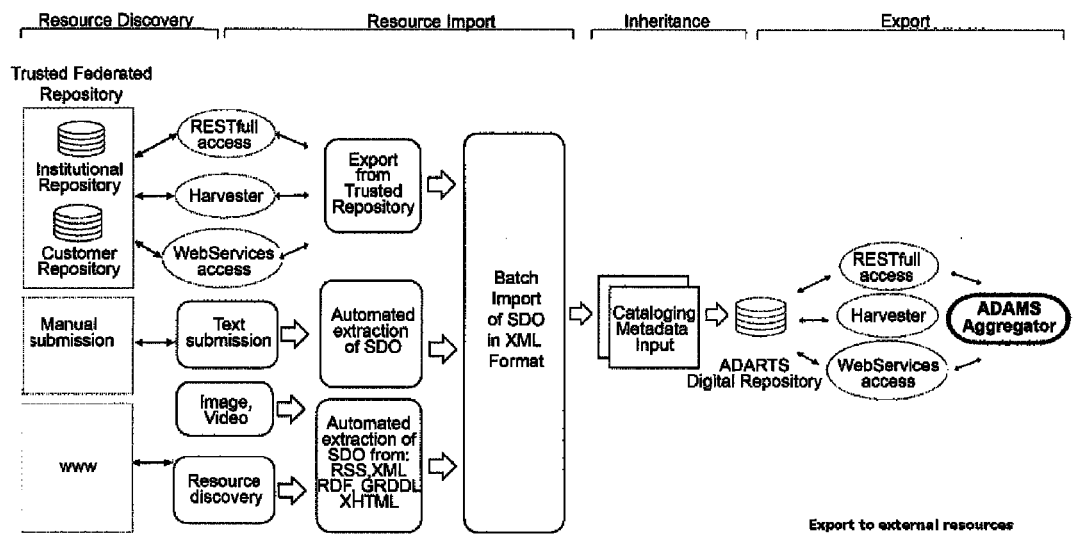
Figure 5:
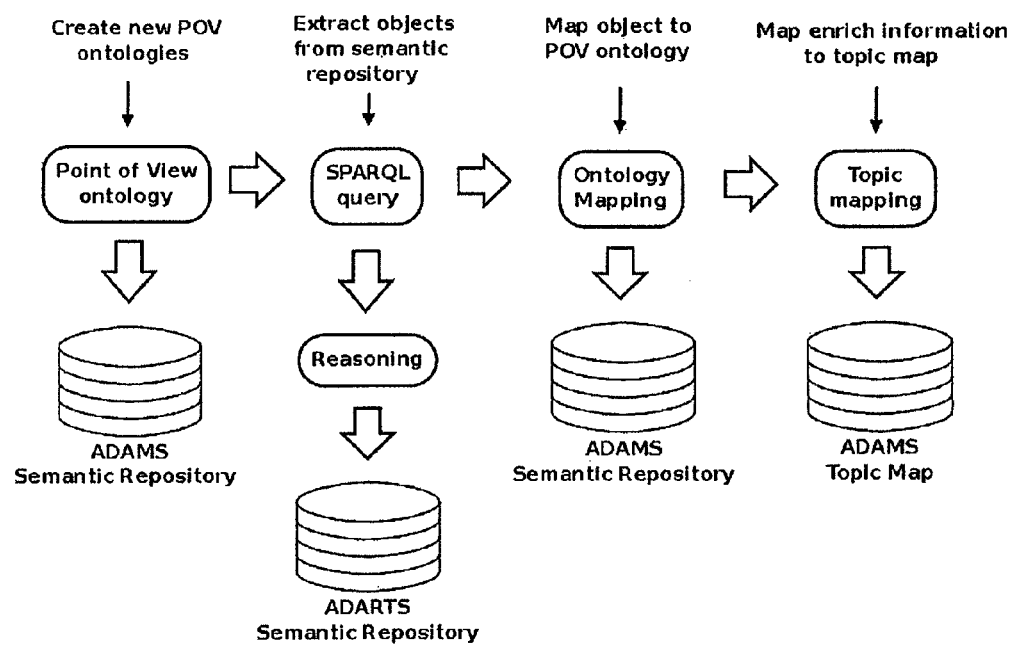
Figure 6:
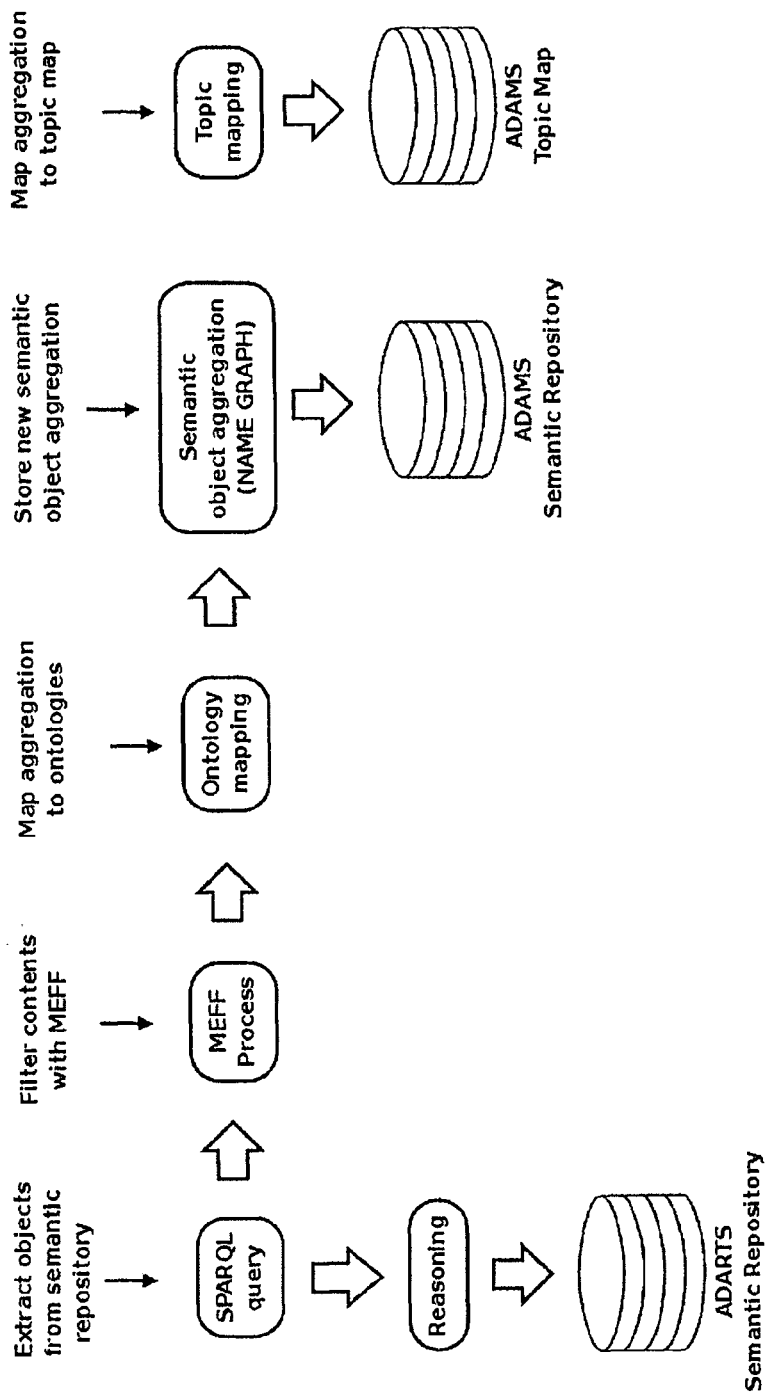
Figure 7:
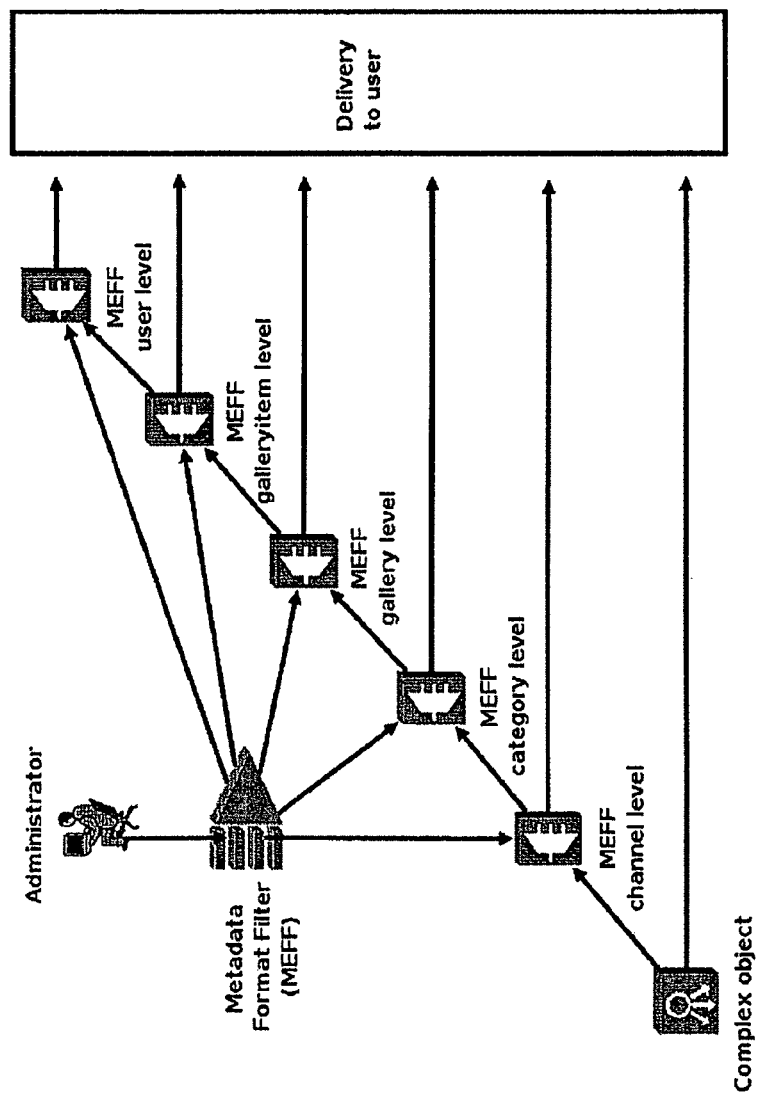
Figure 8:
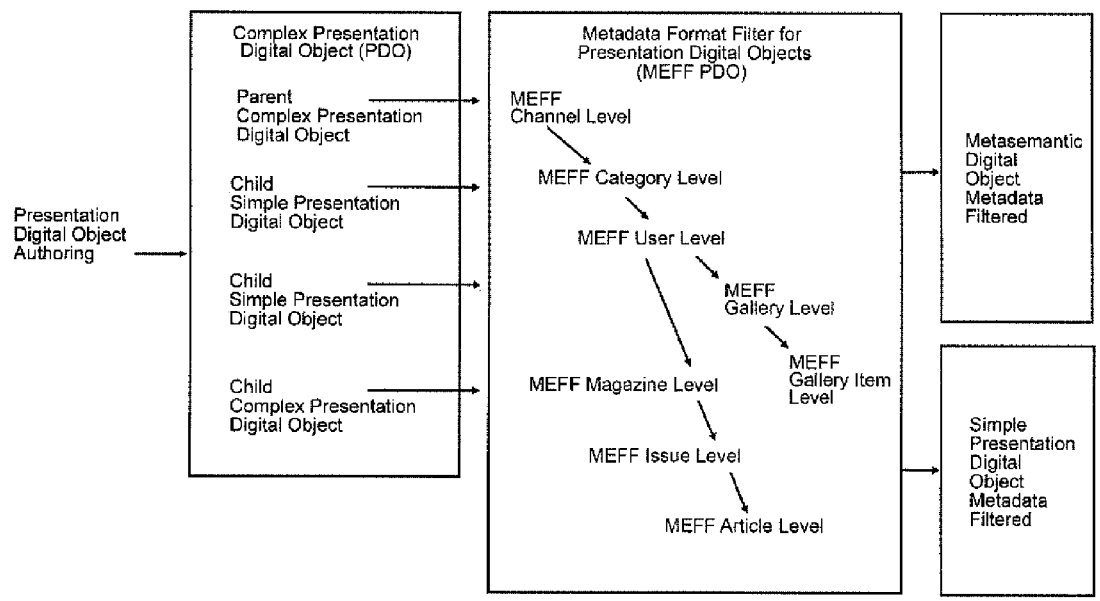
Figure 9:
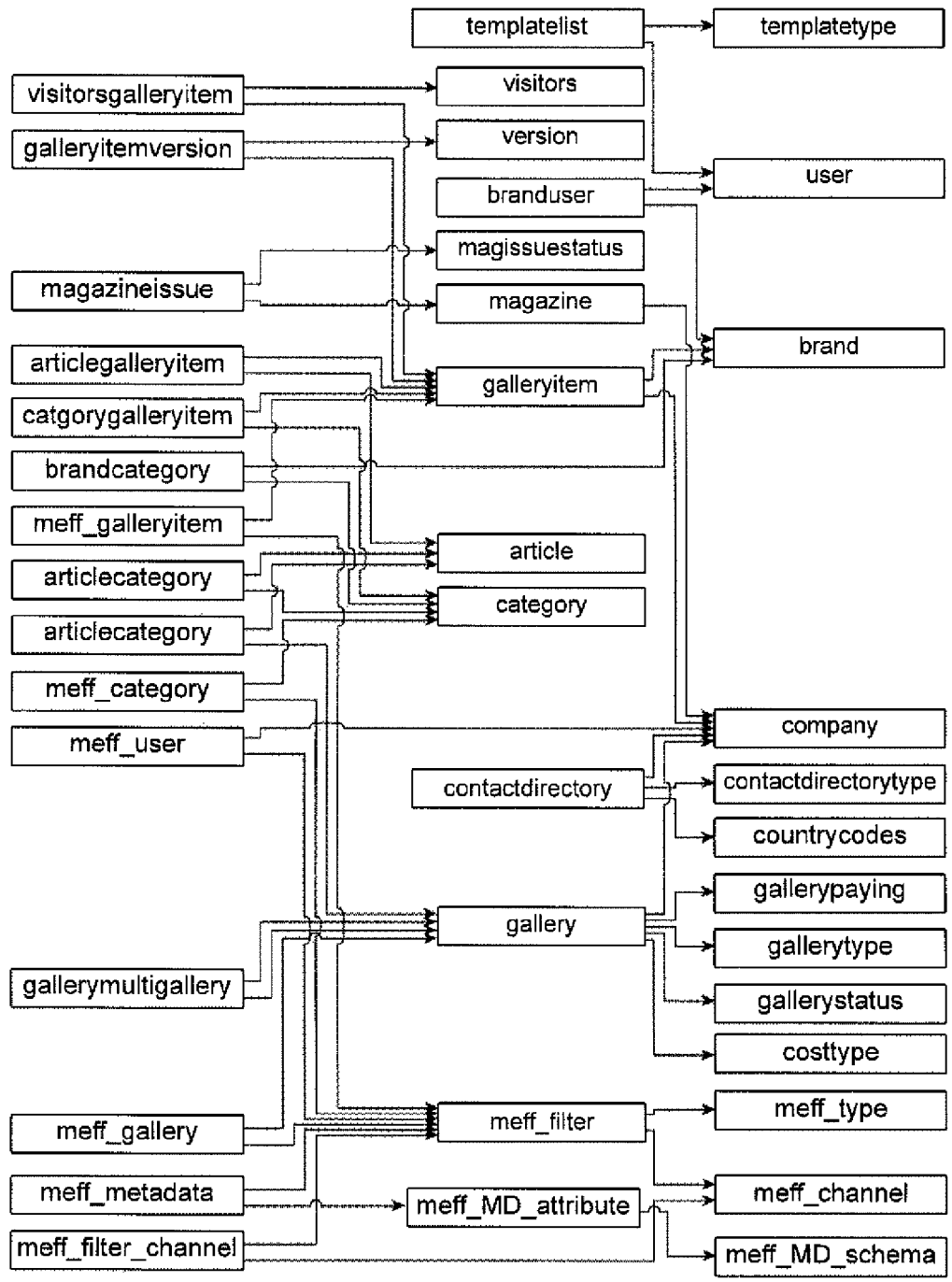

1. Background
2. Brief Summary of the Invention
3. Brief Description of the Several Views of the Drawings
    3.1.1. FIG. 1. Inventive System
    3.1.2. FIG. 2. User Types
    3.1.3. FIG. 3. POLYCAT Authoring
    3.1.4. FIG. 4. POLYCATAuthoring-Cataloging SDO into the ADARTS Repository
    3.1.5. FIG. 5. ADAMS Authoring-Points of View (POV)
    3.1.6. FIG. 6. ADAMS Authoring-Aggregation
    3.1.7. FIG. 7. Metadata Format Filter Process (MEFF)
    3.1.8. FIG. 8. Publication: MEFF interaction with Publication Digital Object (PDO)
    3.1.9. FIG. 9. ERD diagram of the inventive application
4. Detailed Description of the Invention
5. POLYCAT—A polyhierarchical cataloging tool: Creating multilayered and polyhierarchical representations of digital objects
    5.1. Overview
    5.2. Multilayered Versioning
        5.2.1. The Digital Object is submitted to a digital repository (FEDORA) for preservation. This version permits us to distribute the digital object by "exposing" this representation of the document to external harvesters of other federated repositories—such as those owned by universities, museums and digital libraries. We also, "expose" this object to our own "federator" and aggregator of DOs (and CDO) which is part of ADAMS.
        ADAMS also has its own harvester to retrieve relevant DOs from our repository and other digital repositories
        5.2.2. The topics (or subjects) used to create each Point of View (POV) in the cataloging process are utilized to create a Topic Map of the archive.
        Each object cataloged represents an instance which is registered in the Topic Map of the inventive system.

This creates a Topic Map of the object instances deposited in the repository 5.2.2. A third "semantic" representation of this DO is also created, with an instance (an RDF graph) of this representation archived in the RDF triple store or also referred to as the Semantic Repository of the inventive system and utilizes "authorities" such as ontologies (foundation or upper level, middle or enterprise, and domain ontologies) thesauri, and controlled vocabularies. This "ontological" cataloging can also be represented as a map or mapping of RDF triples and visualized, representing a second mapping of the archive contents 5.3 Interoperability
5.4 Introduction to Components and Modules
5.5 Metadata Schema Management Module
5.6 POV Management Module
  5.6.1 *POV definition
  5.6.2 *POV ontology
  5.6.3 *POV construction
  5.6.4 *POV instance
  5.6.5 *POV Type Collection: the Phylogenic POV
  5.6.6 *POV Alignment, Mediation and Mapping
5.7 Digital Object Management Module
5.9 General Functionality
5.10 POV Structure
  5.10.1 POV Instance
  5.10.2 POV Collection metadata
5.11 For POV Type Collection
5.12 For POV Type Instance
5.13 Process and History-Ontogenic and Phylogenic
  5.13.1 End user annotation: folksonomies
5.14 Cataloger modules
5.15 Technology Utilized
5.16 CATALOGER: System requirements
  5.16.1 Cataloger Administration
  5.16.2 Policy Management
  5.16.3 Community Management and Collection Management
  5.2.3. Schema Management
  5.2.4. POV Management: Auditing and Statistics on Objects and Users
5.3 Digital Object Management
  5.3.1 Submission Work Flow
  5.3.2 Handle and DOI
  5.3.3 History and Versioning
  5.3.4 Repository Search
  5.3.5 Digital Object Mapping
  5.3.6 Digital Object Mapping in the Repository
5.4 Technology Utilized
5.5 Application Functionality
  5.5.1 LDAP Authentication
  5.5.2 User and Authorization Management
  5.5.3 Schema Management.
  5.5.5 Community and Collections Management.
  5.5.6 Digital Object Submission
  5.5.7 Creating Object Container Types
  5.5.8 Multiple Attachment File
  5.5.9 Context Schema
  5.5.10 Multi language
  5.5.11 Administrative Metadata
  5.5.12 Technical Metadata
  5.5.12 Rights Metadata
  5.5.13 Preservation Metadata
  5.5.14 Annotations
  5.5.15 Bibliographic Citations
  5.5.16 Product Description Metadata
  5.5.17 E-commerce Metadata
  5.5.18 Assigning User Permission
  5.5.19 Digital Object Mapping with Topic Maps
  5.5.20 Submission Work Flow
  5.5.21 URI
  5.5.22 Mapping Repository DOs
  5.5.23 History and Versioning of DO
  5.5.24 Repository Search
  5.5.25 Statistics on Objects and Users
6. Introduction: ADAMS: A Digital Asset Management System
  6.1a. Data aggregation using SPARQL (SPARQL Protocol and RDF Query Language)
  6.1b. ADAMS (A Digital Asset Management System)
    6.1.1. The Authoring Component:
    6.1.2 The aggregation process
    6.1.3 Digital Object Aggregation ADARTS
    6.1.4 Federated Search Module
    6.1.5 Harvest Module
    6.1.6 Trusted Federated Semantic Repository
    6.1.7 Content authoring of Complex Digital Objects (CDO)
    6.1.8 Working with ADAMS: Complex Digital Object Creator: CDOC
    6.1.9 The semantic aggregation process
    6.1.10 Semantic Digital Object Creator: SDOC
    6.1.11 Collecting objects from external source
  6.2 Aggregating Digital Objects into the ADAMS Semantic Repository
    6.2.1 Complex Digital Object (CDO) Ingestion into the Semantic Repository
  6.3. Mapping Digital Objects (DOs) into the ADAMS Topic Map
  6.4. The Ad Repository and search
7 Metadata Editor and Disseminator (MEFF)
  7.1 The Metadata Editor and Publication: Metadata Format Filter
  7.2 Metadata Editor and Publication: Format Filter
  7.3 MEFF Implementation: The ADARTS PMS (portal management system)
  7.4 A Note On Object Oriented Programming
    7.4.1 Inheritance
    7.4.2 Overloading
  7.5 Levels
    7.5.1 MEFF
  7.6 Summary View
    7.6.1 Detailed View
  7.7 Channel Level MEFF
    7.7.1 Category Level MEFF
    7.7.2 User Level MEFF
    7.7.3 Gallery Level MEFF
    7.7.4 Gallery-item Level MEFF
    7.7.5 Magazine Level MEFF
    7.7.6 Issue Level MEFF
    7.7.7 Article Level MEFF
    7.7.8 Presentation Digital Object Creation
  7.8 Metasemantic Digital Object Creation
  7.9 Metadata Centric Content Management System
  7.10 ADARTS Magazine: an example of MSDO
8 PUBLISHER
  8.1 Filter Object Information
  8.2 Import Digital Object Into Portal Cache
  8.3 Digital Object Publication Component MSDO
  8.4 PDO—Presentation Digital Object
    8.4.1 Template Creator: PDO Creator
    8.4.2 Template Management Module
    8.4.3 MSDO Management 8.4.4 MSDO Creator
8.4.5 Metasemantic Digital Object Creation
8.5 Metadata Centric Content Management System
    8.5.1 ADARTS Magazine: an example of MSDO
9 SEMANTIC MARKETING
  9.1 Introduction: Context, and Usefulness of the Invention
  9.2 Smart Ad Construction Process
  9.3 The Semantic Marketing Methods
    9.3.1 Metasemantic and Semantic Search Engine Retrieval
    9.3.2 The Quantistic Marketing Method (QMM)
  9.4 The Smart Ad Construction Process
    9.4.1 An analog print based resource is digitized (scanned), cataloged and submitted to the preservation repository (FEDORA). This version can be "exposed" to external harvesters of other federated repositories for distribution. The object is also harvested by the ADAMS component for aggregation process of object enrichment and preparation for publication.
    9.4.2 The topics (subjects) used to create each POV utilized during the cataloging process for this instance is registered in the topic map of the system. This creates a Topic Map of the object instances deposited in the repository
    9.4.3 A third "semantic" representation of this object is also created, with an instance (an RDF graph) of this representation archived in the RDF triple store or also referred to as the Semantic Repository of the system. This RDF graph is also visualized—this represents a second mapping of the archive contents
10 Smart Ad
  10.1 Semantic marketing methods
  10.2 Smart Ad cataloging method
  10.3 Smart Ad enrichment
  10.4 Smart Ad search and distribution
  10.5 Market Research
    10.5.1 Marketing Analysis
    10.5.2 Marketing Analysis: Phases
11. REFERENCES
12. Appendix A [03660]
13. Appendix B [03670]
  13.1 The principle functions of the Publication component
14. APPENDIX C DATABASE DESIGN: ADARTS
  14.1. USERS
  14.2. CATEGORIES
  14.3. BRAND
  14.4. GALLERY
  14.5. GALLERYITEM
  14.6. METADATA: DUBLIN CORE (DC)
  14.7. MEFF: METADATA FORMAT FILTER
  14.8. MAGAZINE
  14.9. CONTACT DIRECTORY
  14.10 OTHER
    14.10.1. Customer: Data relative to the customers
    14.10.2. Data relative to user roles
    14.10.3. Data relative to visitors
    14.10.4. Data relative to product categories
    14.10.5. Data relative to brand
    14.10.6. Data relative to brand associated to the category
    14.10.7. Data relative to brand associated to the user
    14.10.8. Data relative to gallery
    14.10.9. Data relative to gallery type
    14.10.10. Data relative to the gallery list
    14.10.11. Data relative to state of payment for a gallery
    14.10.12. Data relative to state of a gallery
    14.10.13. Data relative to a multigallery
    14.10.14. Data relative to gallery templates
    14.10.15. Data relative to template types
    14.10.16. Data relative to the visitor gallery: album
    14.10.17. Data relative to the galleryitem
    14.10.18. Data relative to the versions of the galleryitem
    14.10.19. Data relative to the type of version for a galleryitem
    14.10.20. Data relative to the state of a galleryitem
    14.10.21. Data relative to the galleryitem of a category
    14.10.22. Data relative to the metadata of the object
    14.10.23. Data related to the MEFF metadata schema
    14.10.24. Data related to the MEFF type
    14.10.25. Data related to the MEFF channel
    14.10.26. Data related to the MEFF filter
    14.10.27. Data related to the MEFF filter channel
    14.10.28. Data related to the MEFF filter category
    14.10.29. Data related to the MEFF filter gallery
    14.10.30. Data related to the MEFF filter galleryitem
    14.10.31. Data related to the MEFF filter user
    14.10.32. Data related to the MEFF filter metadata
    14.10.33. Data related to the MEFF filter magazine
    14.10.34. Data related to the MEFF filter issue
    14.10.35. Data related to the MEFF filter article
    14.10.36. Data relative to the magazine
    14.10.37. Data relative to the state of a magazine
    14.10.38. Data relative to the magazine issue
    14.10.39. Data relative to the state of the issue
    14.10.40. Data relative to the article
    14.10.41. Data relative to the state of the article
    14.10.42. Data relative to an article associated to a category
    14.10.43. Data relative to contacts associated to the user
    14.10.44. Data relative to the types of contacts
    14.10.45. Data relative to a country
15. APPENDIX D—GLOSSARY
Glossary
  15.1. Harvester
  15.2. aDORe: A modular, Standards-based Digital Object Repository
  15.3. OAI (Open Archives Initiative)
  15.4. Harvesting interface
  15.5. Repository
  15.6. Resource
  15.7. Item
  15.8. Record
  15.9. Digital Object
  15.10. Complex Digital Objects (CDO)
  15.11. Federated Repositories
  15.12. The complex nature of the assets MPEG-21 (Moving Picture Experts Multimedia framework, standards ISO/IEC 21000)
  15.13. Surrogate
  15.14. Quantistic
  15.15. OpenURL (Uniform Resource Locator format)
  15.16. DOI: Unique Universal Digital Object Identifier
  15.17. XSLT (EXtensible Stylesheet Language Transformations)
  15.18. Topic Maps
  15.19. Ontology
  15.20. The aDORe Architecture

2. BRIEF SUMMARY OF THE INVENTION

This invention relates to the creation of a software application to: facilitate the creation, representation and publication of Digital Objects (DO); in particular, methods and apparatus that improve digital resource retrieval on the part of end users and to provide a new system for the web based marketing of digital assets and the online distribution of metadata enriched advertising.

3. BRIEF DESCRIPTION OF THE SEVERAL VIEWS OF THE DRAWINGS

Other features and advantages of the present invention will become apparent in the following detailed descriptions of the preferred embodiment with reference to the accompanying drawings, of which:

3.1.1. FIG. 1. Inventive System
3.12. FIG. 2. User Types
3.1.3. FIG. 3. POLYCAT Authoring
3.1.4. FIG. 4. POLYCAT Authoring-Cataloging SDO into the ADARTS Repository
3.1.5. FIG. 5. ADAMS Authoring-Points of View (POV)
3.1.6. FIG. 6. ADAMS Authoring-Aggregation
3.1.7. FIG. 7. Metadata Format Filter Process (MEFF)
3.1.8. FIG. 8. Publication: MEFF interaction with Publication Digital Object (PDO)
3.1.9. FIG. 9. ERD diagram of the inventive application

4. DETAILED DESCRIPTION OF THE INVENTION

The present invention is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Referring to FIGS. 1 and 2, the current invention relates to a software application to: facilitate the creation, representation and publication of Digital Objects. The invention improves digital resource retrieval on the part of end users and represents a new system for the web based marketing of digital assets and the online distribution of metadata enriched advertising.

The software application creates polyhierarchical descriptions of digital objects by consolidating concepts into broader contexts to augment potential sources of associations, referred to in this document as "semantic pointers" for improved SEO (search engine optimizations) of simple DOs (digital objects).

The software application has a Portal Management System (PMS), a Metadata Centric Content Management System (CMS) and a thematic portal (subject gateway) referred to here as Advertising Arts (ADARTS), which has been developed so that said Digital Objects can be used for an exemplary marketing method described herein.

5. POLYCAT—A Polyhierarchical Cataloging Tool: Creating Multilayered and Polyhierarchical Representations of Digital Objects 5.1. Overview Referring to FIGS. 1 and 2, the inventive system comprises three sequential macro phases: Cataloging, Authoring and Publication, each represented by its respective software component utilized during the description, enrichment and distribution of Digital Objects.

Each macro phase comprises various micro phases, with their respective software modules. Referring to FIGS. 1, 3, and 4, the component dedicated to the description of Digital Objects, during the Archiving phase, is referred to here as the "Cataloger" or POLYCAT. The Cataloger is a digital repository front end created to enable a polyhierarchical, multischema, approach to cataloging.

Referring to FIGS. 1,5, and 6, the component dedicated to the enrichment of Digital Objects, during the Authoring phase, is referred to here as A Digital Asset Management System (ADAMS). It is a Digital Object aggregator and disseminator, used to facilitate the construction and representation of Complex Digital Objects (CDO).

Referring to FIGS. 1, 2 and 8, the final component described here, utilized during the Publication phase, interprets the complex, Semantic Digital Object (SDO) assembled in ADAMS, and transforms it into XHTML for a web based distribution—ADARTS portal management system.

These three macro phases are embodied by three macro software components, which respond to the requirements of each of the three macro phases. The three macro software components are:
PolyCat;
ADAMS Aggregator;
ADARTS portal and portal management system.
Follows is an overview of these three software components which will cover the phases cataloging, aggregation (enrichment) and publication of Digital Objects (DO).

5.2. Multi Layered Versioning

Referring generally to FIGS. 1, 3 and 4, the cataloging process begins with an analysis of cataloging requirements, object type and collection description, which is deconstructed into potential Points of View (POV) to utilize during the cataloging process. The relevant POVs are then constructed if not already available in preconfigured metadata scheme (Dublin Core®) defining the domain of each point of view and utilizing "authorities" like ontologies, thesauri, and controlled vocabularies.

The inventive system manages multiple user repositories permitting users to archive multiple collections. User level and collection level metadata is registered for each user and their collections, along with relevant metadata for each Point of View (POV) selected for the cataloging process. At this point, a multi level Digital Object (DO) submission process, consisting of the creation of three "semantic" versions for each DO can begin:

5.2.1. The Digital Object is submitted to a digital repository (FEDORA) for preservation. This version permits us to distribute the DO by "exposing" this representation of the document to external harvesters of other federated repositories—such as those owned by universities, museums and digital libraries. We also, "expose" this object to our own "federator" and aggregator of DOs (and CDO) which is part of ADAMS. ADAMS also has its own harvester to retrieve relevant DOs from our repository and other digital repositories.

5.2.2. The topics (or subjects) used to create each Point of View (POV) in the cataloging process are utilized to create a Topic Map of the archive. Each DO cataloged represents an instance which is registered in the Topic Map of the inventive system. This creates a Topic Map of the DO instances deposited in the repository.

5.2.3. A third "semantic" representation of this object is also created, with an instance (an RDF graph) of this representation archived in the RDF triple store or also referred to as the Semantic Repository of the inventive system and utilizes "authorities" such as ontologies (foundation or upper level, middle or enterprise, and domain ontologies) thesauri, and controlled vocabularies. This "ontological" cataloging can also be represented as a map or mapping of RDF triples and visualized, representing a second mapping of the archive contents.

The Digital Object now has three semantic representations. Each of these three representations can be utilized in different processes and in different ways; for example, for enrichment, for search retrieval and for distribution. Each of these three semantic representations also creates a type of semantic handle which can be utilized by different applications, in different systems and in different ways, alone or in combination.

5.3 Interoperability

Interoperability between TM and RDF is achieved using URIs (universal resource identifier) so the same Complex Digital Object (CDO) can be represented by the same URI in all of its representations. The FEDORA URI representing the actual digital object (image or multimedia document) can be different from the one representing the identity of the object (used in the RDF graph). However, the connection between the two is represented by means of a property of the RDF/TM representation of the DO. The solution adopted is to incorporate in the URI the name of the server which provides the referencing to the objects.

The aim of this multi layered approach is to offer the best possible (qualitatively and quantitatively) semantic representation of digital content and its metadata, for distribution across network channels, today and in the future. And these three approaches and their related applications represent the most promising technologies on the horizon.

Although there are applications which map, merge, align and crosswalk between different metadata systems or ontologies or data formats, information is lost at each stage. Adopting this multi layered approach provides the greatest data fidelity.

As the market place is becoming semantic, detailed semantic resource description is essential for asset utilization in future semantic applications. It is neither desirable, prudent or obligatory to adopt a one level approach.

Adopting a multilayered approach equates to preparing digital assets for a complete method of distribution through multiple channels including, but not limited to, for example, the World Wide Web, intra-nets, cellular, among others. The sum is also greater than the parts, offering services and capacities that no single system offers.

The inventive system described, combines three different approaches into one synchronized Digital Object (DO) cataloging systems in order to create the richest possible representation of a DO. This creates the possibility of a multifaceted approach to search, described as a meta-semantic search in the exemplary application called Advertising Arts ("ADARTS").

5.4 Introduction to Components and Modules

Referring generally to FIGS. 1, 3 and 4, the software component described here, details the creation of a flexible, multi-faceted and polyhierarchical cataloging system that facilitates the qualified description of DOs from multiple Point of Views (POV). The description of a DO as a construction of multiple Point of Views (POV) offers two principle advantages; one, to create an enriched end user experience and two, to provide a structure for the creating links to associated content of other semantically cataloged resources. The purpose of multiple POVs is to provide a more accurate and detailed description of interesting aspects of an object and to create pointers to associated resources. The Cataloger component comprises modules for:
  Metadata Schema
  Construction
  Validation
  Authority binding
  Revision and validation workflow
  Publication in semantic repository
  POV management
    POV definition
    Construction
    Aligning or mediation
    Mapping
    Revision and validation workflow Publication in semantic repository
  DO management
  DO submission with all object representations (image, audio, pdf, doc etc.)
  Semantic cataloging with POV ontology
  Revision and validation workflow
  Publication in semantic repository 5.5 Metadata Schema Management Module This module manages the metadata cataloging schema templates, and the associate workflow including: their addition to the system, their validation and their management from within the Cataloger component. The Metadata Schema Management Module permits a flexible structure for schema management necessary for the creation of catalog entries with multiple POVs or polyhierarchical cataloging for the construction of polyhierarchical representations of DOs.

Standard schema include: technical data, the product information, the descriptive data, and e-commerce data. Each metadata schema represents a class that can be used to build a Point of View (POV). Each metadata schema template is validated before it can be utilized by the system. Schema creators, such as, data regarding authors of the metadata schema template (domain experts), are linked to the schema itself and all operations on the schema (catalogers) are logged into the system. Any modification of a metadata schema template generates a new version of the schema itself and must follow a revision and validation process before it substitute for the published version.

Whenever available for any given POV, authorities such as domain ontologies, thesaurus or controlled vocabularies are utilized controlled data input fields. When an authority is not available, a descriptive field can be utilized to annotate a POV.

5.6 POV Management Module

This module permits the creation of POV related to an object and its management within the Cataloger component. A typical POV is constructed utilizing an ontology consisting of several metadata schema templates. These are needed in order to generate a Point of View Instance associated to the object being cataloged.

The metadata schema template represents the class and subclasses that build (that are represented by) the ontology. It is possible to customize the POV ontology adding new data and object properties to the classes.

Different POVs of the same information sources are represented as domain ontologies related to the "reference" ontology (DOLCE) which describes the data source vocabulary. Third party applications only see the POV ontology, while the internal query engine takes the advantage of the whole representation.

A POV can vary from a simple descriptive note or annotation added to a standard schema by a domain expert to the definition of a POV class consisting of multiple subclasses.

5.6.1 *POV Definition

Contains a descriptive definition of the POV identifying and utilizing domain ontologies, thesauri and controlled vocabularies when possible and available and their relationship with other surrounding vertical (middle and domain) and horizontal (higher or foundations) ontologies being utilized, and related thesauri and controlled vocabularies. In the absence of adequate domain ontologies, domain thesauri or controlled vocabularies domain experts are responsible for creating a detailed description of the domain, citing key references which can be utilized to extract key concepts and descriptions relating to the domain. This is accomplished by the domain expert utilizing the schema for domain expert—POV creator.

5.6.2 *POV Ontology

Defines a POV domain instances and phylogenic ontology class attributes.

5.6.3 *POV Construction

Create ontology using metadata schema templates as class and subclass of the ontology and add additional POV (domain) specific fields and relations as necessary.

5.6.4 *POV Instance

POV Instance: is an instance of a POV ontology that has been used to catalog semantically the DO in the POV.

5.6.5 *POV Type Collection: The Phylogenic POV

The domain ontology POV can also describe a class of objects or "collection", which can be used to define and describe a time base process relationship or historic perspective for each member of this POV collection and its relationship with the other members of the collection. This is referred to here as a phylogenic classification and is utilized to create a semantic timeline of a particular POV collection and its members.

A POV collections level descriptive field is used to describe the class of members; this description is inherited by each member of the collection to which is added the specific description of the role or place of each DO within the time based process described. This description of the DO under study is then collocated between what has become before and after, permitting it to be located (descriptively) along a timeline representation. Because a DO can be described by multiple POVs, a DO can be a member of multiple POV collections, and situated along multiple timelines, permitting a time based tracking of features and functions of a "collection" for each POV created.

5.6.6 *POV Alignment, Mediation and Mapping

POV ontologies are connected to other upper ontologies and middle ontologies (DOLCE) that permits the joining of all semantic information together. Available ontologies are subdivided into upper ontology, middle ontology and domain ontology. These ontologies are structured in hierarchic mode. There is an upper ontology that connects the sub-ontologies named middle-ontology. Middle ontologies connect sub-ontology named domain ontology specific for each domains. In some cases the "last ontology" can be represented by the POV. Each POV could be connected to other POV to allow semantic cataloging.

The Administrator sets the POV policy to provide the user (cataloger or domain expert) with access to create the POV Instance. Any POV is revised and validated before it is published into the semantic repository allowing its utilization for semantic cataloging. Data regarding authors of the POV are linked to the schema itself and all operations on the POV are logged into the system.

Any modification of a POV generates a new version of the POV itself that must follow the revision and validation process before it substitutes the published version. A POV can grow in time and all objects automatically inherit new information.

5.7 Digital Object Management Module

The core module of the Cataloger for the submission includes various metadata schema, which include schema for the management of multiple languages, rights management and preservation. The system also includes the schema for the registration of various points of view of an object or their POV.

When a user submits an object into the Cataloger, (POLYCAT) he first must choose at least one POV ontology to describe it. In this way a POV instance is added to the Cataloger, for each POV used to describe an object. Each new POV instance is added separately from the POV ontology. The user must add an object representation of the digital object that he wants to catalog (e.g., image, audio, pdf, doc). The system will automatically extract technical information from the surrogates and store them into the object as technical metadata. All metadata related to the community of the user are inherited during object submission. Each user is guided through the cataloging process for his or her particular expertise and POV using dedicated ontologies.

Each POV instance is composed of several metadata schema template that represents the user's classes and subclasses, so the user is guided to fill schema with data using fields controlled by the appropriate authorities (ontologies, thesauri and/or controlled vocabularies) when possible. Users authorized to submit new information into POV can create several instances of POV for entering new information. Any DO is revised and validated before it is published into semantic repository for their utilization. Data regarding authors of the object are linked to the DO itself and all operations on the DO are logged into the system. Any modification of a DO generates a new version of the DO itself that must follow the revision and validation process before it substitutes for the published version.

5.9 General Functionality

The process of creating high quality metadata for each DO begins at the moment of submission. The Cataloger is a software component utilized during the Archiving phase of the project and sits on top of the repository (FEDORA). The Cataloger can also catalog objects into multiple digital repositories and is not limited in any way to the FEDORA digital repository. This cataloging component utilizes separate modules for the cataloging of an object from different perspectives or POVs. Each of these modules consists of its associated schema for metadata input. These schema are used to create multi-faceted and polyhierarchical catalog entries with schema fields linked to available authorities such as ontologies, thesauri, and controlled vocabularies. Exemplary schema would include schema for multi language descriptive metadata, annotations, bibliographic references, product related information, e-commerce information and technical information for instance related to an image file, among others. This is a key aspect of the inventive semantic approach to the creation of information enriched digital assets and begins a value chain by building quality semantic handles for the DOs.

During the Enrichment phase, these DOs can be further enriched with links to correlated information selected from "trusted" content providers. Enrichment here implies the process of adding semantic value to a DO by providing different possible contexts from which to consider the DO, offering the end user the opportunity for a deeper and/or broader study of the DO.

Enrichment is an integral part of the cataloging architecture utilized, permitting metadata annotations to the DOs in the collection by qualified experts in various fields, as well as, associating external content (images, videos, articles) and their metadata. This enables the creation of an unlimited network of interrelated detailed information associated to a DO (Complex Digital Object).

Upon ingestion into the digital repository (DR), each DO inherits the administration and collections level metadata associated with its account and account type. Depending on its DO type (ex.: image, audio, video, text) each media asset is assigned the appropriate descriptive metadata, a unique universal identifier, copyright and usage permission are registered. This permits a complete audit history, including the tracking of every user transaction, modification to each asset and each user interaction.

5.10 POV Structure

The structure of the POV of a parent object is built upon a POV model which includes the following elements:

POV Type are aggregation of schema templates which are used to create a model of a particular POV;

POV Type Collection: describes the DO as a collection of the POV instances. Each POV Instance has a POV type.

The structured metadata of every POV consists of an aggregation of default scheme for the registration of metadata. These include:

Collection metadata
Administrative metadata
Technical metadata
Descriptive metadata
Annotation metadata
Citation metadata To these default templates it is possible to add template scheme customized for a particular Point of View (POV).

5.10.1 POV Instance

The POV instance has two aspects:

The POV Instance considered as an instance of a POV Type relative to a DO;

5.10.2 POV Collection Metadata

Collection metadata is cataloged for the POV Type Collection and for POV Type Instance.

We will follow the Dublin Core® Collection Description Application Profile Data Model.

5.11 For POV Type Collection

1. Unitary Finding Aid: it is inherit by POV Type Model which describe the POV as a whole;
2. Hierarchic Finding Aid: it is inherit by POV Type Model which describe the POV as a whole and, together with information about the individual POV Type Instance within it and their Content, including contextual information about the relation of the POV Type Instance and their Content to the Collection as a whole;
3. Analytic Finding Aid: A Collection-Description which consists of information about the individual POV Type Instance within it and their Content.
4. Time based process description—semantic time line instance annotation.

5.12 For POV Type Instance:

1. Unitary Finding Aid: it is inherit by POV Type Collection Analytic Finding Aid;
2. Hierarchical Finding Aid: it is inherit by POV Type Collection Analytic Finding Aid, together with information about the individual schema within it and their Content, including contextual information about the relation of the schema and their Content to the Collection as a whole;
3. Analytic Finding Aid: A Collection-Description which consists of information about the individual Schema within it and their Content.

5.13 Process and History-Ontogenic and Phylogenic

This approach permits, for example, the creation of historic POV collections of groups of instances. For each POVs cataloged an object can form part of a respective collection. Utilizing a single instance collection the user can also create a collection relating to the different phases of a creative process related to the creation of an object, from a given POV. If an object is seen as the end product of a series of production processes, the description of the process can also be considered a collection.

To generate semantic timeline navigation of POV instances, for example within a web based distribution channel's image gallery or search, each Point of View needs to be considered as a composed of a collection of Digital Object instances linked to that particular POV, within a time based or historic perspective. This is referred to here as a phylogenic classification and it is utilized to create a semantic timeline of a particular POV. This means that a POV Type Collection descriptive field needs to describe how the object under study is related to what has come before and after. This is placed (descriptively) on the POV timeline. This permits a time based tracking of features and functions of a "collection" for each point of view created.

5.13.1 End User Annotation: Folksonomies

A browser-based repository interface permits the addition of future annotations (tagging), citations and bibliographic references for each digital original by authorized repository users and folksonomies by portal end users.

5.14 Cataloger Modules

The Cataloger is composed of a cataloging component which utilizes separate modules for the cataloging of different representations of each object. Each of these modules consists of its associated schema for data input.

The principle characteristics:
   Cataloger Administration
   Authentication and authorization management;
   LDAP authentication;
   User management (account);
   Policy management;
   Community management;
   Collection management;
   Schema Management
   Schema creation;
   Schema validation;
   Schema ingestion and implementation.
   Auditing and statistics about objects and users.
   Digital Object Management
   Ingestion-DO
   Create a DO of specified type
   Work-flow for ingestion;
   Default Schema
   Multiple attachment file;
   Descriptive metadata cataloging with multi-language;
   Administrative metadata;
   Technical metadata;
   Rights metadata;
   Preservation metadata;
   Custom schema;
   Annotations;
   Bibliography citations;
   Product descriptive metadata;
   E-commerce metadata;
   Assign permission to users and groups;
   Mapping of a DO;
   Unique universal identifier DOI or Handle system;
   Map DO into repository;
   History and Versioning on DOs;
   Repositories search.

5.15 Technology Utilized

In detail, the product in development is characterized by following technical specifications:

A web based architecture;
Application server: Apache Tomcat, Apache Geronimo;
Programming languages for the development of the application, the interface and templates are Java, Jsp (JavaServer Pages), XML (Extensible Markup Language), XSLT (Extensible Stylesheet Language Transformations), HTML (HyperText Markup Language);
Framework: Apache Cocoon;
Databases utilized to manage the portal and archive: MySQL (RDBMS). Digital repositories: Fedora (OAIS (Open Archival Information System) complaint).
Workflow engine: *Enhydra* Shark Java XPDL (XML Process Definition Language) workflow.
Internal search engine: Lucene Solr;
Form management: XForms (XML Forms);
Metadata validation framework: JHOVE (JSTOR/Harvard Object Validation Environment);
Topic Map API (Application Programming Interface) and engine: TMAPI, TM4J, XTM; Ontology API, and editor: Jena, Protege; Semantic repository; Mulgara, Jena
Extractors and reasoners; SPARQL (SPARQL Protocol and RDF Query Language), SPARQL Motion, Pellet, GRRDL (Gleaning Resource Descriptions from Dialects of Languages) with WordNet;
Authentication: authentication service utilized for authentication and authentication are OpenLDAP (Lightweight Directory Access Protocol); Authorization framework: DRAMA (Digital Repository Authorization Middleware Architecture), XACML (eXtensible Access Control Markup Language).

5.16 CATALOGER: System Requirements
5.16.1 Cataloger Administration
Authentication and Authorization Management;
The user Administrator creates account types, user types and the associated cataloging privileges for each. The Administrator can assign one or more DOI domains or handles to an account. The domains, once assigned, are utilized for all DOs cataloged into the account for the identification. The LDAP server ([ref 0.6]) is utilized for the management of users and user groups. This module will provide universal identifiers for users based on the PID (unique, persistent identifier for a Fedora digital object) Generator of FEDORA and the CNRI (Corporation for National Research Initiatives) handle server ([ref. 14]).

5.16.2 Policy Management
The administrator has a wide range of options available regarding the policies which can be set to define cataloging privileges. The system which manages the policies is divided into two parts: the first manages the assignment of services to each level of user depending on their authorization, the second manages the policies related to the repository access privileges.

For the development of the first part of the policy system, the LDAP server (OpenLDAP [ref. 6]) is utilized, which will carry out a census of the Cataloger services and the access policies, to establish the access privileges for a user or group of users.

The XACML standard is utilized for the development of the second part of the policy management system, which will be used to configure the policies of FEDORA in combination with the attributes of LDAP. A component is used to dynamically integrate the policy management of FEDORA with the user authentication of LDAP. Policies are assigned by the administrator for communities and collections. The collections inherit the policies assigned to communities. The DOs cataloged in the collections will, likewise, inherit the policies of the collection and community.

5.16.3 Community Management and Collection Management
The administrator assigns users and groups of users, areas within the repository for publication, called "communities". Within each community the administrator can assign collections, in which each user or group of users can catalog objects. To realize this function we will develop a collection ingestion module, which will permit the creation of collections and sub collections within FEDORA utilizing the Fedora Relationship Ontology ([ref. 1O]) based on the RDFS standard ([ref. 11]). Once the administrator has created a collection, the access policy for the collection and its related community is also assigned.

5.2.1. Schema Management
An example of preloaded, default schema for cataloging utilized in the Cataloger (DCMI Type Vocabulary [rel. 1]) would include:
Descriptive metadata cataloging with multi-language;
Administrative metadata;
Technical metadata;
Rights metadata;
Preservation metadata;
Once chosen the object type for ingestion of the default schema for each object type are loaded for cataloging. Examples of the types of supplementary schema which can be utilized to enrich an object include:
Annotations;
Bibliography citations;
Product descriptive metadata;
E-commerce metadata;
Each schema utilized by the Cataloger undergoes the process of creation, validation and approval before being implemented. Once approved each schema is also cataloged. The administrator catalogs the ontology of the OWL (Web Ontology Language) file ([rel. 16]), prepared with Protege ([rel. 9]), and uses this to associate the relative schema. The auditing system permits the administrator to monitor the use of the schema.

5.2.2. POV Management: Auditing and Statistics on Objects and Users
The administrator can create and audit the activities and privileges of different categories of catalogers, for different schema and portions of schema. For any operation carried out by users of the Cataloger the schema is monitored, with audits stored in the Catalogers database. This permits the administrator a complete audit of all activity within the Cataloger at any time.

The statistics and the analysis of the information related to the cataloging process permit quality control and a detailed level accountability, related to those engaged in the cataloging process.

The inventive system can collect statistics related to: Register
POV of cataloger
  Schema for domain expert—POV creator
  Schema for cataloger—Domain expert Schema
  for annotator-domain expert Schema for
  cataloger—research assistant
  User Statistics
Auditing of Cataloger accesses:
  the number of objects cataloged during a defined time period;
  the number of annotations made during a defined time period;
  the number of citations made during a defined time period;
  the number of scheme utilized during a defined time period;
  the user who cataloged the greatest number of objects
  the user who created the most viewed entries.
Statistic related to the object:
time required to catalog an object;
time to catalog a single schema;

a list of modifications to any object;
local search statistics:
most common queries;
object most frequently searched;
schema most visited;
annotation most visited;

5.3 Digital Object Management

Submission Workflow

Digital Object ingestion is overseen by a validation process integrated into the cataloging workflow. The same process is followed each time, for example, a user updates information about an object with annotation or citations. During the process of ingestion, the DO inherits administrative information such as information regarding the user executing the cataloging, as well as, the collection and the community to which this DO belongs. This information is cataloged as part of the administrative metadata for the object.

The ingestion process comprises:
  determining the community and collection into which the DO will be cataloged;
  authenticating the user;
  Digital Object inherits administrative metadata relating to user, collection and community;
  the type of object to be cataloged is chosen. DC ([ref. 1]);
  the user identifies the contexts (Point of Views) to be utilized;
  the user selects the appropriate schema for the relative chosen contexts;
  user insert data into schema;
  the ontologies provide a guide for the cataloging hierarchies;
  the inventive system verifies for incongruities or duplications of information on different schema (JHOVE [ref. 4]);
  the inventive system verifies the correctness of aggregate construction (RDF) between schema child DO and parent DO; and
  submission for approval and ingestion workflow.

5.3.1 Submission Work Flow

The ingestion process is managed by the workflow framework integrated into the Cataloger component (Enhydra Shark Java XPDL workflow [ref. 5]).

Each phase of the ingestion process is audited and reported (see AUDITING AND STATISTICS FOR OBJECTS AND USERS). Once the DO has been ingested into the repository, the use policy related to the object is managed by Cataloger (see POLICY MANAGEMENT). Each time a DO has been submitted for ingestion into the repository, the DO will undergo an approval process.

Once a cataloged DO is submitted for ingestion,
  its POV is determined
  DO is reviewed;
  approved and entered into the repository;
  not approved and returned for correction or modification;
  the DO is entered into the repository and is assigned an identifier or handle (URI/DOI).

5.3.2 Handle and DOI

Once a DO has been approved for repository submission, it is assigned a unique universal identifier, URI (both Handle and/or DOI). This unique universal identifier is requested of the Cataloger by the Handle server utilizing the PID generator of FEDORA.

5.3.3 History and Versioning

The user can audit the history of the cataloging process including any updates made to the DO. If the user wished to update information relating to the DO, the ingestion module creates a new version of the DO. The administrator can monitor the process of cataloging, measuring the time and efficiency of the process in order to improve the workflow. The history of the cataloging of the object is registered directly within administrative metadata of the DO, utilizing the schema Digiprov ([ref. 15]). Digital Object versioning is managed directly in FEDORA and it is accessible to the Cataloger through the API of FEDORA.

5.3.4 Repository Search

The Cataloger offers a metadata sensitive search engine built with the Lucene Solr engine and is packaged with FEDORA. Users can carry out searches with the following filters:
  DO type;
  schema;
  collection;
  community;
  user;
  user group;
  metadata and keywords from selected scheme.

5.3.5 Digital Object Mapping

The DO cataloged can be mapped onto one or more Topic Maps ("TM") made available to the Cataloger component. Topic Maps are created with tools external to the Cataloger. Each time a DO is cataloged, it is associated with one or more "topics" used to create the semantic layer of the TM. The TM creation can to some extent be automated, utilizing tools such as TM4J, MDF and the TMHarvester, which can extract semantic data for each DO which can be used to update the existing repository system TM.

In order to enable Topic Maps-based collation of Dublin Core® information, Dublin Core® description sets have limited usefulness unless they can be aggregated based on meaning Topic Maps makes such aggregation possible.

Start from the Dublin Core® Abstract Model (DCAM)
Map to the Topic Maps Data Model (TMDM)
Reuse the DC identifiers
The URI is the identifier.
The 15 core DCMES elements map to:
Names: title
Occurrences: date, description, identifier, rights
Associations: contributor, coverage, creator, format, language, publisher, relation, source, subject, type.
  The DCAM perspective
  description is the proxy of a described
  description sets are sets of related descriptions
  a record is a serialized description
The TMDM perspective
  topic is the proxy of a subject
  Topic Map is a set of related subjects ([18]).

5.3.6 Object Mapping in the Repository

The Complex Digital Objects (CDO) "created" by the Cataloger are aggregations of simple DOs connected by RDF relationships. The principle DO contains descriptive and administrative metadata, where as the metadata created with the various schema are cataloged as separate DOs, or children connected to the parent object via the RDF contained in the RELS-EXT datastream. At the moment of the submission of the object into FEDORA, the Cataloger manages the registration of each part of the aggregate DO into the repository, with its relative affiliation.

5.4 Technology Utilized

The construction of Cataloger component permits a flexible object oriented approach to the integration of additional schema into the cataloging workflow. The Cataloger component utilizes the Cocoon ([ref. 2]) framework allowing creation and management of XML documents; XML documents are utilized to catalog the schema of the DOs. Additionally, Cocoon allows easy transformation of XML objects in the various formats required in the platform: HTML, XHTML, PDF (portable document format), among others. For example, the metadata schema in XML utilized as a template to catalog the schema for the Digital Objects, can automatically be transformed by Cocoon in an HTML form, utilized by users for cataloging. This permits the creation of a generic method for the transformation of schema metadata in HTML, allowing addition of as many schema as needed without necessitating any intervention on the code of the component itself.

XForms ([ref. 3]) along with Cocoon are used, to create algorithms of validation for input data. OpenLDAP is used to access the user directory and an implementation of DRAMA (XACML) is used to integrate with FEDORA. MySQL ([rel. 12]) is being used as a database. Ontology access is made possible with Protege and the Jena framework. For the syntactic validation of input data during the cataloging process the JHOVE framework is used. Object mapping for the creation of Topic Maps is made possible by the TM4J motor and the API TMAPI.

5.5 Application Functionality

This section describes the 3 principle user types which utilize the Cataloger component of management system.

5.5.1 LDAP Authentication

Function login;
  get and set users attributes; get
  and set groups attributes;
  assign, remove role to users and groups;
  assign, remove services to users and groups;
  logout.
  Associated modules:
authorization management module;
ingest module.
  Back end
It is realized with Cocoon pipeline that interfaces LDAP server.
  Front end
  The administration front end is developed by XML and XSLT document into Cocoon framework.
  This is the template list to develop:
  login;
  logout.
  Task
  LDAP interface login;
  get and set users attributes;
  get and set groups attributes;
  assign, remove role to users and groups;
  assign, remove services to users and groups;
  logout.
  5.5.2 User and Authorization Management
  The Authorization Management Module permits the centralized management of users, Cataloger services, and management of single Digital Objects in the repository. The Administrator can configure authorization for access to services for users or groups of users. The Administrator can also assign management privileges for community, collection and account managers.
Account managers can assign and configure their respective areas for the cataloging of DOs relative the repository areas assigned by the administrator.
  Features and functions
    list, create, read, update, delete and search user account;
    list, create, read, update, delete and search user groups;
    assign, read and delete user to groups;
    assign, read update, delete service for user and groups;
    assign, read update, delete role for user and groups;
    assign, read, update, delete permission on objects for user account;
  Back end
  It is realized with Cocoon pipeline that interfaces LDAP server for storing users, groups, service and roles while permissions on object are stored into DRAMA database.
  Front end
The administration front end is developed by XML and XSLT documents in the Cocoon framework.
This is the template list to develop:
    main panel of user and authorization management template;
    list, create, read, update, delete and search user account templates;
    list, create, read, update, delete and search user groups templates;
    assign, read and delete user to groups templates;
    assign, read, update, delete service for user and groups templates;
    assign, read, update, delete role for user and groups templates; and
    assign, read, update, delete permission on objects for user account templates.
  Tasks
  User and Authorization Management Tasks
  Back end tasks
    list, create, read, update, delete and search user account back end
    list, create, read, update, delete and search user groups back end;
    assign, read and delete user to groups back end;
    assign, read, update, delete service for user and groups back end;
    assign, read, update, delete role for user and groups back end;
    assign, read, update, delete permission on DOs for user account back end;
  Front end tasks
    main panel of user and authorization management template;
    list, create, read, update, delete and search user account templates;
    list, create, read, update, delete and search user groups templates;
    assign, read and delete user from groups templates;
    assign, read, update, delete service for user and groups templates;
    assign, read, update, delete role for user and groups templates; assign, read, update, delete permission on DOs for user account templates.
  5.5.3 Schema Management
  Features and functions schema management
    list, create, read, update, delete and search schema by schema creator expert;
    submit new schema into Cataloger by schema creator expert;
    revision schema by cataloging experts;
    validation schema with standard utilization;
    approve schema;
    publish schema;
    reject schema to creator;
    establish which user type has access to which part of the schema;
    assign ontology to metadata in schema for guided data entry;
    assign an HANDLE/DOI identified to the schema;

history of life-cycle of the schema;
versioning of an existing schema;
schema auditing to retrieval information regarding its utilization;
trace utilization of schemas by users;
report on users utilization of schemas;
ontology management to retrieve information about ontology utilization;
list, create, read, update, delete and search ontology OWL file;
ontology auditing monitor;
trace utilization of ontologies by users;
report on users utilization of ontologies.
Back end
It is realized with Cocoon pipeline that interfaces MySQL server for storing schema using *Enhydra* for ingestion process workflow and Protege for creation and update of ontology OWL files.
Front end
The administration front end is developed by XML and XSLT document into Cocoon framework.
This is the template list to develop:
  main panel of schema and ontology management templates;
  list, create, read, update, delete and search schema templates;
  list of active workflow template;
  submit template;
  revision template;
  validation template;
  approve template;
  publish template;
  reject template;
  history template;
  versioning template;
  assign ontology to metadata in schema template;
  schema auditing monitor template.
  list schema template;
  trace utilization by user template;
  report on user utilization template.
  list, create, read, update, delete and search ontology OWL file;
  list of active workflow template;
  submit template;
  revision template;
  validation template;
  approve template;
  publish template;
  reject template;
  assign an HANDLE/DOI identified to the schema;
  history template;
  versioning template;
  assign permission for accessing schema template;
  ontology auditing monitor template;
  list schema template;
  trace utilization by user template;
  report on user utilization template.
  Task
Schema management Task
  Back end tasks
  schema management
  list, create, read, update, delete and search schema;
  submit;
  revision;
  validation;
  approve;
  publish;
  reject;
  history workflow;
  versioning;
  assign ontology to metadata in schema;
  assign an HANDLE/DOI identified to the schema;
  establish which user type has access to which part of the schema;
  schema auditing monitor.
  trace utilization by user;
  report on user utilization;
  ontology management
  list, create, read, update, delete and search ontology OWL file;
  submit;
  revision;
  validation;
  approve;
  publish;
  reject;
  history workflow;
  versioning;
  ontology auditing monitor;
  trace utilization by user;
  report on user utilization.
  Front end tasks
  main panel of schema and ontology management templates; list, create, read, update, delete and search schema templates; list of active workflow template;
  submit template;
  revision template;
  validation template;
  approve template;
  publish template;
  reject template;
  assign an HANDLE/DOI identified to the schema;
  history template;
  versioning template;
  assign permission for accessing schema template;
  assign ontology to metadata in schema template;
  schema auditing monitor template.
  list schema template;
  trace utilization by user template;
  report on user utilization template.
  list, create, read, update, delete and search ontology OWL file;
  list of active workflow template;
  submit template;
  revision template;
  validation template;
  approve template;
  publish template;
  reject template;
  history template;
  versioning template;
  ontology auditing monitor template;
  list schema template;
  trace utilization by user template;
  report on user utilization template.

5.5.5 Community and Collections Management

The Administrator assigns access privileges to users and groups of users, creating areas of publication within the repository, which are referred to as "communities", within which are assigned services, such as collections, as requested by the users.

Features and functions:
  list, create, read, update, delete and search community;
  submit new community into Cataloger;

publish new community into Fedora Repository;
establish which user type has access to new community;
assign an HANDLE/DOI identified to the community;
history of life-cycle of the community;
versioning of an existing community;
list, create, read, update, delete and search collections into community or parent collections;
submit new collection into Cataloger;
publish new collection into Fedora Repository;
inherit access permission from community;
establish which user type has access to new collection other than those inherit from community permission;
assign an HANDLE/DOI identified to the collection;
history of life-cycle of the collection;
versioning of an existing collection.

Back end

It is realized with Cocoon pipeline that interfaces Fedora repository for storing community an collection using Enhydra for ingestion process workflow.

Front end

The administration front end is developed by XML and XSLT document into Cocoon framework.

This is the template list to develop:

list, create, read, update, delete and search community templates;
submit new community into Cataloger template;
publish new community into Fedora Repository template;
establish which user type has access to new community template;
assign an HANDLE/DOI identified to the community template;
history of life-cycle of the community template;
versioning of an existing community template;
list, create, read, update, delete and search collections into community or parent
collections templates;
submit new collection into Cataloger template;
publish new collection into Fedora Repository template;
inherit access permission from community template;
establish which user type has access to new collection other than those inherit from
community permission template;
assign an HANDLE/DOI identified to the collection template;
history of life-cycle of the collection template;
versioning of an existing collection template.

Task

Community and Collection Management task

Back end tasks list, create, read, update, delete and search community;
submit new community into Cataloger;
publish new community into Fedora Repository;
establish which user type has access to new community;
assign an HANDLE/DOI identified to the community;
history of life-cycle of the community;
versioning of an existing community;
list, create, read, update, delete and search collections into community or parent collections;
submit new collection into Cataloger;
publish new collection into Fedora Repository;
inherit access permission from community;
establish which user type has access to new collection other than those inherit from
community permission;
assign an HANDLE/DOI identified to the collection;
history of life-cycle of the collection;
versioning of an existing collection.

Front end tasks list, create, read, update, delete and search community templates;
submit new community into Cataloger template;
publish new community into Fedora Repository template;
establish which user type has access to new community template;
assign an HANDLE/DOI identified to the community template;
history of life-cycle of the community template;
versioning of an existing community template;
list, create, read, update, delete and search collections into community or parent
collections templates;
submit new collection into Cataloger template;
publish new collection into Fedora Repository template;
inherit access permission from community template;
establish which user type has access to new collection other than those inherit from community permission template;
assign an HANDLE/DOI identified to the collection template;
history of life-cycle of the collection template;
versioning of an existing collection template.

5.5.6 Digital Object Submission

The cataloging process of the DO, generates a number of Submission Information Package (SIP) linked together by RDF relations that represents the object to catalog with all information, which is sent to the repository for archiving.

The representation of each DO is composed of its respective schematic representations and attachment files. The Parent DO is composed by a descriptive metadata schema, an administrative schema and attachment file representing digital surrogate of the cataloger object. Child DOs contain other schema like annotation, citation, product schema and other custom schema. These are brought together by RDF schema present in each part of the aggregate DO, child and parent DO. Every DO is an aggregate composed of different components which can be represented in a parent—child relationship. The default schema utilized in the platform to describe an exemplary image file would include:

DO representation
formats, resolution, size, versions (original, copies);
descriptive metadata (extended DC);
technical metadata; rights
and licensing; preservation
metadata; annotation
(tagging);
bibliography; (where the image has been published) citations;
(where the image has been cited)
product information;
e-commerce related metadata; notes;
DO mapping (TM).

Each component of the DO aggregation is treated as a single object (child) belonging to parent DO object. When this DO is cataloged and ingested into the repository (FEDORA) it is archived as an aggregate of single linked DOs with RDF triples. This aggregation would be a "named map" in the ORE model (OAI-ORE, Open Archives Initiative Object Reuse and Exchange). This is DO aggregation is formalized in FEDORA (FOXML, Fedora Object XML) and RDF triples.

Advantages of this DO model: simplifies the representation of multi-faceted;
- there is no limit on the number of schema or attachments which can be utilized; each DO update is traced by auditing module;
- it is possible to access the parent DO through its associate child DOs utilizing a disseminator that uses RDF to retrieve parents;
- as it is also possible to access the child DOs through its associate with the parent DO utilizing a disseminator that uses RDF to retrieve parent; memory is optimized even for large DOs;
- it is possible to view the entire history of DO versioning and recreate any previous version.

Disadvantages of this Digital Object model:
- the need to create a disseminator to re-assemble aggregate DOs into single (complex) DOs for viewing;
- the need to create ad-hoc procedures for DO import and export. During the work flow process for ingestion, the system includes a user authorization process and DO approval process before the DO, or any changes to a DO can be utilized or viewed by users of the repository.

The policy and processing decisions regarding DO ingest, storage, access, and preservation are frequently conditioned on a per-format basis. In order to achieve necessary operational efficiencies, repositories need to be able to automate these procedures to the fullest extent possible.

5.5.7 Creating Object Container Types

After choosing the community and the collection to catalog a DO, the user chooses the object type of the DO to catalog. We use the standard DC Vocabulary to select the DO type:

Collection: An aggregation of resources. A collection is described as a group; its parts may also be separately described.

Dataset: Data encoded in a defined structure. Examples include lists, tables, and databases. A dataset may be useful for direct machine processing.

Event: A non-persistent, time-based occurrence. Metadata for an event provides descriptive information that is the basis for discovery of the purpose, location, duration, and responsible agents associated with an event. Examples include an exhibition, web cast, conference, workshop, open day, performance, battle, trial, wedding, tea party, conflagration.

Image: A visual representation other than text. Examples include images and photographs of physical objects, paintings, prints, drawings, other images and graphics, animations and moving pictures, film, diagrams, maps, musical notation. Note that Image may include both electronic and physical representations.

Interactive Resource: A resource requiring interaction from the user to be understood, executed, or experienced. Examples include forms on Web pages, applets, multimedia learning objects, chat services, or virtual reality environments.

Moving Image Definition: A series of visual representations imparting an impression of motion when shown in succession. Examples include animations, movies, television programs, videos, zoetropes, or visual output from a simulation. Instances of the type Moving Image must also be describable as instances of the broader type Image.

Physical Object: Physical Object Definition: An inanimate, three-dimensional object or substance. Note that digital representations of, or surrogates for, these objects should use Image, Text or one of the other types.

Service: A system that provides one or more functions. Examples include a photocopying service, a banking service, an authentication service, interlibrary loans, a Z39.50 or Web server.

Software: A computer program in source or compiled form. Examples include a C source file, MS-Windows .exe executable, or Perl script.

Sound: A resource primarily intended to be heard. Examples include a music playback file format, an audio compact disc, and recorded speech or sounds. Still Image: A static visual representation. Examples include paintings, drawings, graphic designs, plans and maps. Recommended best practice is to assign the type Text to images of textual materials. Instances of the type Still Image must also be describable as instances of the broader type Image.

Text: A resource consisting primarily of words for reading. Examples include books, letters, dissertations, poems, newspapers, articles, archives of mailing lists. Note that facsimiles or images of texts are still of the generic text, jpeg of a page in book, image or text;

After creating DO container type, a user can create a DO container for storing attachment, schema, permission and submit container for ingestion into Fedora Repository.

Features and functions
create DO container of a specified type;
Back end
It is realized with Cocoon pipeline that interfaces MySQL for retrieve list of types.
Front end
The administration front end is developed by xml and XSLT document into Cocoon framework.
This is the template list to develop:
list of available object type and create a DO container of a specified type template.
Task
Create object container task
Back end task
create a DO container of a specified type;
Front end task
list of available DO types and create a DO of a specified type template.

5.5.8 Multiple Attachment File

Multimedia files attached to the DO are cataloged into parent object utilizing Fedora Datastreams. These attachments can be of any media type or format. For JPEG formatted images, the Cataloger can determine and catalog the technical metadata of the image automatically.

Digilib is utilized as an image server. Digilib is used, for instance in the ALCATRAZ framework of image, text and annotation tools.

Advantages of utilizing an image server, such as Digilib include:
(1) the image content is processed almost immediately on the server side so that only the visible portion of the image is sent to the web browser on the client side;
(2) supports a wide range of image formats and viewing options on the server side while only requiring an internet browser with JavaScript and a low bandwidth internet connection on the client side.
(3) enables very detailed work on an image as required by scientists with elaborate zoom features like an option to show images on the screen in their original size.

(4) facilitates cooperation of scientists over the internet and novel uses of source material by image annotations and stable references that can be embedded in URLs (Uniform Resource Locator).

Authorized users will be able to add, update and eliminate attachments from cataloged DO or from DO container newly created. It is necessary to submit the new version of parent DO to the work flow ingestion process to approve updates.

Features and functions
list, create, update, read, delete attachment file;
manipulate image with digilib server
zoom image;
brightness, contrast, color change;
rotation and mirror.
Back end
It is realized with Cocoon pipeline that interfaces Fedora repository for ingestion and digilib server for image manipulation.
Front end
The administration front end is developed by XML and XSLT document into Cocoon framework.
This is the template list to develop:
list, create, update, read, delete attachment file templates; front
end to digilib server template;
Task
Multiple Attachment File task
Back end tasks
list, create, update, read, delete attachment file;
save image manipulated with digilib server; Front
end task list, create, update, read, delete
attachment file templates; front end to digilib
server template;

5.5.9 Context Schema

This schema represents the standard way of cataloging information about a DO inside it. Schema selections, features and functions comprise: identify the contexts (Point of Views) where information needed to be cataloged; identify the standardized types of information needed to be cataloged for each context;
allocate schema or scheme for each context;
automate wherever possible the information input inside schema with inherit data from collection and user attributes;
populate schema with data inserted by user;
verify the ontological validity of the data inside schema—when possible utilizing standards and thesauri;
verification of the ontology hierarchy—the DO cataloged is checked to assure that the data input conforms to the hierarchy of its respective ontology. For instance, the object child should be cataloged in a subcategory of the parent. In this way, the cataloging workflow is guided and controlled by the relative ontology.
verify the integration of each schema within the Cataloger, for instance checking for incongruity or duplication of information on different scheme;
list cataloged scheme with version used into tech metadata of the object; verify the validity of aggregate construction (RDF); and
update and remove existing schema.
Back end
It is realized with Cocoon pipeline that interfaces Fedora repository for retrieving schema, interfaces MySQL for storing DO containers, interfaces JHOVE for DO validation and interfaces Protege for ontology utilization.
Front end
The administration front end is developed by XML and XSLT document into Cocoon framework and uses XForm for present schema to the user.
This is the template list to develop:
identify the contexts template;
identify schema to be cataloged template;
allocate schema or scheme template;
presentation of scheme to user templates;
presentation of validation process templates;
complete summary object after validation template;
list cataloged schema for an object template.
Task
Context schema tasks
Back end tasks
identify the contexts (POVs) where information needed to be cataloged; identify the standardized types of information needed to be cataloged for each context;
allocate schema or scheme for each context;
automate wherever possible the information input inside schema with inherit data from collection and user attributes;
populate schema with data inserted by user;
verify the ontological validity of the data inside schema—when possible utilizing standards and thesauri;
verify the integration of each schema within the Cataloger, for instance checking for incongruity or duplication of information on different scheme;
list cataloged scheme with version used into tech metadata of the object; verify the validity of aggregate construction (RDF); and
update and remove existing schema.
Front end tasks
identify the contexts template;
identify schema to be cataloged template;
allocate schema or scheme template;
presentation of scheme to user templates;
presentation of validation process templates;
complete Summary Object (DO) after validation template;
list cataloged schema for an DO template.

5.5.10 Multi Language

When the descriptive metadata are input by users, utilizing an extend DC schema, they can select from various languages available for the schema,
Features and functions
list, create, read, update, delete descriptive schema in multiple languages.
Back end
It is realized with Cocoon pipeline that interfaces Fedora repository for retrieving schema, interfaces MySQL for storing DO containers, interfaces JHOVE for DO validation and interfaces Protege for ontology utilization.
Front end
The administration front end is developed by XML and XSLT document into Cocoon framework and uses XForm for present schema to the user.
This is the template list to develop:
list, create, read, update, delete descriptive schema in multiple language templates; descriptive schema with XForm template.
Task
Descriptive multiple language schema tasks
Back end tasks
list, create, read, update, delete descriptive schema in multiple language;

Front end tasks
list, create, read, update, delete descriptive schema in multiple language templates; descriptive schema with XForm template.

5.5.11 Administrative Metadata

Administrative metadata is the information necessary to allow the repository to manage the DO: this can include information on how the DO was scanned, its storage format etc. (often called technical metadata), copyright and licensing information (often called rights metadata), and information necessary for the long-term preservation of the DO (preservation metadata), among others.

5.5.12 Technical Metadata

Technical metadata is data about the DO itself (not about the subject of the image). It includes information about: the technical processes used in image capture or manipulation; and color; file formats; among others. Some of the technical information that is recorded about the image, such as the image file type, must be machine-readable (following specific technical formats) in order for a computer system to be able to properly display the image. DIG35 (Metadata Standard for Digital Images) guidelines are used to model technical metadata.

Features and functions
list, create, read, update, delete technical schema;
automatic acquisition of technical metadata from digital surrogate into schema.

Back end
It is realized with Cocoon pipeline that interfaces library for acquisition of metadata from image, audio, video, interfaces MySQL for storing schema in object container, interfaces JHOVE for DO validation.

Front end
The administration front end is developed by XML and XSLT document into Cocoon framework and uses XForm for present schema to the user.

This is the template list to develop:
list, create, read, update, delete technical schema templates;
technical schema with XForm template.

Task
Technical schema tasks
Back end tasks
list, create, read, update, delete technical schema; automatic acquisition of technical metadata from digital surrogate into schema;
Front end tasks
list, create, read, update, delete technical schema templates
technical schema with XForm template.

5.5.12 Rights Metadata

IDECS standard is used.

5.5.13 Preservation Metadata

Preservation metadata is the information necessary to carry out, document, and evaluate the processes that support the long-term retention and accessibility of digital materials.
In terms of digital technology and the widespread creation of digital materials, preservation metadata has had a lengthy period of gestation and development. The PREMIS (PReservation Metadata: Implementation Strategies) model is used.

5.5.14 Annotations

Annotation metadata contains additional information related to a cataloged resource, but separate from the resource. Annotation allows channel end user feed back to enrich metadata. The purpose of metadata enrichment is two fold: to improve user access (usability) and to improve search engine retrieval of cataloged resources (SEO, search engine optimization). Annotations can take the form of a qualified professional commentary associated with a object created ad hoc for the object. Annotations can also take the form of the creation of associations with objects from other galleries, within the ADARTS digital repository or other repositories in the ADARTS federation.

The DLESE (Digital Library for Earth System Education) Annotation Framework is used for annotation. Digilib software is used to link annotation onto an image.

Advantages of utilizing an image server, such as Digilib
(1) the image content is processed almost immediately on the server side so that only the visible portion of the image is sent to the web browser on the client side;
(2) supports a wide range of image formats and viewing options on the server side while only requiring an internet browser with JavaScript and a low bandwidth internet connection on the client side;
(3) enables very detailed work on an image as required by scientists with elaborate zoom features like an option to show images on the screen in their original size;
(4) facilitates cooperation of scientists over the internet and novel uses of source material by image annotations and stable references that can be embedded in URLs;

Features and functions
list, create, read, update and delete annotation;
link annotation to part of the digital surrogate in case of image;

Back end
It is realized with Cocoon pipeline that interfaces digilib in case of image for linking annotation to parts of image, interfaces MySQL for storing schema in object container, interfaces JHOVE for object validation.

Front end
The administration front end is developed by XML and XSLT document into Cocoon framework and uses XForm for present schema to the user.

This is the template list to develop:
list, create, read, update, delete annotation templates;
technical schema with XForm template;
front end to digilib template.

Task
Annotation tasks
Back end tasks
list, create, read, update and delete annotation;
link annotation to part of the digital surrogate in case of image;
Front end tasks
list, create, read, update, delete annotation templates;
technical schema with XForm templates;
front end to digilib template.

5.5.15 Bibliographic Citations

Regardless of the object being referenced, whether print-based, audiovisual, electronic, or artwork, among others, most objects possess common elements from which a reference may be constructed. Among these common elements are "author" (someone or some group that has responsibility for the content of the material), a "title" (the name it carries), a place of "publication" (its place of origin), a "publisher" (the name of the organization or individual that issues the work), and a "date" (when the work was published or came to be known). Bibliographic elements are to be listed in a reference.

In constructing a bibliographic reference, the creator of the reference decides precisely what material needs to be cited. For example, a reference to an entire book would be appropriate on some occasions, while a reference to a single chapter would be more appropriate in other cases. A reference to an entire journal article would indicate one type of use for the material, while a reference to a table or chart in that article would indicate a different type of usage.

In order to accommodate the specificity required by some references, it is frequently necessary to include logically and hierarchically related components or subdivisions of a work. A reference to a journal article, which would include an author and a title, would still be useless without mention of the title of the journal in which it appears. A reference to a single song on a compact disk that is part of a six-disk set would need to include information about the song, the disk on which it is recorded, and the name of the disk set. A reference to a document that is part of a file stored in a database will likewise require information about three entities: the document, the file, and the database. These logical and hierarchical relationships are known as bibliographic levels.

For bibliographic citations, Z39 standard guidelines are used.
  Features and functions
  list, create, read, update and delete citations; citations have different standards, e.g. MLA style, Chicago manual of style, and others.
  Back end
It is realized with Cocoon pipeline that interfaces MySQL for storing schema in object container, interfaces JHOVE for object validation.
  Front end
The administration front end is developed by XML and XSLT document into Cocoon framework and uses XForm for present schema to the user.
This is the template list to develop:
  list, create, read, update, delete citations templates;
  Task
Citations tasks
Back end tasks
  list, create, read, update and delete citations;
  Front end tasks
  list, create, read, update, delete citations templates.

5.5.16 Product Description Metadata

The descriptive product metadata refer to information which describes products, such as standard product categories and information related to the product itself. This information can be useful for future applications such as e-commerce. The United Nations Standard Products and Services Code® (UNSPSC®) is used for product classification because it provides an open, global multi-sector standard for efficient, accurate classification of products and services. The UNSPSC® offers a single global classification system that can be used for: company-wide visibility of spend analysis; cost-effective procurement optimization; full exploitation of electronic commerce capabilities; among others.
  Features and functions
  list, create, read, update and delete product schema;
  use of ontology for standardization of category of product;
  Back end
It is realized with Cocoon pipeline that interfaces MySQL for storing schema in object container, interfaces JHOVE for object validation, interface Protege for ontology.
  Front end
The administration front end is developed by XML and XSLT document into Cocoon framework and uses XForm for present schema to the user.
This is the template list to develop:
  list, create, read, update, delete product templates;
  Task
Product descriptive metadata tasks
Back end tasks
  list, create, read, update and delete product schema;
  use of ontology for standardization of category of product;
Front end tasks
  list, create, read, update, delete product templates;

5.5.17 E-Commerce Metadata

This module permits the object to be integrated into an e-commerce system. The UNSPSC® has been used because it provides an open, global multi-sector standard for efficient, accurate classification of products and services. The UNSPSC® offers a single global classification system that can be used for: company-wide visibility of spend analysis cost-effective procurement optimization; full exploitation of electronic commerce capabilities; among others.
  Features and functions
  list, create, read, update and delete ecommerce schema;
  use of ontology for standardization of category of product;
  Back end
It is realized with Cocoon pipeline that interfaces MySQL for storing schema in object container, interfaces JHOVE for object validation, interface Protege for ontology, interfaces ecommerce for selling activities.
  Front end
The administration front end is developed by xml and xslt document into Cocoon framework and uses XForm for present schema to the user.
This is the template list to develop:
  list, create, read, update, delete ecommerce templates.
  Task
  Ecommerce metadata tasks
  Back end tasks
  list, create, read, update and delete ecommerce schema; use of ontology for standardization of category of product;
  Front end tasks
  list, create, read, update, delete ecommerce templates.

5.5.18 Assigning User Permission

The Administrator can empower users to set access permission to a DO, permitting the user to alter the metadata inherited by the DO from the community or collection. Permission can be set at the level of all DOs in a collection or in a community.

The types of permission are:
permission inherited by the DO parent (collection, community, parent DO in case of scheme)
permission to read, create, modify, cancel, and view history.
  Features and functions
  view, assign, remove permission on objects or part of DOs to users and groups;
  Back end
It is realized with Cocoon pipeline that interfaces MySQL for storing permission in DO container, interface to LDAP for users and groups.
  Front end
The administration front end is developed by XML and XSLT document into Cocoon framework.
  This is the template list to develop:
  view, assign, remove permissions on DOs or part of DOs to users and groups templates.
  Task
Assign permissions tasks
Back end tasks
  view, assign, remove permissions on DOs or part of DOs to users and groups;
Front end tasks
  view, assign, remove permissions on DOs or part of DOs to users and groups; templates.

5.5.19 Digital Object Mapping with Topic Maps

Polyhierarchical Browsing

A common feature of nearly every repository system, is the use of a hierarchy of nested containers for organizing and navigating through content, yet associative browsing allows an interested data consumer to wander across a repository in a guided manner. A user entering the repository via a query might also find associative browsing useful in increasing the chance of serendipitous discovery of relevant information giving users a way to completely bypass the structural organization of the data.

To emphasize this less linear approach to resource discovery and navigation, both conceptual and physically, a parallel navigational system, is built using a Topic Map (TM). Each time an object is cataloged, it is associated with one or more "topics" used to create the semantic layer of the TM. The TM creation can to some extent be automated utilizing tools such as TM4J, MDF and the TM Harvester. These automated tools can extract semantic data for each DO; said data can then be used to update the existing repository system TM.

The TM describes the growth of the content brought into the system as an evolution of interrelated dynamic information in a polyhierarchical environment. With each update to the repository, the Topic Map of the system is also updated to reflect the new additions, creating an expanding, dynamic subject index. Advantages of such TMs include: an efficient context-based retrieval of digital resources; and better awareness in subject-domain browsing; information visualization; customized views and adaptive guidance.

The problems of find ability, reusability, and share ability of a DO in the repository is solved by incorporating a semantic layer, based on conceptualization of the DO subject domain. The fundamental idea is to build a repository as both concept-based and ontology-aware. The implementation of such repository mapping utilizing the ISO XTM standard—XML Topic Maps, provides a means of organizing and retrieving information from the repositories in an efficient and meaningful way. This module permits the mapping of a DO within a Topic Map accessible from the Cataloger. The management of the Topic Map is external to the Cataloger, while the mapping of the DO takes place from within the Cataloger. ([rel. 18])

Features and functions
        list of Topic Map available and topic navigation;
        view, assign, remove mapping of the DO into the Topic Map.
    Back end
It is realized with Cocoon pipeline that interfaces MySQL for storing mapping in DO container, interface to TM4J for Topic Map access.
    Front end
The administration front end is developed by XML and XSLT document into Cocoon framework.
This is the template list to develop:
    list of Topic Maps available and topic navigation templates;
    view, assign, remove mapping of DO into Topic Map templates.
    Task
DO Mapping on TM tasks
Back end tasks
    list of Topic Map available and topic navigation;
    view, assign, remove mapping of DO into Topic Map.
    Front end tasks
    list of Topic Maps available and topic navigation templates;
    view, assign, remove mapping of object into Topic Map templates.

5.5.20 Submission Work Flow

The workflow model used for the Cataloger is simple. Digital Objects in the process of being cataloged are saved in a temporary area of the Cataloger called the "DO container" until the object has been approved for submission into the repository. When an approved DO is modified, a copy of the object is saved in the "DO container" where it undergoes the process of approval. Once approved, a new version of the DO is submitted to the repository.

Features and functions
        user submits a DO to the DO container to ingestion process; administrator
        the DO is approved and cataloged in the repository;
        the DO is not approved and must be modified and represented.
    Once submitted to the repository the object receives a Unique Universal Identifier (HANDLE/DOI).
    Back end
It is realized with Cocoon pipeline that interfaces MySQL for storing DO container in DO container, interfaces to Enhydra for workflow process.
    Front end
The administration front end is developed by XML and XSLT document into Cocoon framework.
This is the template list to develop:
    list of DOs in waiting state (private state, submitted, checked for revision, submitted for approval, checked in for approval) template;
    DO revision template;
    DO approve template;
    DO reject template;
    DO publish template.
    Task
Workflow tasks
Back end tasks
    user submits DO container to ingestion process;
    revise DO;
    approve DO;
    reject DO;
    publish DO.
    Front end tasks
    list of DOs in waiting state (private state, submitted, checked for revision, submitted for approval, checked in for approval) template;
    DO revision template;
    DO approve template;
    DO reject template;
    DO publish template.

5.5.21 URI

The Cataloger supports both the HANDLE system and its derivative the DOI.

Features and functions
        if possible, chose HANDLE/DOI domain for DO;
        assign identifier to DO.
    Back end
It is realized with Cocoon pipeline that interfaces MySQL for HANDLE/DOI domain, interfaces with the Fedora repository for generating unique identifier of the chosen domain, interfaces with the Handle server from Fedora for PID generation.
    Front end
The administration front end is developed by XML and XSLT document into Cocoon framework.
This is the template list to develop:
    list of HANDLE/DOI domain available templates.
    Task
UUID generation tasks
Back end tasks
    dynamic PID generator for Fedora based on HANDLE/DOI domain assigned to user request identifier for DO cataloging.

Front end tasks
list of HANDLE/DOI domain available templates.

5.5.22 Mapping Repository Objects

This module is fundamental for cataloging objects within FEDORA. The DOs created by the cataloger are subdivided into parent DOs and their respective children, thanks to the adoption of RDF.

Features and functions
the parent DO is converted into a FEDORA object containing:
attachments;
administrative metadata;
a link to the access policy memorized through DRAMA;
an RDF record which aggregates DO children (lineage);
new versions if a version already exists;
auditing of all operation carried out on the DO;
each custom schema is registered separately as a child DO in FEDORA and is aggregated to the parent DO via RDF.
The link to the access policy inherited by the parent (DRAMA);
an RDF record which connects to the parent DO (lineage);
new versions if a version already exists;
auditing of all operation carried out on the DO;
access authorization are saved external to FEDORA in a database managed by DRAMA framework;
a disseminator is created for the parent DO to collect children;
a disseminator is created for each child DO to collect their parent;
a disseminator is created for each child DO and parent DO in order to reconstruct the entire object in a single XML document;
the aggregate DO is indexed for search.

Back end
It is realized with Cocoon pipeline that interfaces Fedora for DO mapping, interfaces DRAMA for policy management, interfaces to Lucene Solr for indexing DOs.

Task
Object Mapping in Fedora
Back end tasks
map parent DO into Fedora
map attachment into binary datastream;
map administrative metadata;
link to policy stored in DRAMA DB;
create RDF datastream for lineage;
create version;
audit operation;
map custom schema into new child DO in Fedora;
link to policy stored in DRAMA DB;
create RDF datastream for lineage;
create version;
audit operation;
save authorization in DRAMA DB;
new disseminator for get child object;
new disseminator for get parent DO;
new disseminator for get entire object in XML;
indexing/re-indexing DO.

5.5.23 History and Versioning of DO

The History and Versioning module is linked to the Workflow module and permits a view of the entire history of a DO. Through the history it is possible to reconstruct all previous versions of a DO. Versioning permits the creation of new versions of a DO or to reconstruct previous versions of a DO. The DO object history also permits access to the metadata of the audit history of the DO object, which includes the information regarding the author of modifications, the date and the part of the DO which was modified. The history also permits an elaboration of the statistics related to cataloging of a DO, such as time spent cataloging and the accuracy of the cataloging information.

Features and functions listing
of all operations on an DO; list of all
version of an DO;
reconstruction of earlier versions.

Back end
It is realized with Cocoon pipeline that interfaces Fedora for getting history and for restore old version.

Front end
The administration front end is developed by XML and XSLT document into Cocoon framework.
This is the template list to develop:
list history of the DO or part of its template;
list version of the DO or part of its template;
restore old version template.

Task
History and versioning
Back end tasks
listing of all operations on a DO;
list of all version of a DO;
reconstruction of earlier versions;
Front end tasks
list history of the DO or part of its template;
list version of the DO or part of its template;
restore old version template.

5.5.24 Repository Search

Internal search of the repository is made with an external search engine interfaced by web services.

Features and functions search
DO type;
search schema type;
search for collection;
search for community;
search for user;
search for group of users;
search for metadata in selected schema.
results ordered by rank;
audit of search queries.
It is realized with Cocoon pipeline that interfaces Lucene Solr for getting link to the DO stored in Fedora.

Front end
The administration front end is developed by XML and XSLT document into Cocoon framework.
This is the template list to develop:
search criteria template;
result template.

Task
Searching tasks Back end tasks
search DO type;
search schema type;
search for collection;
search for community;
search for user;
search for group of users;
search for metadata in selected schema. results ordered by rank;
audit of search queries.
Front end tasks
search criteria template;
result template.

5.5.25 Statistics on Objects and Users

To generate statistics we will utilize the audit data gathered from the Cataloger users, operations carried out on a DO and audit data gathered from the search engine.

Features and functions user
statistics
auditing Cataloger access;
number of cataloging entries carried out in a given time and by who;
number of annotation entries carried out in a given time and by who;
number of citations entries carried out in a given time and by who;
number of schema utilized in a given time and by who;
statistics for each DO:
time to catalog a DO;
time to catalog a single schema;
number of modification per DO;
search engine statistics:
most common query;
object most searched for;
schema most frequently requested;
annotation most frequently requested.
Back end
It is realized with Cocoon pipeline that interfaces MySQL and Fedora for audit data.
Front end
The administration front end is developed by XML and XSLT document into Cocoon framework.
This is the template list to develop:
main template of statistics;
user statistics template;
auditing Cataloger access;
number of cataloging entries carried out in a given time and by who;
number of annotation entries carried out in a given time and by who;
number of citations entries carried out in a given time and by who;
number of schema utilized in a given time and by who;
statistics for each DO:
time to catalog a DO;
time to catalog a single schema;
number of modifications for each DO;
search engine statistics:
DO most searched for;
schema most frequently requested;
annotation most frequently requested.
Task
Auditing and statistics tasks
Back end tasks
user statistics
auditing Cataloger access;
number of cataloging entries carried out in a given time and by who; number of annotation entries carried out in a given time and by who; number of citations entries carried out in a given time and by who; number of schema utilized in a given time and by who;
statistics per DO:
time to catalog a DO;
time to catalog a single schema;
number of modifications per DO;
search engine statistics:
most common query;
DO most searched for;
schema most frequently requested;
annotation most frequently requested.
Front end tasks main
template of statistics;
user statistics template:
auditing Cataloger access template;
number of cataloging entries carried out in a given time and by who template;
number of annotation entries carried out in a given time and by who template;
number of citations entries carried out in a given time and by who template;
number of schema utilized in a given time and by who template;
statistics per DO template:
time to catalog a DO template;
time to catalog a single schema template;
number of modifications per DO template;
search engine statistics template:
most common query template;
DO most searched for template;
schema most frequently requested template;
annotation most frequently requested template.

6. Introduction: ADAMS: A Digital Asset Management System

Referring generally to FIGS. 1, 2, 5 and 6, the multilayered (preservation, semantic and Topic Mapped) and polyhierarchical representations of DOs created and archived with the PolyCat module can now undergo the process of metadata enrichment in the ADAMS module.

The A Digital Asset Management System ("ADAMS") permits the aggregation of DOs into Complex Digital Objects (CDO) and Complex Semantic Digital Objects ("CSDO").

The user has the ability of creating new CDOs by aggregating digital content and their associated metadata from various sources. The purpose of aggregation is to enrich the DO (parent) with associate information to help expand its description. This method also provides a finding aid for the parent DO. Associated resources (children) can also contribute to the actual cataloging process by providing descriptions, transcriptions, and references for a DO (parent). Consequently, metadata associated with a DO is enriched for subsequent data mining, information extraction (SPARQL) and reasoning (Pellet, GRDDL with WordNet) processes, enhancing search engine retrieval.

Another significant advantage of this, semantic, approach to digital asset management is that these types of DOs can be further interpreted and elaborated on by other semantic savvy applications. For example, in the semantic content management described herein, SPARQL queries and other techniques are be utilized to dynamically populate web based galleries and magazine containers (also referred to here as "Smart" galleries, magazine and albums) with content, to meet a user's interests.

6.1a. Data Aggregation Using SPARQL

The RDF framework (data model and related technologies) enables an optimal representation of semi or not structured data; that is with a minimal amount, or even without, constraints on the structure of the data. The query language SPARQL enables not only the extraction of data from an RDF data source (e.g., DO and the value of their attributes), but also of metadata information (e.g., which properties a DO can be associated with, or what domain restriction a property may have). These two complementary capabilities enable both more traditional data retrieval (e.g. "retrieve all paintings in a museum in Rome from the XVII century and their authors") as well as, the exploration of the data (e.g. "return all the properties associated to paintings"). SPARQL enables the arbitrary combination of these two querying paradigms.

In RDF/SPARQL query answering is the main tool to provide data aggregation. SPARQL enables property based aggregation; i.e., the possibility of retrieving collections of DOs (and their associated data) based on their characteristics, like attributes or being instance of a specific class (e.g., "retrieve all oil paintings in private collections" or "retrieve all paintings being in the same museum as the paint having the id oid:af56938").

A semantic infrastructure based on RDF lays its foundations on two different layers: the data layer and the semantic layer. The first (lower) layer is represented by the actual RDF graph, nodes are data (DOs and literals), and edges are properties connecting them. The second layer is the actual ontology (one or more ontologies, that's not relevant) which provide the additional semantic information.

Data can be queried at either the two levels (on the data layer or through the ontology), but the information extracted and the complexity of the query answering task can be dramatically higher when the semantic layer is involved.
To highlight the differences, at the data layer we can have information like object o1 is a Painting, and object o2 is a WorkOfArt; while at the semantic layer we can have information like the fact that any Painting is also a WorkOf Art. Let's consider the same query "give me all the objects of the class WorkOfArt": if issued at the data layer, the answer would be just o2; while if issued by taking into account the semantic layer as well then the answer would contain both o1 and o2.

An interesting property of the data model is that when you add information (e.g., considering the semantic layer as well) queries provide more results. That is, all the results of a query issued just at the data level will be valid results of a query issued by taking into account the semantic lever as well (it's the so called property of monotonicity).

Although SPARQL has been mainly designed to query just the data layer, it has been used for the combined semantic query answering.

Data presentation
Results from SPARQL queries can be returned either as a serialized RDF graph (using the CONSTRUCT operator) or a table with variable binding serialized in a pre-defined XML format. The table can be processed using standard XML based tools to generate web presentation forms.

6.1b. ADAMS (A Digital Asset Management System)
6.1.1. The Authoring Component:

As described above, in this inventive system a DO undergoes three primary cataloging processes (multi layered) during the ingestion or submission phase, these three DO versions also permit three different aggregation processes: referred to here as; DO aggregation, semantic DO aggregation, and resource mapping within the ADAMS Topic Map.

A partial listing of the types of resources that can be aggregated to a parent DO include but not limited to: images, text, bibliographic references, video, audio, web pages, web portals and other collections of DOs found in other distributed networks and archives. At this stage of aggregation, all DOs selected for possible aggregation are stored, with their metadata (RDF) in the ADAMS semantic repository (FIG. 1).

Any digital resource types can be aggregated into a CDO. In a preferred embodiment, the ADARTS portal, Complex Semantic Digital Objects (CSDO) are constructed utilizing advertising images (parent) with associated text based resources, including but not limited to, product reviews, among others (children) for the creation of what we refer to here as "Smart Ads".

The ADAMS component includes modules for:
Federated search;
Harvesting;
SPARQL queries;
Metadata aggregator: COO and SCDO creator;
Metadata editor and disseminator.
Multiple DO aggregating strategies
The ADAMS aggregator utilizes different strategies and technologies to find and to aggregate the digital resources from various available sources:

POLYCAT repository;
Trusted Federated Semantic Repository;
External SPARQL endpoint;
Semantic crawler;
Google;
Feed XML, RSS, Atom;
OAI-PMH (Open Archives Initiative Protocol for Metadata Harvesting);
Semantic repository of ADAMS.

ADARTS is a thematic web portal including an integrated web based system structured for the repurposing of collections of print based advertising collections, which utilizes a complete value added chain for the creation, cataloging, enrichment and distribution of these types of digital assets and includes a data base to manage and display historic corporate collections of print based advertising images and other print based product communications such product manuals, product reviews, product catalogs, corporate calendars, etc. Although the thematic topic of the prototype describes specifically the transformation of print advertising into Semantic Digital Marketing Object (SDMO), the application, cataloging system, data base, digital repository and distribution system can be used to transform any marketing communication into semantic digital marketing objects, encompassing but not limited to, all aspects of the field of advertising such as, external publicity (with geospatial tagging), video ads and audio jingles, web pages with associated metadata cataloging. This would also include the creation of SDMO born as such, and not only as the product of a transformation process regarding a physical multimedia asset. Even though the integrated, metadata centric system described here is tailored specifically to the repurposing of print advertising archives, the application developed and the innovative techniques utilized in this prototype, could also be applied to other thematic topics.

This thematic portal (and subject gateway) dedicated to the history of advertising in print (ADARTS), described in this document, is utilized to explore the Quantistic Marketing Method (QMM) and provides an opportunity to utilize the metasemantic advertising tools and techniques described in this document, as a distribution channel for web based brand advertising. The portal architecture and the data base model created specifically to manage the theme of the ADARTS portal, is an integral part of the DO metadata cataloging and attribution process, which organically contribute to the creation of the metadata associated with SDO (Semantic Digital Object) and CDO (Complex Digital Object) by attributing administrative and collections metadata to each object. This metadata is inherited through each phase of DO processing: Authoring, Publishing and Delivery.

The system utilizes an open, scalable, object-oriented architecture for the management and publication of digital multimedia assets. The architecture permits both the inclusion of assets from the dedicated ADARTS Digital Repository (ADARTS DR) or the inclusion of digital assets (DO) present in trusted federated repositories.

Referring to FIG. 2, The Advertising Arts (ADARTS) portal provides a single web based user interface for a collaborative environment, where archive owners can solicit commentary and value added content for their online galleries.

The system can be used for any type of multimedia content and here we describe an application tailored specifically to digital surrogates of print advertising. No system currently exists which provides archives of print based advertising with these innovative services. And to our knowledge, no similar system exists for the utilization of metadata associated to advertisement distribution and search engine optimization.

This system provides the semantic tools needed to permit the transformation of print based archives of advertising images into effective web marketing vehicles for the online distribution of brand messages and product information, to targeted end user groups. The application includes a set of software based tools to enrich the references associated with each single DO and the aggregation relevant content into CDOs. The DO is further enhanced through a secondary semantic cataloging. The resulting object is referred to here as a Semantic Digital Object (SDO). Referring to FIGS. 7, 8, and 9, a multilevel Metadata Format Filter (MEFF) can be applied to any CDO, at any level of the hierarchy of the CDO, to filter relevant metadata to extract references significant to a targeted market sector, for publication. The entire enrichment process works to select, distill and improve the quality of "semantic pointers" which refer to any digital original present within the system.

This system provides the semantic tools needed to build a portal structure used to publish CDOs. Portal structure is build by component named Presentation Digital Object (PDO). Each PDO component represents a navigation level of the portal and expresses express a default MEFF level filter. Using these tools PDOs are linked together to build the entire portal structure. In this way it is possible to separate content (CDOs) by layout (PDOs).

The system represents a complete value added work chain for transforming collections of advertising materials into Semantic Digital Objects (SDO) and their enrichment through their association with other DO, CDO and SDO, integrating systems to create, manage, enrich and distribute multimedia content. By creating a system for the creation and an effective management of the metadata of these digital assets, the digital archives of advertising images, through the process defined in and applied in this application, become effective web marketing tools for brand communications. The primary tools for web based advertising (Metasemantic advertising) described here are the Complex Digital Object Creator (CDOC), the Presentation Digital Object Creator (PDOC) the Metasemantic Digital Object Creator (MSDOC) and the Metadata Format Filter (MEFF).

6.12 the Aggregation Process
  the metadata of the resources is collected in ADAMS (JENA)
  it is bound (encapsulated)—and assigned a new URI
  the CDO, with all of its associated metadata is saved as a semantic copy in
  ADAMS—a semantic repository
  the metadata of the object (CDO or DO or SDO) is filtered and prepared for distribution towards the PDO
  also this instance of the CDO is "saved" in the semantic repository of ADAMS
  the surrogate digital content is loaded (imported) into the Publisher cache. In the case of portal ADARTS the MySQL DB, a component of the Publisher.

6.1.4 Digital Object Aggregation ADARTS

During the Authoring phase, a Digital Object (DO parent) can be enriched with (external) resources (i.e. information held in other institutional repositories) through a process of aggregation with other associated digital assets (DO children). This process of enrichment of a cataloged DO includes the search for and discovery of associated resources, their aggregation and the preparation of these aggregations for distribution across a chosen channel. The ADAMS component provides software modules, for the creation of these aggregations. They are referred to here as Complex Digital Objects (CDO) and Complex Semantic Digital Objects (CSDO).

The purpose of the creation of aggregations of DO or CDO is to enrich information of the parent DO with associated external resources (children). The structure of the CDO is similar to the DO created within the Cataloger component, except that the CDO can inherit external resources, as well as, predetermined aspects of those external resources.

ADAMS can be utilized with a second instance of FEDORA, which would be used as a database to archive the surrogate copies of parents and children DO from external repositories, as well as, the copies and versions of the aggregations (or Complex Digital Objects (CDO)) created during the process of digital object enrichment, for distribution.

Clients can choose to either maintain their archive within the ADARTS Digital Repository ("DR") or create and manage their own external DR. If ADARTS clients have opted to create their own DR for the preservation of their corporate documents and digital media assets, then their DR becomes part of the ADARTS Repository Federation (FIG. 1). When a customer's Digital Repository joins ADARTS Federation, surrogate copies are imported into the ADAMS for eventual publication on the ADARTS Portal. This open distributed architecture (OAI) permits a user to participate in the ADARTS portal project and maintain an independently managed corporate DR. It also provides users with the possibility of accessing multiple trusted digital repositories through a single unique gateway: ADAMS.

The surrogate DO (versions) present in ADAMS are periodically checked for cataloging updates of their digital originals that are held in the ADARTS DR.

The surrogates held in ADAMS can be synchronized with the digital original in the repository with the updates from the ADARTS DR (or other federated repositories). This is accomplished by a batch processing of the ADARTS system.

The Complex Digital Objects (CDO), composed of surrogate copies of their associated digital original (and their metadata) are stored in the ADAMS for publication on site. ADAMS is unique to the ADARTS project and includes a digital repository where the CDO, constructed by the Editorial Staff (FIG. 2.) from the cataloged assets present in the federated digital repositories are stored. These CDO surrogates are stored in the ADAMS for portal publication after final administrative approval.

The editorial work associated with gallery management, among others, is carried out either by the ADARTS Editorial Staff or by registered collaborators working for ADARTS users (account holders), responsible for data ingestion on the part of the user. After the digital originals have been registered into the ADARTS DR copies of the digital assets utilized for the construction of the CDO are imported from a DR into the ADAMS.

An architecture permitting the use of multiple instances of FEDORA possibly running on different distributed (and federated) ([ref. 17]) machines has been chosen to:
  assure data and system integrity through redundancy;
  permit maintenance on single repositories without disrupting the entire system;
  improve performance in searching and publication;
  provide a flexible and independent management architecture for participating external content providers.
  to permit the exposure of versions of archived resources to external harvesters while maintaining a preservation or internal version of DO and CDO for internal use, that is within the system.

6.1.5 Federated Search Module

ADAMS utilizes an instance of the Lucene Solr as a search engine for resource discovery. (FIGS. 1 and 4.) These searches can take place within "federated" repositories (see aDORe), within the repository dedicated to ADAMS, as well as, other external repositories. It is also possible to integrate additional search functionality utilizing web services, such as Google's SOAP (Simple Object Access protocol) search API.

6.1.6 Harvest Module

The Harvester module is based on the OAICAT software (Open Archive Initiative Cataloging Open Source Software) and permits the retrieval of objects from federated repositories, the ADAMS dedicated repository or from other external repositories, in the OAI-PMH (Open Archives Initiative Protocol for Metadata Harvesting) protocol.

6.1.7 Trusted Federated Semantic Repository;

Surrogate copies of the digital assets utilized for the construction of the CDO can also be imported into ADAMS from any trusted federated repository, where the digital media assets have previously been appropriately cataloged. Consequently, ADAMS provides a unique federation interface for asset ingestion when users are also DR (Digital Repository) owners. The cataloged single digital asset within the DRs are then ready to be enriched through annotations, citations or associations with other digital assets present within the Federated repositories (as described above) (FIGS. 1 and 4).

6.1.8 Content Authoring of Complex Digital Objects (CDO)

The Editorial Staff consults the ADARTS DR to select the DO to publish. Once the object has been chosen it is annotated or associated with other relevant content if available or requested by the user. The new CDO is then ready to be published and a surrogate copy is then stored in the ADARTS Portal Management System (PMS), awaiting final administrative approval and publication on the ADARTS portal.

The original metadata of the DO is stored in the repository where the Object (DO) was cataloged. Surrogate copies of these DO are then copied into ADAMS, where they can be used to create CDO. Finally, the surrogate and filtered MEFF version of the CDO (or SDO) which is published on the ADARTS portal is stored in the data base associated with the PMS of ADARTS, which in the actual prototype is a MySQL data base.

6.1.9 Working with ADAMS: CDOC

A collection of related simple DOs are brought together into a Complex Digital Object (CDO) by combining selected metadata from each single DO and enveloping them into a single Complex Digital Object. This "enrichment" of a single DO is accomplished with the help of the Complex Digital Image Creator ("CDOC") (see FIGS. 4 and 5).

The CDOC is an innovative cataloging and construction tool for CDO, with extensive editing and publishing features which are unique to the ADARTS project. CDOC and ADAMS have been designed specifically for the digital archive management and online publication needs of advertising image collections; however, it will be obvious to a person of ordinary skill in the art that the technology can be advantageously applied to any DO archive.

Surrogate copies of the CDO (and versions) as well as, surrogate copies of simple DO (digital objects) published on the ADARTS portal are stored in ADAMS. The digital originals containing their entire heredity of metadata are stored in the ADARTS DR or federated DR. ADAMS can be seen as the publishing repository interfacing directly with the ADARTS portal and the ADARTS DR acts as the long term digital preservation repository.

6.1.10 the Semantic Aggregation Process

In the event that a resource external to the system has been selected for aggregation, and this resource is without adequate semantic metadata data associated with it, the resource is first cataloged within the POLYCAT, to provide it with the minimum semantic information (semantic handle) to permit it to be aggregated and distributed within the system. (see FIG. 6)

The semantic representation or semantic surrogate copy of the DO that has been selected for inclusion in the enrichment process, and submission into the ADAMS repository, is then assigned a new DO identifier (URI). The semantic representations of these digital resources are then represented as SPARQL end points for future aggregation. Each DO and CDO held in the repository and submitted to the system has its respective SDO and SCDO version stored in the semantic repositories of the cataloger and ADAMS modules.

Once within the system, semantic resource discovery is semi-automated through a process resource discovery based upon information extraction utilizing SPARQL queries in conjunction with reasoners such as Pellet and GRDDL (Gleaning Resource Descriptions from Dialects of Languages) in conjunction with WordNet. Other similar extraction technologies to create semi-automatic semantic representations of text based resources include Text2Onto and D2RQ.

In the next phase the user selects the candidate digital assets and their related metadata, which have been previously cataloged in the POLYCAT, to associate with the parent DO and stored in the RDF triple store of the POLYCAT module.

During the Authoring phase, a Semantic Digital Object (SDO parent) can be enriched with semantic resources, through a process of aggregation with other associated digital assets (SDO children). This process of enrichment of a cataloged DO includes the search, discovery and extraction of associated resources, their aggregation into RDF graphs and their preparation for distribution across a chosen channel. The ADAMS component provides software modules, for the location, extraction and the aggregation of these semantic representations. They are referred to here as Complex Semantic Digital Objects (CSDO).

6.1.11 Semantic Digital Object Creator: SDOC

An example of Semantic Digital Object Collections (SDOC) is a grouping of DOs cataloged utilizing the same POV. SDOC is a semi-automated cataloging through inheritance of collections level metadata for each member of the collection. (See FIG. 8.)

6.1.11 Collecting Objects from External Source

"Non semantic" resources must be firstly cataloged—to be "annotated" semantically with a semantic instance stored in the semantic repository synchronized with the POLYCAT.

The first step in the process of semantic enrichment entails the creation of a surrogate copy of the DO that will be used for the enrichment process, and its submission into the ADAMS repository where it is assigned a new DO identifier which will be used as to envelope the CDO which will be enriched. In the next phase the operator selects the candidate digital assets and their related metadata, which have been previously cataloged in the POLYCAT, to associate with the parent DO. In the event that an resource external to the system has been selected for aggregation, and this resource is without adequate semantic metadata data associated with it, the resource is first cataloged within the POLYCAT, to provide it with the minimum semantic information to permit it to be aggregated and distributed within the system. In the event that it is not desirable or not feasible (for instance, when it is not permitted by a resource owner) to hold a copy of the DO used for aggregation within the ADAMS repository, the aggregation process can utilize a semantic surrogate (an RDF graph) produced through the cataloging process, or previously registered URI) can be utilized.

6.2 Aggregating Digital Objects into the ADAMS Semantic Repository

Once the CDO object representation has been completed and readied for publication the operator can filter the metadata associated with the CDO for a specific distribution channel utilizing the MEFF application. (See FIG. 6.)

6.2.1 Complex Digital Objects (CDO) Ingestion into Semantic Repository

The DO, after having been cataloged and classified, is saved within the systems semantic repository which will be utilized primarily for the semantic management of the DO from this point forward. The DO has already undergone the process of cataloging, revision, and approval at this point. (See FIG. 6.)

6.3. Mapping Digital Objects into the ADAMS Topic Map

CDOs can be retrieved by other search methods, by mapping them on to a Topic Map of the archive which represents the ADAMS repository. (See FIG. 6.)

6.4. The Ad Repository and Search

ADAMS utilizes a multiple user (multiple client) architecture, providing managed access to multiple local and remote repositories. When this is combined with the exemplary application, for managing digital archives of print based advertising, ADARTS, the overall system embodies a unified digital object registry and repository, capable of archiving digital copies of (all or any) print based advertisements and product related information. The archiving system includes a unique DO registry and semantic mapping of all advertisements entered into the system: by company, brand and product but not anyway limited to these three. This permits the interrogation and multi faceted search strategies made available through the search interface of the ADARTS portal.

7 Metadata Editor and Disseminator (MEFF)

The MEFF Module (or MEFF) ensures that the most effective and appropriate representation of the DO and its associate metadata are chosen for a distribution channel or specific distribution. Prior to publication of the CDO (aggregate), metadata attached to the CDO goes through an editing process. The CDO and SDO can be represented by all or by a part of the metadata which it inherits, as a parent from the Cataloger or from the aggregated resources (children). This qualitative approach to DO representation includes a flexible and tailor-made disseminator, which can be used to avoid the distribution of useless information for a given channel while maintaining the advantages of the lineage offered by the parent-child relationship. The MEFF Module can also act as a Metadata Management System (MMS).

7.1 the Metadata Editor and Publication: Metadata Format Filter

While the creation of CDOs offers the advantages of providing an unlimited number of annotations and associated content in one encapsulated object, by its very nature it also presents the risk of providing too much information to the viewer. To this end, a metadata format filter (MEFF) component has been developed, which functions by selecting, editing and distributing the metadata best suited to summarize the CDO and it contents, for any given distribution channel. An overview of the process CDO creation, metadata filtering and publication is described here.

The system described permits the processing of CDOs for publication by permitting the administrator to regulate the type of metadata which can be published for any given DO. Factors which could determine the metadata published for any given distribution channel could depend, for instance, on a client's requests or defined by a marketing specified need. The metadata utilized to represent a CDO during publication can be analyzed for visitor search behavior within the portal. In this way, the type of metadata published in a given distribution (for example the ADARTS portal) can be modified and better tailored to optimize access for a targeted user groups. This analysis can also be utilized for the modification of the structure of the CDO itself; for example, by adding additional associated DO to the CDO, best suited to the interests of a target market. The metadata selected for publication will be exported to external channels such as: harvester or web utilizing the Metadata Format Filter (MEFF) of the ADARTS (content management system). (See FIG. 7.)

The Metadata Format Filter can also be utilized to manage the publication of the content (DO) of the CDO and SDO in the chosen distribution channel. While filtering this metadata we can also sort the content that the metadata belongs to, dynamically populating galleries and magazine with content, and the metadata relating to these objects, using the MEFF filter and the appropriate templates (MSDO and PDO). This is used to publish content (instances) into specific web pages, galleries or magazines, while at the same time, selecting the metadata which will be published along with the DO in various parts of the page; for example in the "header" of the HTML document.

7.2 Metadata Editor and Publication: Format Filter

This software component, which has been designed, developed and applied to the selected theme of the exemplary distribution channel (ADARTS), permits the administrator extensive management and control of the metadata published within any chosen distribution channel. The management function enables the administrator to regulate the type of metadata which will be published for a given DO, in a given distribution channel, depending on the client's requests and marketing specified needs (ex.: SEO for target markets).

The metadata output can be tailored to optimize search engine requests (and therefore access) by target user groups. The administrator can regulate the metadata filters and authorize editorial staff to selectively edit and publish the metadata associated with a CDO based on various criteria. The metadata selected for publication can be exported to external channels such as: web, harvester or messaging utilizing the Metadata Format Filter (MEFF). The MEFF mechanism permits the administrator the possibility of selecting the types of metadata which will be visualized for all the services associated with a given ADARTS customer, such as a client's Gallery or Magazine. This will be the default profile metadata of the customer that could be customized by the customer itself on single service. The MEFF mechanism gives the administrator the ability of selecting the types of metadata which will be visualized for a DO during distribution. Consequently, the administer has the ability to regulate the ways in which the DO will be viewed and accessed by the visitor and by search engines.

The advantages of this approach, for the management of DOs, includes the ability to dynamically optimize for search engine placement of DOs, galleries or product categories within the ADARTS portal. The administrator can also provide tailored services to targeted user groups with focused semantic handles to specified assets.

7.3 MEFF Implementation: The ADARTS PMS (Portal Management System)

The particular application of the MEFF component described here was designed to meet the requirements of the exemplary distribution channel: the ADARTS portal. A portal can be considered as a CDO with its architecture designed around this concept, the metadata format filters (MEFF) can be applied from the highest level to the last node of the portal structure of the DO, taking advantage of the principles of inheritance and overloading. The portal can also manage, filter and publish metadata of the CDO on the chosen distribution channel; the filter can also be utilized to publish aggregated content. For instance, a POV sub level MEFF of a portal channel MEFF, permits the faceted browsing of the CDO and SDO instances, as cataloged in the POLYCAT.

In the exemplary embodiment, the ADARTS portal, the filter (MEFF) can be used to provide a stratified management of the metadata publication process, allowing for differentiated metadata publication for different types of portal pages: Home, Product, and individual Gallery Pages, on a system wide level.

As we move down the portal hierarchy, from general to more specific categories, the metadata published also can grow into greater detailed metadata. Utilizing the Summary and Detailed aspects of each MEFF filter, the system can also be used to manage the representation of portal content.

7.4 a Note on Object Oriented Programming 7.4.1 Inheritance

In object oriented programming, "inheritance" refers to the principle through which a "class" is defined as a child of another and inherits all of its properties and methods. Utilizing this principle of inheritance, the metadata format filter (MEFF) of the parent, if present is inherited by the DO children.

7.4.2 Overloading

In object oriented programming, "overloading" refers to the principle through which a class child can redefine (that is, while using a method of the same name, number and argument type) the class of the parent. In this case the parent filter will be "overloaded" and the child filter selected will be applied to the DO. Utilizing this method of overloading, it is possible to personalize the application of any filter at any level for any child DO.

In the case of ADARTS, the portal structure is not designed and utilized as a single Complex Digital Object but as a hierarchical structure of interconnected CDO. Each CDO is first collected by association with a topical context.

7.5 Levels

The first level of topical context is represented by the distribution channel itself (FIG. 7.); in the exemplary case described, the ADARTS portal and its home page. The second level of topical context is represented by the "product category", which describes each CDO (advertisement) as pertaining to a specific category of product (automobile, jewel, watches, cosmetics etc.). The third level is the customer (User Level MEFF). Each customer has own metadata profile. The fourth is represented by two topic contexts: the gallery and the magazine object types. On the fifth level, as a sub context to the gallery DO there is the gallery-item and as a sub context to the magazine, the issue. The sixth level is the article, which is a sub context of the issue. Follows is a description of the structure of the MEFF based on its context.

7.5.1 MEFF

If a filter has not been set, metadata will be published toward the chosen distribution channel in its entirety. The following example uses the MEFF filter developed for the ADARTS portal. (See FIG. 7.)

The MEFF user level filter permits the administrator to define a generic filter for a given customer and his services. The MEFF user level filter permits the administrator to define a generic filter for all services of a given customer (gallery, gallery-item, magazine etc). This filter is then applied to all of the DOs being published toward the chosen customer, that is, unless a filter with a greater value has been defined for use.

The filter can be set to operate on different levels (see: FIG. 7.):

MEFF channel level: channel level filter
MEFF category level: category level filter;
MEFF user level: customer level filter;
MEFF gallery level: gallery level filter;
MEFF gallery-item level: gallery-item level filter;
MEFF magazine level: gallery level filter;
MEFF issue level: gallery level filter;
MEFF article level: gallery level filter.

Each filter has a set priority regarding its application in regards to the output of its associated metadata:

MEFF channel level: priority 1;
MEFF category level: priority 2.
MEFF user level: priority 3;
Gallery collection:
MEFF gallery level: priority 4;
MEFF galleryitem level: priority.
Magazine collection:
MEFF magazine level: priority 4;
MEFF issue level: priority 5;
MEFF article level: priority 6.

Each filter is composed of two version or "views":
Summary View; and
Detailed View.

7.6. Summary View

The metadata filtered for the Summary View includes the essential metadata (of parent and children) needed to accurately represent the CDO (or DO). In the case of a distribution towards the ADARTS portal this representation of the CDO is published by means of the Meta Elements placed at the head of the XHTML document.

7.6.1 Detailed View

The Detailed View, provides a more extended view of the metadata available for the CDO. The Detailed View of the metadata is published in a page dedicated to an exploded view of the CDO. This page is accessed through the page containing the Summary View, through a "More info" link. The Detailed View of the metadata is published both in the Meta Elements at the head and in the body of the XHTML document.

7.7. Channel Level MEFF

The Channel Level MEFF permits the administrator to define a generic filter for the entire channel. This filter is applied to all of the DOs published on the channel. (See FIG. 7.)

7.7.1. Category Level MEFF

The Category Level MEFF permits the administrator to define a filter for a category (1 or n). This filter can be applied to all of the DOs in the category or categories selected unless a filter with a greater value has not been defined for use. For example if a category level MEFF is defined for title metadata and identification (ID) metadata, the category level MEFF will filter metadata and only permit publication of these two types of metadata (i.e., title and ID) for the categories selected.

If a gallery level MEFF filter has been created for a client's gallery, for example Gucci, has been set to publish metadata for: title, ID, and author, these take priority over the category level MEFF set for this category (to publish only title and id. metadata).

7.7.2. User Level MEFF

The User Level MEFF permits the administrator to define a generic filter for all of the services associated with a customer. This filter will then be applied to all of the DOs owned by the customer unless a filter with a greater value has not been defined for use (See FIG. 7).

7.7.3. Gallery Level MEFF

The Gallery Level MEFF permits the administrator to define a filter for a particular gallery (1 or n). This filter be applied to all of the DOs in that gallery, that is unless, for example, a MEFF gallery-item level (priority 5) has been set for a given gallery-item permitting the publication of additional metadata as selected by the administrator or editorial staff (See FIG. 7).

7.7.4 Gallery-Item Level MEFF

The Gallery-item Level MEFF permits the administrator to define a filter for a particular gallery-item (1 to 1). This filter takes precedents over any other filter utilized (FIG. 7.) with a lower priority.

7.7.5. Magazine Level MEFF

The Magazine Level MEFF permits the administrator to define a filter for a magazine (1 or n). This filter will then be applied to all of the DOs in that magazine, that is unless, for example, a MEFF issue level (priority 5) has been set for a given issue permitting the publication of additional metadata as selected by the administrator or editorial staff.

7.7.6. Issue Level MEFF

The Issue Level MEFF permits the administrator to define a filter for a particular issue (1 or n). This filter will then be applied to all of the DOs in that issue, that is unless, for example, a MEFF issue level (priority 6) has been set for a given article permitting the publication of additional metadata as selected by the administrator or editorial staff.

7.7.7. Article Level MEFF

The Article Level MEFF permits the administrator to define a filter for a particular article (1 to 1). This filter takes precedents over any other filter utilized with a lower priority.

7.7.8. Presentation Digital Object Creation

The Presentation Digital Object Creator (PDOC) permits the creation of template containers and defines templates of web pages as DO types, in their own right, with the characteristics of any other type of DO. This implies the need for processing or "cataloging" each template by assigning it relevant metadata. These DOs are referred to, in this document, as Presentation Digital Objects (PDO). (See FIG. 8.)

This system works as a PMS (portal management system) by permitting the Administrator to create the hierarchy of the portal structure, by concatenating the single PDO into complex objects (CPDO).

Each PDO acts as a container for digital objects of the portal, meaning that each PDO represents a web page containing content as a CDO. The administrator can define a default MEFF filter associated with the PDO by selecting metadata schema to be filtered. For example, if an administrator creates a PDO for the ADARTS Home Page, he could define a default MEFF channel filter for the web channel.

The Administrator can create PDOs with associated MEFF filters where the CDO will be filtered and published. These filters can be customized by CDO filters if present.

The administrator catalogs PDOs into ADAMS and defines a default MEFF level filter. Then he defines the portal structure by creating Complex PDO (CPDO) which represents the complete structure of ADARTS portal. The administrator provides final approval of template published toward any channel chosen.

The administrator can regulate the publication of updates to predefined time periods, to avoid a continual and unsystematic update of portal content (ex.: nocturnal updates to mailing lists). The content is made available to end users through the delivery channel selected.

7.8. Metasemantic Digital Object Creation

After the application of the appropriate metadata format filter/s, the publishing module permits the content (CDO) delivery toward the chosen PDO. Within the publishing module interface, the Metasemantic Digital Object Creator (MSDOC), the metadata filtered for the CDO, can be examined. This includes the possibility of examining the metadata associated with each single DO, the annotations associated with each DO, information regarding the collection to which a DO belongs, licensing information etc.) before final publication.

The MSDOC selects the appropriate PDO for publication on that channel. The MSDOC permits the publication of the metadata filtered (MEFF) for the CDO through a PDO container.

Final result will be a new DO containing semantic filtered information (MSDO) shown on the channel in Summary and Detailed view. In case of web channel, the result object will be a web page expressed in XHTML standard.

The administrator provides final approval of MSDO published toward any channel chosen. The administrator can regulate the publication of updates to predefined time periods, to avoid a continual and unsystematic update of portal content (ex.: nocturnal updates to mailing lists). The content is made available to end users through the delivery channel selected.

7.9. Metadata Centric Content Management System

As described above, through the use of the various levels of metadata format filters, the administrator is provided with a wide range of tools to manage the representation, expression, and publication of metadata for SDO and CDO, throughout the entire portal. By utilizing the Detail View of any given metadata format filter, the MEFF component also permits the publication of MSDO content within the body of an XHTML documents.

Through this system of metadata filters it is possible for the administrator and editorial staff to manage the output of metadata and content from the most complex DO to the simplest single DO published on the portal ADARTS.

7.10 ADARTS Magazine: An Example of MSDO

Let's take as an example, an ADARTS magazine with its associated issues, articles and galleries. Firstly, the magazine may be appropriately structured as a CDO. This will then permit the application of the Magazine, Issue and Article level MEFF, as well as, the Summary and Detail View function of the metadata format filter. With these key elements in place, we can then utilize the MEFF component as a metadata centric content management system, to manage the publication of the ADARTS magazine metadata and content. Then Administrator associate magazine CDO to magazine PDO for creating Magazine MSDO.

An overview of the structure of the metadata associated with an ADARTS Magazine would detail the metadata of the Magazine level, including a Summary View of the associated issue and articles, with a more extended description of each article placed in the body of the Magazine Cover Page via the Detailed View.

A magazine is composed of an issue, containing a "cover" which acts as the home page of the magazine issue, articles and if available, associated galleries. The metadata of the Summary View for a magazine will be published in the Meta Elements of the head of the "cover" XHTML document together with the metadata of the Summary View of each of the children DOs, for example the magazine articles. This will include a summary of the metadata resources for the magazine and children, such as the title of the article, the author's name and a short description of the article's contents. The application of the Detailed View of the magazine's MEFF, will expand upon the short description from the Summary View by making available the entire magazine publication with articles and any associated Galleries within the MSDO in XHTML format (ADARTS magazine), along with greater details of the other metadata described in the Summary View. The formatting and publication of the magazine in ADARTS, takes place using XSLT Transformations invoked by ADARTS PMS, to produce a representation of the MSDO in XHTML.

In this case, the metadata of the Summary View for each article will be published in the Meta Elements on the head of the XHTML document. This will include a summary of the metadata resources for an article, such as the title of the article, the author's name and a short description of the article's contents. The application of the Detailed View of the article's MEFF, will expand upon the short description from the Summary View by making available the entire article publication within the body of the XHTML document (ADARTS magazine article), along with greater details of the other metadata described in the Summary View.

The formatting and publication of the article in A DARTS, takes place using XSLT, to produce a representation of the object in XHTML.

Through this system of metadata filters it is possible for the administrator and editorial staff to manage the output of metadata and content from the most complex DO to the simplest single DO published on the ADARTS Portal.

8 Publisher

The Publisher is a component of the software which manages and optimizes the publication of the cataloged and aggregated Digital Objects (CDO and SDO) toward the chosen distribution channel. The Publisher also manages the interpretation of the CDO and SDO and its encapsulation in the Metasemantic Digital Object (MSDO). The interpretation is published on the chosen channel in the presentation templates (Presentation Digital Object or PDO) appropriate for the publication of the objects within the chosen distribution channel and instance. The metadata format filter (MEFF) can be considered as essential to both the ADAMS as well as, the Publisher component, in that the filters are modeled to mirror the architectural hierarchy of the chosen distribution channel. (See FIG. 1.)

Components that make up the Publisher:
Import module for surrogates from preservation repository
Import module for metadata from ADAMS semantic repository—SPARQL
Channel Cache
Template (MSDO) management
Template (PDO) management The Publisher describes a number of semantically savvy applications built to interpret the CDO, SDO and a semantic marketing object created in the previous two phases (authoring and enrichment) and enables their publication.

These applications utilize a semantic content management system, consisting of meta-semantic digital objects (MSDO) and Publication or Presentation Digital Object (PDO) modules. These software modules are used to create "smart" web based publication templates for the publication of CDO, SDO and the "smart ads" previously described and include systems for the creation and management of: a "smart gallery", "smart multi gallery", "smart magazine" and "smart visitor's album".

8.1 Filter Object Information

After the selection of the DO from ADAMS and its preparation for publication, including the selection and filtering of the metadata deemed appropriate for publication, chosen from all of the metadata cataloged and collected during the process of enrichment, the DO is ready to be imported into the Publisher's cache for publication.

8.2. Import Digital Object into Portal Cache

The DOs surrogates (for instance low resolution copies of images preserved in the repository) are imported into the Publisher cache component (MySQL) to speed content delivery from the portal to the channel instance end user and relieve ADAMS and the preservation repository of the burden of content transformation and extraction on the fly.

8.3 Digital Object Publication Component MSDO

During the Publication Phase, the digital assets which have been readied for publication and distribution are interpreted by the publication component for each specific distribution channel. In most cases, this entails the publication of previously cataloged and aggregated DOs, on the dynamic (semantic) web portal—ADARTS.

8.4 PDO—Presentation Digital Object

A template is used to interpret the CDO and represent it as a web page. We refer to this template as a PDO (Publication or Presentation Digital Object). The Publication component permits content (CDO and SDO) delivery toward the chosen PDO (Publication Digital Object) template, after the application of the appropriate disseminators (MEFF). The CDO is interpreted and disassembled for final publication in a single XHTML template.

The final publication DO created through the association of the CDO or SDO with the PDO is called a Meta Semantic Digital Object (MSDO). This component interprets the DO (CDO), disassembling it into its constituent parts for collocation in a preconfigured template for a web based presentation. The MSDO can be monitored by the Publication component for auditing purposes. The MSDO, thanks to the publication of its enriched metadata, permits an improved search engine indexing for the parent and children of the aggregated DO.

8.4.1 Template Creator: PDO Creator

This module creates Presentation Digital Objects (PDO) templates for web based distribution. The PDO template consists of 2 types of publication areas. The first area is where the parent DO will be published. The second area consists of, one or more secondary areas, in which child DOs will be displayed for instance as links to the child resources; in the alternative, the child is published in its entirety.

The ADAMS repository is interrogated for linked (children) DO for publication. Linked objects can also be expressed as web links to the DO itself, and the metadata pertaining to the DO is expressed in XHTML, within the header of the web page when the DO is published.

8.4.2 Template Management Module

This module manages the PDO templates (list, search, add, modify and delete) and are assigned to the CDO for publishing.

8.4.3 MSDO Management

The Publication component permits content (CDO and SDO) delivery toward the chosen PDO template (Publication Digital Object), after the application of the appropriate disseminators (MEFF). The CDO is interpreted and disassembled for representation as a MSDO by a PDO template. This module regulates the process of dissemination of metadata for channel publication.

8.4.4 MSDO Creator

This module manages MSDO objects (including such functions as list, search, add, modify and delete), created by the association of PDO templates to CDO and their publication on the web.

The administrator can regulate the publication of updates to predefined time periods, to avoid a continual and unsystematic update of portal content (ex.: nocturnal updates to mailing lists). The content is made available to end users through the delivery channel selected.

8.4.5 Metasemantic Digital Object Creation

The publishing module delivers the content (CDO) toward the chosen PDO, after the application of the appropriate metadata format filter/s. Within the publishing module interface, the Metasemantic Digital Object Creator (MSDOC), the metadata filtered for the CDO can be examined. This includes the possibility of examining the metadata associated with each single digital object, the annotations associated with each object, information regarding the collection to which an object belongs, and/or licensing information, among others, before final publication.

Final result will be a new DO containing semantic filtered information (MSDO) show on the channel in Summary and Detailed view. In case of web channel, the result DO will be a web page expressed in XHTML standard.

The administrator provides final approval of MSDO published toward any channel. The administrator can regulate the publication of updates to predefined time periods, to avoid a continual and unsystematic update of portal content (ex.: nocturnal updates to mailing lists). The content is made available to end users through the delivery channel selected.

8.5 Metadata Centric Content Management System

As described above, through the use of the various levels of metadata format filters, the administrator is provided with a wide range of tools to manage the representation, expression and publication of metadata for SDO and CDO, throughout the entire portal. By utilizing the Detail View of any given metadata format filter, the MEFF component also permits the publication of MSDO content within the body of an XHTML documents. (60)

Through this system of metadata filters it is possible for the administrator and editorial staff to manage the output of metadata and content from the most complex DO to the simplest single DO published on the portal ADARTS.

8.5.1 ADARTS Magazine: An Example of MSDO

Consider, as an example, an ADARTS magazine with its associated issues, articles and galleries. Firstly, the magazine may be appropriately structured as a CDO. This allows the application of the Magazine, Issue and Article level MEFF, as well as, the Summary and Detail View function of the metadata format filter. With these key elements in place, the MEFF component is utilized as a metadata centric content management system, to manage the publication of the ADARTS magazine metadata and content. Then the Administrator can associate magazine CDO to magazine PDO for creating Magazine MSDO.

A magazine is composed of an issue, containing a "cover" which acts as the home page of the magazine issue, articles and if available, associated galleries. The metadata of the Summary View for a magazine will be published in the Meta Elements of the head of the "cover" XHTML document together with the metadata of the Summary View of each of the children DOs, for example the magazine articles. This will include a summary of the metadata resources for the magazine and children, such as the title of the article, the author's name and a short description of the article's contents. The application of the Detailed View of the magazine's MEFF, will expand upon the short description from the Summary View by making available the entire magazine publication with articles and any associated Galleries within the MSDO in XHTML format (ADARTS magazine), along with greater details of the other metadata described in the Summary View. The formatting and publication of the magazine in ADARTS, takes place using XSLT Transformations invoked by ADARTS PMS, to produce a representation of the MSDO in XHTML. (61)

In this case, the metadata of the Summary View for each article will be published in the Meta Elements of the head of the XHTML document. This will include a summary of the metadata resources for an article, such as the title of the article, the author's name and a short description of the article's contents. The application of the Detailed View of the article's MEFF, will expand upon the short description from the Summary View by making available the entire article publication within the body of the XHTML document (ADARTS magazine article), along with greater details of the other metadata described in the Summary View.

The formatting and publication of the article in ADARTS, takes place using XSLT, to produce a representation of the DO in XHTML.

Through this system of metadata filters it is possible for the administrator and editorial staff to manage the output of metadata and content from the most complex DO to the simplest single DO published on the ADARTS Portal.

9 Semantic Marketing 9.1 Introduction: Context, and Usefulness of the Invention

It is neither desirable or prudent or obligatory to adopt only one approach to create semantic Digital Objects (DO). This application has discussed three methods to create semantic DOs. Adopting multiple approaches to prepare digital assets for (at least) the three different application and tools sets discussed in this application, their related retrieval systems and distribution channels produces an end result where the sum is greater than the part, offering services and capacities that no single system offers.

This method and system fills a need in the market place that currently is not being met. Content owners, faced with the enormous task of digitizing and cataloging their digital assets want to be sure that their assets are ready for the semantic market. The semantic market is a market place currently under construction. Core semantic technologies, such as ontologies, extraction and reasoning tools are evolving. The polyhierarchical system described in this invention, which combines three different approaches into one cataloging system offers the richest possible representation of a DO for present technologies as well as future semantic applications.

Although, the system described can be used to create complex semantic representations of any type of object, the exemplary applications detailed herein explains the usefulness of such a system by example, demonstrates a working system in use, conceived and designed specifically to meet the needs of a semantic marketing method.

9.2 Smart Ad Construction Process

This section describes an application of the system described herein. However, persons of ordinary skill in the art will realize that the system described herein can be used for other application. The application discussed is for the creation, enrichment and distribution of a specific type of DO referred to here, as a "Smart Ad" or semantically intelligent (polyhierarchical) digital marketing object. The Smart Ad is a Semantic Digital Marketing Object (SDMO), created as a digital semantic surrogate of a print based advertisement. Other examples of SDMO would be, for example, any type of print based or electronic marketing communication, such as such as web sites, web portals, web search results pages, product catalog, ecommerce system, audio visual brand communication (such as television advertisements), bill boards or any other "born digital" marketing object, among others.

The potential market for semantic ads, organically optimized for search engine retrieval is a larger market than convention print advertising because of the significant shift from print based ad spending and toward web based ad spending.

The Semantic Digital Objects (SDO) are utilized in the following section (Publishing) which describes other exemplary semantically savvy applications and novel utilizations of the inventive system, that have been built to interpret these Semantic Marketing Digital Objects (SMDO), enabling their publication and their utilization for market research. These applications utilize a semantic content management system consisting of meta-semantic digital objects ("MSDO") and the Publication or Presentation Digital Object (PDO) modules. In the novel application described these components are used to create "smart" web based publication of the "smart ads" described in the first part of this section and include systems for the creation and management of: a "smart gallery", "smart multi gallery", "smart magazine" and "smart visitor's album".

9.3 The Semantic Marketing Methods

This semantic marketing method includes 2 techniques for semantic marketing adapted and embodied by the exemplary application of the inventive system for (creating, enriching and publishing Semantic Digital Objects); the first is referred to here as Semantic and Metasemantic Advertising the second is referred to as Quantistic Marketing.

Semantic Advertising ("SA") and Metasemantic Advertising ("MSA"): Metadata Enrichment For Search Engine Optimization.

The first method details a utilization of the inventive system to create, manage, enrich and distribute the metadata representing a DO in order to improve and organically optimize it for search engine retrieval. This is referred to Semantic Advertising (SA).

9.3.1 Metasemantic and Semantic Search Engine Retrieval

Smart Ads as other Semantic Digital Objects (SDO), are linked semantically to other semantically significant content. As the semantic network of these relationships grows, well defined, referenced digital assets become the cardinal points for the associated description of other DO. Polyhierarchical defined Semantic Digital Objects (SDO) offer an optimized semantic positioning in a semantic network. One consequences of this is that the first well defined Semantic Digital Objects (SDO) available on line become part of the semantic mapping of the web itself. This equates to more visibility, which equates to a greater distribution of an ad, its message, the branding and the communications relating to the product, now and in the future.

9.3.2 The Quantistic Marketing Method (QMM)

Quantistic Marketing is an innovative approach to web marketing, loosely based on, Permission Marketing. Permission Marketing claims that current advertising techniques are developed around the idea of disturbing or interrupting a viewer's attention, to sell the viewer a product. In contrast to this approach, the theory QMM is that it is better to ask someone a viewer's permission before initiating a communication. The end result is a better quality communication with a potential client with the possibility of establishing a longer relationship. This marketing method offers potential clients different; information enriched perspectives of a standard corporate brand communication, by linking it with cultural, historical and artistic information describing or associated to the advertisement, to stimulate an active interest on the part of potential clients.

This semantic approach to marketing as called Quantistic Marketing Method, because the end user now has a navigational structure, which can be modified by the end user's search patterns, permitting him to find a DO from many POVs, depending on his varied interests. By offering potential clients the possibility of navigating among the many different possible ways of considering a product, a brand, or a company, which have been collected during the cataloging of the various Points of View (POV) related to product, the varied interests of end users can be met more effectively, with detailed, personalized and interactive communications of a product, a brand, a company and its related advertisements.

Information regarding: a product, how its made, the designed, by who, when, the history of the brand, the product, ad design, ad strategy, ad production process, the biography of the model in that ad, the biography of the photographer etc. are just a few examples of the types of information which may be of interest to a potential client. Each end user can create his own semantic ad by navigating between the POVs or different types of information which is personally appealing to the potential client.

As the world of commerce enters the "semantic market place", to make polyhierarchical multilayered product and brand information available to the enriches the end user experience, by gratifying curiosity and their attention with information of interest to them, which is some way associated to the brand owner.

9.4 The Smart Ad Construction Process

The Smart Ad described is a specific type of Semantic Digital Object (SDO) created utilizing a specific adaptation of the inventive system to meet the requirements of an inventive (semantic) marketing method. This Smart Ad is then processed: aggregated, enriched and prepared for distribution within the system described in the invention. This object is then distributed through an exemplary, web based search and discovery channel which is capable of interpreting the Semantic Digital Object (SDO) and distributing it.

The Semantic Digital Marketing Object (SDMO) construction follows the same three layer semantic description process as described during the Cataloging process.

9.4.1 An analog print based resource is digitized (scanned), cataloged and submitted to the preservation repository (FEDORA). This version can be "exposed" to external harvesters of other federated repositories for distribution. The DO is also harvested by the ADAMS component for aggregation process of DO enrichment and preparation for publication.

9.4.2 The topics (subjects) used to create each POV utilized during the cataloging process for this instance is registered in the Topic Map of the system. This creates a Topic Map of the DO instances deposited in the repository.

9.4.3 A third "semantic" representation of this object is also created, with an instance (an RDF graph) of this representation archived in the RDF triple store or also referred to as the Semantic Repository of the system. This RDF graph is also visualized—this represents a second mapping of the archive contents.

The analog print based advertisement now has three semantic representations. Each of these three representations can be utilized in different processes in different ways for example for enrichment, search retrieval and distribution. Each of these three semantic representations also creates a type of semantic handle which can be utilized by different applications, in different systems and in different ways, alone or in combination.

A prototype has been developed to demonstrate this concept of web marketing: each piece of relevant semantic information (descriptive metadata) associated to a digital surrogate of a print ad (SDO) represents a conceptual pointer linking to the SDO. Each "pointer" represents a distribution channel through which the SDO (ad) can be indexed by a search engine. Any DO can be described semantically from different points of view. For instance, an ad can be described as:

a technical corporate communication related a specific product;

a cultural artifact: an artifact of pop culture or work of art (Warhol);
as a photograph (Avedon);
as a process—the creative effort of various professional figures in an advertising agency;
as an award winning ad;
as a historical document relating to industrial archeology.

This is not intended to any way to represent a complete list of possible POVs or in any way limit the possible ways that the system could describe this type of DO.

Each "Point of View" (POV) can be described semantically utilizing a standardized (Dublin Core®, MODS) metadata schema and catalogued in a digital repository. As noted above, each part of the semantic descriptions catalogued for this DO, creates a pointer to the original DO (ad). And each point of view "enriches" the DO with information which may be of interest to potential clients or past customers, of the brand advertisement, which is the subject of this prototype which is an exemplary embodiment of the system and marketing method described in the invention.

10 Smart Ad

A Smart Ad is a multilevel (polyhierarchical) Semantic Digital Marketing Object. In the particular prototyped application we have chosen to valorize a collection of print based advertisement comprising various brands, different product types, or different companies pertaining to different epics that have been cataloged with multilevel descriptions of associated information such as but not limited by or constrained to:
  image
    process creation
    visual description
    technical characteristics
    versions
  brand
  company
  product
  design
  cultural artifact
  graphics
  marketing communication/s
  administrative
  print based distribution information
  a collaborative (collection) of different industrial and creative processes resulting in what can be referred to as an event—object.

This DO is then ready to be "enriched" with associated content from any of these perspectives, referred to here as Points of View (POV).

10.1 Semantic Marketing Methods

Semantic advertising (SA) is an innovative marketing system to create for the organic optimization of search engine indexing (SEO) and a end user navigational method (QMM) ready for retrieval by the next wave of semantic applications (MSA), semantic search engines being one example.

10.2 Smart Ad Cataloging Method

The method for creating the object includes a deconstruction of the advertising communication in collaboration with the client, into polyhierarchical descriptions or POVs. POV can also be defined, on a macro level, by the three ways we have chosen to catalog: CDO, semantic digital object (SDO), Topic Map (TM).

10.3 Smart Ad Enrichment

Described during the ADAMS processing.

The semantic marketing objects or Smart Ads created are interpreted and processed by the other two "generic" types of semantic application systems ADAMS and MEFF. That is; authoring and aggregating (in ADAMS) and distribution MEFF. The semantic watermark URI is registered on the ADAMS Topic Map and semantic repository.

10.4 Smart Ad Search and Distribution

Two other "specific" applications utilizing these Semantic Marketing Objects include the ADARTS portal and portal management system and the content management system used to create and manage on line Magazine.

10.5 Market Research

ADAMS utilizes a multiple user (multiple clients) architecture, providing managed access to multiple local and remote repositories. When this is combined with the exemplary application, for managing digital archives of print based advertising, ADARTS, the overall system embodies a unified DO registry and repository, capable of archiving digital copies of print based advertisements and product related information. The archiving system includes a unique DO registry and semantic mapping of all advertisements entered into the system: by company, brand and product but not anyway limited to these three. The system permits the interrogation and multi faceted search interface of the ADARTS portal which represents a subject gateway for multi taxonomy cross referencing of all product categories. In this way, the system permits a statistic analysis of user interactions with the archive and portal system, for all brands and all brand categories, without violating a user's privacy. This extends to an analysis of the semantic relationships between the DO being statistically examined, for example to see whether there is any other more hidden similarities between the ontological instances of the semantic representations of the different DO being viewed by visitors. This is a logical consequence of providing more detailed (polyhierarchical) cataloging of the DO, permitting a more detailed analysis of what is actually motivating interest and search activity. In this way user navigation statistic provides the system with the feed back needed for improving semantic DO representation, associated content aggregation and the optimization of the filtering of the metadata (MEFF) related to the SDO.

10.5.1 Marketing Analysis

Visitor traffic and behavior is registered and analyzed, with the scope of optimizing archive accessibility. Particular attention is dedicated to the relationship between user logs of the CDOs retrieved by particular user groups. With the scope of improving targeted user group access to particular archive content, the composition of the CDO is analyzed by the marketing team (see FIG. 2).

In ADARTS, the metadata for a CDO can modified (edited and published) principally in two ways: by either modifying the metadata filter of the CDO or by editing the individual components which make of the CDO. For example, regarding the second case, as the CDO is made up of the primary object and the metadata of digital objects associated to it, the behavior of the CDO can be modified through this association. The ADARTS concept of Quantistic Marketing, relates precisely to the managing the search optimization of a digital objects through the construction of CDO, composed of relevant related content.

The metadata associated with the objects and the way in which the CDO (complex digital objects) are sought and retrieved from the portal by particular user groups is analyzed by the marketing analyst. The marketing analysts then refer their findings and requests to the Editorial Staff. The editors work to improve search engine optimization and improve target group accessibility through a process of metadata editing (MEFF) and republishing associated metadata for these CDOs. Visitor behavior is then reanalyzed for clues to their primary interest and how this is reflected in the metadata retrieved.

10.5.2 Marketing Analysis: Phases

The marketing analysis process can be divided into distinct phases:
- the analysis of user navigation and a study of the metadata for the DO encountered for trends,
- an evaluation of the success of a search result;
- modification of metadata published for a DO to study changes in behavior (MEFF)
- modification of the types of metadata published for a DO (MEFF levels).

11. REFERENCES

1. Dublin Core® DC TYPE VOCABULARY DCAM (abstract model)
2. Apache Cocoon
3. Xforms: XForms is an XML format used for collecting inputs from web forms.
4. JHOVE: JSTOR/Harvard Object Validation Environment. JSTOR short for "*Journal Storage*"
5. Enhydra Shark Java XPDL workflow
6. OpenLDAP open source implementation of the Lightweight Directory Access Protocol.
7. DRAMA: Digital Repository Authorization Middleware Architecture
8. UNSPSC®: United Nations Standard Products and Services Code®
9. Protege
10. Fedora Relationship Ontology
11. RDFS: Resource Description Framework Schema
12. MySQL: My SQL
13. Jena semantic web framework for JAVA which supports the OWL (Web Ontology Language) language
14. Handle server
15. Digiprov
16. OWL: Web Ontology Language
17. aDORe: digital repository architecture
18. Pepper, Steve; Expressing Dublin Core® in Topic Maps, Oslo, Norway, 2007

12. APPENDIX A

The principle functions of the Authoring component Authoring:
ADAMS (A Digital Asset Management System)
The Authoring component is dynamic, built to permit the addition of metadata associated with any given DO over time. The more appropriate and relevant the metadata associated with a DO is the more the objects become accessible to the searches of the targeted user group. To enrich information of the object cataloged (DO) into repository, the Authoring component provide a tool for creation of aggregation of DOs named complex digital object (CDO).

The principle functions of the Authoring component are:
Author Administration
Authentication and authorization management;
LDAP authentication;
User management (account);
Policy management;
Community management;
Collection management;
Auditing and statistics on DOs and users. Digital Object Management
Ingestion Complex Digital Object (CDOC).
Create a DO of specified type;
Work-flow for ingestion;
import cataloged DO or part of it into ADARTS Digital Asset Management System (ADAMS);
filter information to inherit from DO;
Assign permission to users and groups;
Mapping of the DO;
Unique universal identifier DOI or Handle system;
Map the DO into repository;
History and Versioning of DOs;
Multi Repositories search;
export Complex Digital Object (CDO) with filtered data.

13. APPENDIX B 13.1 the Principle Functions of the Publication Component

The Publication component represents the last phase in the value chain for the creation of information enriched DOs. This component, prepares digital content objects (DO) cataloged in the repository for final distribution towards a chosen channel. The Administrator is provided with a wide range of tools to manage the representation, expression and publication of the metadata representing DOs, as well as, the presentation of the DOs themselves.

In this phase, the CDO (complex digital object) undergoes a process of selective dissemination, determined in part by the requirements of the distribution channel and in part by considerations for guaranteeing an optimal representation of the CDO, for a given channel. The metadata of the CDO can be examined in the Meta Semantic Digital Object Creator or MSDOC. This module permits the examination of the metadata associated with each part of a CDO (parent and children), the annotations associated with each object, information regarding the collection to which an object belongs and licensing information before final publication. The MSDOC, permits selection of the appropriate PDO template (Presentation Digital Object) for channel publication as well as, providing information regarding the particular disseminator for the CDO through a PDO container.

The resulting object, containing a dissemination of selected semantic information, is referred to as a Meta Semantic Digital Object (MSDO). In the case of a web channel, the object MSDO, will be a web page expressed in XHTML standard.

The principle functions of the Publication component are:
Publication Administration
  Authentication and authorization management;
  LDAP authentication;
  User management (account);
  Policy management;
  Category Management;
Auditing and statistics of DO and users;
  Disseminator management;
  Presentation Digital Object Management Ingestion;
  Presentation Digital Object (PDOC). Create a DO of a specified type;
  Work-flow for ingestion;
  Import cataloged DO from ADAMS;
  Filter information to inherit from DO;
  Assign permission to users and groups;
  Mapping of the DO;
  Unique universal identifier DOI or Handle system;
  Map the DO into repository;
History and Versioning on digital objects;
  Meta Semantic Digital Object Management Ingestion
  Meta Semantic Digital Object (MSDOC).
  Create a DO of a specified type;
  Workflow for ingestion;
  Map PDO into template objects (MSDOC) for publication;

Select information to inherit from DO during dissemination;
Assign permission to users and groups;
Mapping of DO;
Unique universal identifier DOI or Handle system;
Map DO into repository;
History and Versioning of DOs;
ADAMS Repositories search;
Publication Web Channel;
Publish category of DOs;
Publish gallery of DOs;
Publish single DOs;
Search DOs;
Publish DO in reserved area;
Request detailed information about DOs

14. APPENDIX C DATABASE DESIGN: ADARTS

Below is a listing of the collection of logic schema for the database of the application with the functionality of each entity listed is briefly described, its relative table displayed and their associate relationships defined. An entity relationship diagram (ERD) for the database of the application is included (FIG. 9).

In the following tables we have omitted the software related to the digital repository, contact management, the accounting system, business intelligence, banner management and the help desk system, as these functions are executed by external applications interfaced with ADARTS.

14.1. Users
Customer: Data relative to the customers (FIG. 9; table customer);
Data relative to the user roles (FIG. 2);
Data relative to the visitors (FIG. 9);
14.2. Categories
Data relative to the product categories;
14.3. Brand
Data relative to the brand (FIG. 9. table brand);
Data relative to the brand associated to category (FIG. 9; table brandcategory);
Data relative to the brand associated to a user (FIG. 9; table branduser);
14.4. Gallery
Data relative to the gallery (FIG. 9; table gallery);
Data relative to the gallery type (FIG. 9; table gallerytype);
Data relative to the gallery list (FIG. 9; table costtype);
Data relative to the state of payment for the gallery (FIG. 9; table gallerypaying);
Data relative to the state of the gallery (FIG. 9; table gallerystatus);
Data relative to the multigallery (FIG. 9; table gallerymultigallery);
Data relative to the gallery templates (FIG. 9; table templatelist);
Data relative to the template type (FIG. 9; table templatetype);
Data relative to the visitor gallery: album (FIG. 9; table visitorsgalleryitem);
14.5. Galleryitem
Data relative to the galleryitem (FIG. 9; table galleryitem);
Data relative to the version of the galleryitem (FIG. 9; table galleryitemversion);
Data relative to the type of version of the galleryitem (FIG. 9; table version);
Data related to the status of a galleryitem (FIG. 9; galleryitemstatus)
Data relative to the galleryitem of a category (FIG. 9; categorygalleryitem);

14.6. Metadata: Dublin Core® (DC)
Data relative to the metadata of the object (FIG. 9; metadata);
14.7. MEFF: Metadata Format Filter
Data relative to the MEFF metadata schema (FIG. 9; table MEFF_nnetadata_schema);
Data relative to the MEFF metadata attribute (FIG. 9; table MEFF_metadata_attribute);
Data relative to the MEFF filter metadata (FIG. 5; Ref. 14.—table
MEFF_filter_metadata);
Data relative to the MEFF type (FIG. 9; table MEFF_type);
Data relative to the MEFF channel (FIG. 9; table MEFF_channel);
Data relative to the MEFF filter (FIG. 9; table MEFF_filter);
Data relative to the MEFF filter channel (FIG. 9; table MEFF_filter_channel);
Data relative to the MEFF filter category (FIG. 9; table MEFF_filter_category);
Data relative to the MEFF filter gallery (FIG. 9; table MEFF_filter_gallery);
Data relative to the MEFF filter galleryitem (FIG. 9; table MEFF_filter_galleryitem);
Data relative to the MEFF filter user (FIG. 9; table MEFF_filter_user);
Data relative to the MEFF filter article (FIG. 9; table MEFF_filter_article);
Data relative to the MEFF filter issue (FIG. 9; table MEFF_filter_issue);
Data relative to the MEFF filter magazine (FIG. 9; table MEFF_filter_magazine);
14.8. Magazine
Data relative to the magazine (FIG. 9; table magazine);
Data relative to the state of a magazine (FIG. 9; table magazinestatus);
Data relative to the magazine issue (FIG. 9; table magazineissue);
Data relative to the state of the issue (FIG. 9; table magissuestatus);
Data relative to the article (FIG. 9; table article);
Data relative to the state of the article (FIG. 9; table magarticlestatus);
Data relative to the article associated to a category (FIG. 9; articlecategory).
14.9. Contact Directory
Data relative to contacts associated with a user (FIG. 9; contactdirectory);
Data relative to types of contacts (FIG. 9; contactdirectory type).
14.10. Other
Data relative to the country (FIG. 9; countrycodes);
Follows is a brief description of the principle information collected.
14.10.1. Customer: Data Relative to the Customers
The table relating to the Customer contains information related to the clients with permission to utilized the services offered by the application.
Information regarding each user includes: id. user, username, password, vital statistics, product category assigned. The collection and related administrative metadata associated with each Users type, is registered or cataloged for each new Customer just as it is for each Customer's respective multimedia content entered into the archive.
The scope of this is to facilitate the mutual enrichment of the metadata associated with any DO or collection through the creation of Complex Digital Objects (see CDOC) with final benefit of improving search ability internally within the system and externally toward search engine indexing or institutional harvesting.

It is possible to configure the Customer profile to consent collaborators access to the same account but with different levels of access and associated functionality. It is possible to configure the user profile to consent a determined functionality. It is possible to configure user accounts to permit digital resource sharing and collaborative authoring. It is possible to configure user accounts to permit administrative tracking of digital resource licensing per Customer account.

User management is centralized to permit the incorporation of a variety of user services (banner, forum, helpdesk, business intelligence and accounting) into a single interface.

TABLE SCHEMA

```
`id` int(11) NOT NULL auto_increment,
`username` varchar(255) NOT NULL,
`password` varchar(32) NOT NULL,
`lastname` varchar(255) default NULL,
`firstname` varchar(255) default NULL,
`additionalname` varchar(255) default NULL,
`namesuffix` varchar(255) default NULL,
`namepreffix` varchar(255) default NULL,
`title` varchar(255) default NULL,
`street` varchar(255) default NULL,
`postalcode` varchar(255) default NULL,
`city` varchar(255) default NULL,
`province` varchar(255) default NULL,
`country` varchar(255) default NULL,
`companyname` varchar(255) default NULL,
`website` varchar(255) default NULL,
`phone` varchar(100) default NULL,
`fax` varchar(100) default NULL,
`cell` varchar(100) default NULL,
`level` int(11) NOT NULL default 'O',
`bossid` int(11) default 'O',
`productcategory` int(11) default '18',
`custom4` varchar(255) default NULL,
`custom5` varchar(255) default NULL,
`info` text,
`datecreate` date NOT NULL default '0000-00-00',
```

Relationships

The relationship between Customer and galleryitem is 1:n.
The relationship between Customer and gallery is 1:n.
The relationship between Customer and a template is 1:n.
The relationship between Customer and the owner of a magazine is 1:n. The relationship between Customer and nation is 1:1.
The relationship between Customer and category is 1:1.

14.10.2. Data Relative to User Roles

The table relating to the User Roles contains information related user with permission to utilized the application. Information regarding each user includes: id. user, username, password, vital statistics. It is possible to configure the user profile to consent collaborators access to the same customer account but with different levels of access and associated functionality. It is possible to configure the user profile to consent a determined functionality.

These are current configurations of the categories of Users
Administrator
Corporate
Collaborator
Professional
Agency
Publisher
Magazine Author
Magazine Editor
Visitor Administrator: the administrator of the application. The administrator can execute any operation. The Administrator can to manage Users, assign and assign portal based services (galleries, magazines, banners), define user profiles and select and modify the structure of the templates, manage product categories and brand, manage templates for presentation, banners, forum, helpdesk and manage the accounting of the portal and associated statistics. The administrator is the recipient of all technical error messages. The administrator provides final approval of any content published on the portal before publication. The administrator will also be responsible for setting the permission regarding the construction of Complex Digital Objects for publication from internal and external data sources.

Company: the company can manage a digital archive of a collection of DOs pertaining to that company. Company user can modify the profile of the company's vital statistics, create and assign user type "collaborator" accounts, catalog digital objects (utilizing an extended Dublin Core® Metadata scheme), consult their personal archive of DOs, manage gallery or galleries of DOs or magazines.

Collaborator: a Collaborator is a sub category of the Company user type. Depending on the permission granted by the Company account administrator, the collaborator can: modify the profile their personal vital statistics catalog DOs (utilizing an extended Dublin Core® Metadata scheme), consult their personal archive of DOs, manage gallery or galleries of DOs or magazines.

Agency: the user type Agency (which includes advertising agency, modeling agency, talent agency) is can manage a digital archive of a collection of DOs pertaining to that company. Agency user can modify the profile of the company's vital statistics, create and assign user type "collaborator" accounts, catalog digital objects (utilizing an extended Dublin Core® Metadata scheme), consult their personal archive of DOs, manage gallery or galleries of digital objects or magazines. Through mutual consent Agency galleryitems and galleries can be associated with Company (and/or Professional and/or Agency) galleryitems and galleries to mutually enrich the DOs present in both archives, through a process of metadata annotation.

Professional: professional account owners include photographers, graphic studios, freelance advertising professionals, copy writers, directors, musicians etc. Professional users can modify the profile of the their personal vital statistics, create and assign user type "collaborator" accounts, catalog DOs (utilizing an extended Dublin Core® Metadata scheme), consult their personal archive of DOs, manage gallery (portfolio) or galleries (portfolios) of DOs or magazines (bibliographies and cv). Through mutual consent Professional galleryitems and galleries can be associated with Company (and/or Publisher and/or Agency) galleryitems and galleries and Agency galleryitems and galleries to mutually enrich the DOs present in both archives, through a process of metadata annotation.

Publisher: a Publisher user account is tailored to meet the needs of editors or publishers of print based periodicals. ADARTS offers these type of clients the possibility of creating and managing on line facsimiles of their print based publications as well as providing tools to manage digital archives of their publication. Publisher users can modify the profile of the company's vital statistics, create and assign user type "collaborator" accounts, catalog DOs (utilizing an extended Dublin Core® Metadata scheme), consult their personal archive of DOs, manage gallery or galleries of DOs or magazines. Through mutual consent Publisher galleryitems, galleries, articles and magazines can be associated with a Company galleryitem and/or gallery and Agency galleryitems and galleries to mutually enrich the DOs present in both archives, through a process of metadata annotation. This type of account is provided with a Magazine. A magazine is composed of issues, issues are composed of articles, articles are associated each with a gallery. The Publisher account owner is provided with two collaborator types:

Editor: the Editor manages the publication of a Magazine issue, the Editor assigns Authors to an article, approves the final version of the article to be published in a magazine. The Editor can modify their own vital statistics, assume Authors and create the galleries associated with issue articles.

Author: The Author catalogs articles related to a magazine issue which may receive the Editors approval before being published. The Author can modify their own vital statistics and edit the galleries associated with issue articles.

Visitor: A Visitor is a registered ADARTS portal visitor. Once registered the Visitor can utilize a number of functions designed to aid their navigation. These include the possibility to save images from the archive during a visit to the portal in Albums that they can consult on their return to the portal. Visitors can also send e-cards (electronic post cards) as e-mails to recipients of their choice.

Anonymous: unregistered users also can access the site, browse galleries and search archives.

User management, during this phase of prototyping, is a function of the actual CMS utilized.

This User Management Service will be integrated into the broader architecture of the Digital Repository Federation, once implemented, as described below. User management is centralized to permit the incorporation of a variety of user services (banner, forum, helpdesk, business intelligence and accounting) into a single interface.

Each Role is assigned services to which each user (customer) pertaining to that role can access. In this section, dedicated to "User Roles", the table description of roles is omitted, as it is handled by an external application (FEDORA), and integrated into ADARTS.

14.10.3. Data Relative to Visitors

The table of the visitor contains information relative to the visitors who registered to utilize the portal. Information such as id. visitor, username, password, age, nationality and email address are managed for each registered visitor.

TABLE SCHEMA

`id` int(11) NOT NULL auto_increment,
`username` varchar(255) NOT NULL,
`password` varchar(255) NOT NULL,
`age` int(11) NOT NULL default 'O',
`countryid` int(11) NOT NULL default 'O',
`email` varchar(255) NOT NULL, Relationships
The relationship between visitor and nation is n:1.
The relationship between visitor and galleryitem is 1:n.

14.10.4. Data Relative to Product Categories

The category table contains the information related to the product categories utilized on the portal. Each product category can contain product subcategories or directly product brands.

Types of information such as: id. category, description and parent category are managed for each product category and product subcategory.

TABLE SCHEMA

`id` int(11) NOT NULL auto_increment,
`description` varchar(50) NOT NULL,
`parent` int(11) NOT NULL default 'O', Relationships
The relationship between a category and magazine is 1:n.
The relationship between a category and is 1:n.
The relationship between a category and gallery is 1:n.
The relationship between a category and user is 1:n.
The relationship between a category and galleryItem is 1:n.
The relationship between a category and the position of a galleryitem is 1:n.
The relationship between a category and a brand belonging to that category is 1:n.

14.10.5. Data Relative to Brand

The table related to associated brand contains the information dealing with brand of a given product category utilized on the portal. The brands present in the portal are listed with and associated to a particular product category. Information such as brand and name are managed for each.

TABLE SCHEMA

`id` int(11) NOT NULL auto_increment,
`brandname` varchar(255) default NULL,

Relationships
The relationship between a brand and brand pertaining to a category is m:n.
The relationship between a brand and a brand associated with a user is n:m. The relationship between a brand and galleryitem is 1:n.

14.10.6. Data Relative to Brand Associated to the Category

The table related to the brands pertaining to the category contains the association between brand and category. Information such as: id., brand id and id category id, is managed for each brand.

TABLE SCHEMA

`id` int(11) NOT NULL auto_increment,
`brandid` int(11) default 'O',
`categoryid` int(11) default '1', Relationships
The relationship between brand pertaining to a product category and brand is 1:1.
The relationship between brand pertaining to a product category and category is 1:1.

14.10.7. Data Relative to Brand Associated to the User

The table related to the brands pertaining to the user contains the association between brand and user. Information such as: id., brand id and id user id, is managed for each brand.

TABLE SCHEMA

`id` int(11) NOT NULL auto_increment,
`brandid` int(11) default 'O',
`userid` int(11) default '1', Relationships
The relationship between brand pertaining to a user and brand is 1:1. The relationship between brand pertaining to a user and user is 1:1.

14.10.8. Data Relative to Gallery

The gallery table contains the information related to the gallery in which the galleryitems are published. Galleries are allocated to users. For each gallery, information such as: id., title, subtitle, summary, title of original publication, date of publication, cost type, category, copyright holder, associated keywords, principal associated user, collaborator, gallery parent, state, type, text, first image in gallery, associated template, state of payment, company, contact info, corporate profile, history of the product, name of advertising agency. The ADARTS table contains a pointer to the metadata pertaining to any given DO, stored in the digital repository.

There are different types of galleries:
- Single gallery: a gallery which contains a limited number of galleryitem;
- Chronological gallery: a gallery which contains a limited number of galleryitem in chronological
- Multigallery: a gallery which contains a maximum of 5 other galleries.

A gallery can be associated to a price list which indicates the cost and duration of the service.

This price list is contained in the entity price list of the gallery.

The state of payment can be highlighted for a gallery utilizing the state of payment entity of the gallery. A gallery can have the following different payment states:

For each gallery the state of payment is registered, in this way account management can track payments due for a specific gallery account:
- pending: gallery allocated by the administrator to the client but awaiting payment;
- paid: gallery allocated by the administrator to the client and paid;
- free: gallery allocated offered free of charge (demo gallery);

Galleries may pass through an approval stage before being published on the portal and can pass through different phases before final approval:
- Allocated: a gallery has been allocated to a user by the administrator;
- Submitted: a gallery has been populated with galleryitems and is in the state of prepublication awaiting publication approval;
- Rejected: a gallery has been refused publication during the process of approval;
- Approved: a gallery has been approved by the administrator and published;
- Demo Mode: a gallery has been created and published by passing the steps of approval because it is utilized for demonstrative purposes.

TABLE SCHEMA

```
`id` int(11) NOT NULL auto_increment,
`costtype` int(11) default NULL,
`category` int(11) default 'O',
`customerid` int(11) NOT NULL default 'O',
`parentid` int(11) NOT NULL default 'O',
`status` int(11) NOT NULL default 'O',
`type` int(11) NOT NULL default 'O',
`gallerytemplate` varchar(255) default 'O',
`paying` int(11) NOT NULL default 'O',
```

Relationships

The relationship between gallery and gallery type is n:1. The relationship between gallery and gallery list is n:1.
The relationship between gallery and state of payment of the gallery is n:1. The relationship between gallery and state of the gallery is n:1.
The relationship between gallery and multigallery is m:n.
The relationship between gallery and galleryitem is m:n.
The relationship between gallery and customer is n:1.
The relationship between gallery and category is n:1.

14.10.9. Data Relative to Gallery Type

The table related to gallery types manages information such as: id. and description.

The gallery types are:
- Single gallery: a gallery containing a limited number galleryitem;
- Chronological gallery: a gallery containing a limited number galleryitem organized chronologically;
- Multigallery: a gallery containing not more than 5 galleries.

TABLE SCHEMA

```
`id` int(11) NOT NULL default 'O',
`description` varchar(255) NOT NULL,
```

Relationships

The relationship between gallery type and gallery is 1:n.

14.10.10. Data Relative to the Gallery List

The table of gallery lists manages information such as: id., name, type, duration of service in days, duration of service in months, duration of service in years, cost.

TABLE SCHEMA

```
`id` int(11) NOT NULL default 'O',
`name` varchar(255) NOT NULL,
`type` int(11) NOT NULL default 'O',
`days` int(11) NOT NULL default 'O',
`months` int(11) NOT NULL default 'O',
`years` int(11) NOT NULL default 'O',
`cost` float NOT NULL default 'O',
```

Relationships

The relation between gallery list and gallery is 1:n.

14.10.11. Data Relative to State of Payment for a Gallery

The table related to the state of payment for the gallery contains information related to the state of payment of portal and gallery services, such as: id. and description.

The state of payment for gallery services has the following values:
- pending: gallery allocated but awaiting payment confirmation;
- paid: gallery allocated and payment confirmed;
- free: gallery allocated without charge (demo gallery).

TABLE SCHEMA

```
`id` int(11) NOT NULL auto_increment,
`description` varchar(255) NOT NULL,
```

Relationships

The relation between the state of payment for the gallery and the gallery is 1:n.

14.10.12. Data Relative to State of a Gallery

The table related to the gallery state contains information related to the states a gallery can assume and manages types of information such as: id. and description.

The states that a gallery can assume during its approval process are the following:
- preview: a prepublication state where the issue can be reviewed;
- published: issue has been approved and is actually online visible to all portal visitors;

archived: the issue has been moved to the archive where it can be searched and retrieved in whole or in part.

TABLE SCHEMA

```
`id` int(11) NOT NULL auto_increment,
`description` varchar(255) default NULL,
```

Relationships
The relationship between the gallery state and the gallery is 1:n.

14.10.13. Data Relative to a Multigallery

The multigallery table contains information regarding galleries pertaining to a multigallery such as: id., id gallery multigallery type, id gallery, gallery position in the multigallery. A multigallery can contain a maximum of 5 galleries.

TABLE SCHEMA

```
`id` int(11) NOT NULL auto_increment,
`id_multigall` int(11) NOT NULL default '0',
`id_galleries` int(11) NOT NULL default '0',
`position` int(11) NOT NULL default '0',
```

Relationships
The relationship between a multigallery and a gallery is m:n.

14.10.14. Data Relative to Gallery Templates

The table related to gallery templates contains information related to the templates associated to the gallery at the moment of their publication.
Information such as: id., user, description, template file name, type, account type, private state (for gallery templates with reserved access). The template can be associated to an area of the portal, for example the gallery or the magazine, to type of user or to a single user. A template can be made visible to the public or it can require administrative permission for access, for example allowing access to a reserved area of the portal.

TABLE SCHEMA

```
`id` int(11) NOT NULL auto_increment,
`userid` int(11) default '1',
`description` varchar(255) NOT NULL default '',
`filename` varchar(255) NOT NULL default '',
`typeid` int(11) NOT NULL default '1',
`accounttype` int(11) NOT NULL default '0',
`privateflag` int(11) NOT NULL default '0',
```

Relationships
The relationship between template and gallery is 1:n.

14.10.15. Data Relative to Template Types

The table related to template types contains information regarding the types of templates which are available for use on the portal. For each template type the table manages types of information such as: id., description and subdirectory containing the templates.
The default template types for the portal are the following:
System: generic portal templates;
Gallery: gallery template;
Gallery Slide: template associated with the gallery for slideshows of galleryitems;
Magazine Home: magazine template;
Magazine Article: article template;
Magazine Slide: template associated with the magazine for slideshows of gallery items for magazine issues.

TABLE SCHEMA

```
`id` int(11) NOT NULL auto_increment,
`description` varchar(255) NOT NULL,
`subdirectory` varchar(255) NOT NULL,
```

Relationships
The relationship between template type and template is 1:n.

14.10.16. Data Relative to the Visitor Gallery: Album

The table of the visitor gallery contains information related to the galleryitems that visitors insert into their albums. The table manages information such as: id., visitor id, id galleryitem.

TABLE SCHEMA

```
`id` int(11) NOT NULL auto_increment,
`visitorid` int(11) NOT NULL default '0',
`galleryitemid` int(11) NOT NULL default '0',
```

Relationships
The relationship between user and galleryitem is 1:n.

14.10.17. Data Relative to the Galleryitem

The table gallery item contains information related to the DOs within the archive and their associated cataloged metadata.

For each galleryitem the table manages types of information such as: id., company, product, title, origin, publication name, publication date, category, associated key words, summary, image alt text, advertising agency, art director, creative, copywriter, photographer, graphic studio, copy right holder, type, title, identity of catalog entry author, associated brand, country of publication, permission, location of high resolution digital original, slogan, flag for cancellation, reserved fields. As described earlier, relevant information is cataloged with an extended version of standard Dublin Core® metadata schema.

Once a galleryitem has been cataloged with its associate metadata and various versions and archived into the ADARTS Digital Repository, it can be uploaded and published into a customer's ADARTS gallery, multigallery or magazine. Besides a complete registration of all of the metadata associated with the galleryitem, it is also assigned a product category, a brand and is uploaded along with all of the image versions required for publication on the portal.

TABLE SCHEMA

```
`id` bigint(20) NOT NULL auto_increment,
`category` int(11) NOT NULL default '-1',
`customerid` int(11) default '-1',
`brandcategory` int(11) default '-1',
`status` int(11) NOT NULL default '-1',
```

Relationships
The relationship between the galleryitem and the magazine is 1:n.
The relationship between the galleryitem and the issue is 1:n.
The relationship between the galleryitem and the gallery of the galleryitem is m:n.
The relationship between the galleryitem and the version of the galleryitem is 1:n.
The relationship between the galleryitem and the metadata of the object is 1:1.
The relationship between the galleryitem and its position in a category is n:1.
The relationship between the galleryitem and the gallery of a visitor is n:1 The relationship between the galleryitem and its category is 1:1.

The relationship between the galleryitem and the customer is n:1.
The relationship between the galleryitem and the brand of a category is n:1.
The relationship between the galleryitem and the status related to a galleryitem is n:1.

14.10.18. Data Relative to the Versions of the Galleryitem

The table of the version of the galleryitem contains information pertaining to the different digital versions of the galleryitem and manages information such as: id., version, id galleryitem and the name of the file containing the version.

TABLE SCHEMA

```
`id` int(11) NOT NULL auto_increment,
`versionid` int(11) NOT NULL default '1',
`galleryitemid` bigint(20) NOT NULL default 'O',
`filename` varchar(255) NOT NULL default '',
```

Relationships
The relationship of a version of a galleryitem and a galleryitem is n:1. The relationship of a version of a galleryitem and a type of version is n:1.

14.10.19. Data Relative to the Type of Version for a Galleryitem

The table of version types for galleryitems contains information regarding the types of digital version available on the portal for managing a given galleryitem and includes information such as: id., version name, description, type of galleryitem, file extension.
The DO type can be managed according to the type DO being dealt with and includes: images, text, audio and video digital media files.

TABLE SCHEMA

```
`id` int(11) NOT NULL auto_increment,
`version` varchar(100) NOT NULL,
`description` varchar(255) NOT NULL,
`galleryitemtypeid` int(11) NOT NULL default 'O',
`filetag` varchar(10) default NULL,
```

Relationships
The relationship between a version type of a galleryitem and a version of a galleryitem is 1:n.
The relationship between a version type of a galleryitem and a type of galleryitem is n:1.

14.10.20. Data Relative to the State of a Galleryitem

The table related to the galleryitem state contains information related to the states a galleryitem can assume and manages types of information such as: id. and description.
The states that a galleryitem can assume during its publications process are the following:
- preview: a prepublication state where the issue can be reviewed;
- published: issue has been approved and is actually online visible to all portal visitors;
- archived: the issue has been moved to the archive where it can be searched and retrieved in whole or in part.

TABLE SCHEMA

```
`id` int(11) NOT NULL auto_increment,
`description` varchar(255) default NULL,
```

Relationships
The relationship between the state of the galleryitem and galleryitem is 1:n.

14.10.21. Data Relative to the Galleryitem of a Category

The table of a galleryitem related to a category contains information which serve to assign galleryitems to a category and include the management of types of information such as: id., category id, galleryitem id. and the position within the category.

TABLE SCHEMA

```
`id` int(11) NOT NULL auto_increment,
`categoryid` int(11) NOT NULL default 'O',
`galleryitemid` bigint(20) NOT NULL default 'O',
`position` int(11) NOT NULL default 'O',
```

Relationships
The relationship between the galleryitem of a category and a gallery is m:n.
The relationship between the galleryitem of a category and a category is m:

14.10.22. Data Relative to the Metadata of the Object

The table relating to the metadata of the DO contains information structured utilizing an extended version of the Dublin Core® standard. Every DO can be cataloged utilizing its related metadata. This metadata can be used to retrieve the DO from the archive. The metadata of a DO can be displayed in full or in part depending on the requirements of the context under consideration, and determined by the rules established by the administrator. These rules can be imposed both at macro and/or micro level, for instance for a site wide implementation (macro level) regarding categories, account types or users (customers) or at the micro level, regarding single digital objects and the selective publication of their related metadata in a predefined context. The administrator can delegate some of the tasks related to the selective publication of metadata to the Editorial Staff.

For each DO the types of information which is registered in the tables includes: id., DO id., title, the six user types which may have collaborated to create the DO, the subject, the description, author/s who contributed to the creation of the original, the publisher, the date of publication, the type, the format based on the type chosen, the unique universal identifier (DOI), the origin, the language of the original, the language in which it was translated, the relationship with other objects, category, copy right holder, summary, alternative text (alt), the DO type.

TABLE SCHEMA

```
`id` int(11) NOT NULL auto_increment,
`metadata_schema` varchar(255) default NULL,
`metadata_prefix` varchar(255) default NULL,
`metadata_value` varchar(255) default NULL,
`object_id` bigint(20) NOT NULL default 'O',
```

Relationships
The relationship between the metadata of the DO and the productcategory is 1:1.
The relationship between the metadata of the DO and the gallery is 1:1.
The relationship between the metadata of the DO and the galleryitem is 1:1.
The relationship between the metadata of the DO and the magazine is 1:1.
The relationship between the metadata of the DO and the issue is 1:1.
The relationship between the metadata of the DO and the article is 1:1.

The relationship between the metadata of the DO and the user is 1:1.

14.10.23. Data Related to the MEFF Metadata Schema

The MEFF metadata schema table contains information regarding the schema of the metadata used by ADARTS for the DO. This table is loaded by Administrator during installation with all schema of metadata used in ADARTS. For each MEFF filter type, the types of information which are managed include: id., name, description.

TABLE SCHEMA

```
`id` int(11) NOT NULL auto_increment,
`name` varchar(50) NOT NULL default '',
`description` varchar(255) NOT NULL default '',
```

Relationships
The relationship between the MEFF metadata schema and the MEFF metadata attribute is 1:n.
Data related to the MEFF metadata attribute
The MEFF metadata attribute table contains information regarding all of the attributes of all the schema used by ADARTS for the DO. This table is loaded by the Administrator during installation along with all of the schema of the metadata used in ADARTS. For each MEFF filter type, the types of information which are managed include: id., name, schema id and comment.

TABLE SCHEMA

```
`id` int(11) NOT NULL auto_increment,
`schemaid` int(11) NOT NULL default 'O',
`metadataid` int(11) NOT NULL default 'O',
```

Relationships
The relationship between the MEFF metadata attribute and the MEFF filter metadata is 1:n.
The relationship between the MEFF metadata attribute and the MEFF schema is n:1.

14.10.24. Data Related to the MEFF Type

The MEFF type table contains information regarding the filter type that the Administrator can set. The Administrator can change the description and the priority of the filter type by which they are applied. For each MEFF filter type, the types of information which are managed include: id., name, description and priority.

TABLE SCHEMA

```
`id` int(11) NOT NULL auto_increment,
`name` varchar(50) NOT NULL default '',
`description` varchar(255) NOT NULL default '',
`priority` int(11) NOT NULL default 'O',
```

Relationships
The relationship between the MEFF type and the MEFF filter is 1:n.

14.10.25. Data Related to the MEFF Channel

The MEFF channel table contains information regarding the channel that the filters can manage. The Administrator can create and manage channels. For each MEFF filter channel the types of information which are managed include: id., name, description and priority.

TABLE SCHEMA

```
`id` int(11) NOT NULL auto_increment,
`name` varchar(50) NOT NULL default '',
`description` varchar(255) NOT NULL default '',
```

Relationships
The relationship between the MEFF channel and the MEFF filter is 1:n.

14.10.26. Data Related to the MEFF Filter

The MEFF filter table contains information regarding the filter the Administrator can set. The Administrator can setup one filter per channel, one filter per category, one filter per gallery, one filter per image and one filter per user. For each MEFF filter, the types of information which are managed include: id., name, description and priority.

TABLE SCHEMA

```
`id` int(11) NOT NULL auto_increment,
`name` varchar(50) NOT NULL default '',
`desription` varchar(255) NOT NULL default '',
`type` int(11) NOT NULL default 'O',
`channel` int(11) NOT NULL default 'O',
`customerid` int(11) NOT NULL default 'O',
`aqparent` int(11) NOT NULL default 'O',
```

Relationships
The relationship between the MEFF filter and the MEFF type is n:1.
The relationship between the MEFF filter and the MEFF channel is n:1.
The relationship between the MEFF filter and the MEFF filter channel is 1:n.
The relationship between the MEFF filter and the MEFF filter category is 1:n.
The relationship between the MEFF filter and the MEFF filter gallery is 1:n.
The relationship between the MEFF filter and the MEFF filter magazine is 1:n.
The relationship between the MEFF filter and the MEFF filter issue is 1:n.
The relationship between the MEFF filter and the MEFF filter article is 1:n.
The relationship between the MEFF filter and the MEFF filter galleryitem is 1:n.
The relationship between the MEFF filter and the MEFF filter user is 1:n.
The relationship between the MEFF filter and the MEFF filter metadata is 1:n.
The relationship between the MEFF filter and the customer is 1:n.

14.10.27. Data Related to the MEFF Filter Channel

The MEFF filter channel table contains information regarding the channel on which the MEFF filter is active. The Administrator can create and manage one filter per channel. For each MEFF filter channel, the types of information which are managed include: id., filter id and channel id.

TABLE SCHEMA

```
`id` int(11) NOT NULL auto_increment,
`filterid` int(11) NOT NULL default 'O',
`channelid` int(11) NOT NULL default 'O',
```

Relationships
The relationship between the MEFF filter channel and the MEFF filter is n:1.

14.10.28. Data Related to the MEFF Filter Category

The MEFF filter category table contains information regarding the category on which the MEFF filter is active. The Administrator can create and manage one filter per category. For each MEFF filter category, the types of information which are managed include: id., filter id, category id and acquisition parent flag.

TABLE SCHEMA

```
`id` int(11) NOT NULL auto_increment,
`filterid` int(11) NOT NULL default 'O',
`categoryid` int(11) NOT NULL default 'O',
```

Relationships
The relationship between the MEFF filter category and the MEFF filter is n:1.

14.10.29. Data Related to the MEFF Filter Gallery

The MEFF filter gallery table contains information regarding the gallery on which the MEFF filter is active. The Administrator can create and manage one filter per gallery. For each MEFF filter gallery, the types of information which are managed include: id., filter id, gallery id and acquisition parent flag.

TABLE SCHEMA

```
`id` int(11) NOT NULL auto_increment,
`filterid` int(11) NOT NULL default 'O',
`galleryid` int(11) NOT NULL default 'O',
PRIMARY KEY ('id')
```

Relationships
The relationship between the MEFF filter gallery and the MEFF filter is n:1.

14.10.30. Data Related to the MEFF Filter Galleryitem

The MEFF filter galleryitem table contains information regarding the galleryitem on which the MEFF filter is active. The Administrator can create and manage one filter per galleryitem. For each MEFF filter galleryitem, the types of information which are managed include: id., filter id, galleryiten id and acquisition parent flag.

TABLE SCHEMA

```
`id` bigint(20) NOT NULL auto_increment,
`filterid` int(11) NOT NULL default 'O',
`galleryitemid`
bigint int(20) NOT NULL default 'O',
```

Relationships
The relationship between the MEFF filter galleryitem and the MEFF filter is n:1.

14.10.31. Data Related to the MEFF Filter User

The MEFF filter user table contains information regarding the channel on which the MEFF filter is active. The Administrator can create and manage one filter per user. For each MEFF filter user (customer), the types of information which are managed include: id., filter id, user id and acquisition parent flag.

TABLE SCHEMA

```
`id` bigint(20) NOT NULL auto_increment,
`filterid` int(11) NOT NULL default 'O',
`customerid` int(11) NOT NULL default 'O',
```

Relationships
The relationship between the MEFF filter user and the MEFF filter is n:1.

14.10.32. Data Related to the MEFF Filter Metadata

The MEFF filter metadata table contains information regarding all of the attributes of a schema that should be shown by a MEFF filter. This table is loaded by Administrator to chose which metadata will be shown to the ADARTS users. For each MEFF filter metadata type, the types of information which are managed include: id., filter id and metadata id.

TABLE SCHEMA

```
`id` int(11) NOT NULL auto_increment,
`filterid` int(11) NOT NULL default 'O',
`metadataid` int(11) NOT NULL default 'O',
```

Relationships
The relationship between the MEFF filter metadata and the MEFF filter is n:1.
The relationship between the MEFF filter metadata and the MEFF metadata attribute is n:1.

14.10.33. Data Related to the MEFF Filter Magazine;

The MEFF filter magazine table contains information regarding the magazine on which the MEFF filter is active. The Administrator can create and manage one filter per magazine. For each MEFF filter magazine, the types of information which are managed include: id., filter id, magazine id.

TABLE SCHEMA

```
`id` int(11) NOT NULL auto_increment,
`filterid` int(11) NOT NULL default 'O',
`magazineid` int(11) NOT NULL default 'O',
```

Relationships
The relationship between the MEFF filter magazine and the MEFF filter is n:1.

14.10.34. Data Related to the MEFF Filter Issue;

The MEFF filter issue table contains information regarding the issue on which the MEFF filter is active. The Administrator can create and manage one filter per issue. For each MEFF filter issue, the types of information which are managed include: id., filter id, issue id.

TABLE SCHEMA

```
`id` int(11) NOT NULL auto_increment,
`filterid` int(11) NOT NULL default 'O',
`issueid` int(11) NOT NULL default 'O',
```

Relationships
The relationship between the MEFF filter gallery and the MEFF filter is n:1.

14.10.35. Data Related to the MEFF Filter Article

The MEFF filter article table contains information regarding the article on which the MEFF filter is active. The Administrator can create and manage one filter per article. For each MEFF filter article, the types of information which are managed include: id., filter id, article id.

TABLE SCHEMA

```
`id` bigint(20) NOT NULL auto_increment,
`filterid` int(11) NOT NULL default 'O',
`articleid` bigint(20) NOT NULL default 'O',
```

Relationships
The relationship between the MEFF filter galleryitem and the MEFF filter is n:1.

14.10.36. Data Relative to the Magazine

The magazine table contains information regarding the magazines cataloged within the Digital Repository (AD-AMS). Every magazine may include one or more issues. For each magazine the types of information which are managed include: id., name, category, and the cover galleryitem.

The essential elements of the magazine (magazine, issue, article and gallery) combine to form a complex digital object. All metadata are stored in digital repository and a pointer to this data is stored in ADARTS local table.

TABLE SCHEMA

```
`id` int(11) NOT NULL auto_increment,
`magazineid` varchar(255) default NULL,
`categoryid` int(11) NOT NULL default 'O',
`coverid` int(11) NOT NULL default 'O',
PRIMARY KEY ('id')
```

Relationships

The relationship between the magazine and the category is n:1. The relationship between the magazine and the gallery-item is 1:1. The relationship between the magazine and the issue is 1:n.

14.10.37. Data Relative to the State of a Magazine

The table related to the state of the magazine contains information related to the states a magazine can assume and manages types of information such as: id. and description. The states that a magazine can assume during its publications process are the following:

preview: a prepublication state where the issue can be reviewed;
published: issue has been approved and is actually online visible to all portal visitors;
archived: the issue has been moved to the postal archive where it can be searched and retrieved in whole or in part.

TABLE SCHEMA

```
`id` int(11) NOT NULL auto_increment,
`description` varchar(255) default NULL,
```

Relationships

The relationship between the state of the magazine and the magazine is 1:n.

14.10.38. Data Relative to the Magazine Issue

The table of the magazine issue contains information relative to the issue of the magazine cataloged in the digital repository (ADAMS). Every issue is composed of between one and 5 articles and the types of information that are managed include: id., magazine id, issue number, issue date, cover galleryitem, state of publication of the issue, 5 image thumbnails, and the category to which the magazine belongs. All metadata is stored in digital repository and a pointer to this data is stored in ADARTS local table.

TABLE SCHEMA

```
`id` int(11) NOT NULL default auto_increment,
`magazineid` int(11) NOT NULL default 'O',
`issueid` varchar(255) NOT NULL default 'O',
`coverid` int(11) NOT NULL default 'O',
`magissuestatusid` int(11) NOT NULL default 'O',
`category` int(11) NOT NULL default 'O',
```

Relationships

The relationship between the issue and the magazine is n:1.
The relationship between the issue and the galleryitem is 1:1.
The relationship between the issue and the state of the issue is n:1.
The relationship between the issue and the category is n:1.

14.10.39. Data Relative to the State of the Issue

The table of the state of the issue contains information regarding the different states that an issue can assume such as: id., and description.

The possible states include:

preview: a prepublication state where the issue can be reviewed;
published: issue has been approved and is actually online visible to all portal visitors;
archived: the issue has been moved to the postal archive where it can be searched and retrieved in whole or in part.

TABLE SCHEMA

```
`id` int(11) NOT NULL auto_increment,
`description` varchar(255) default NULL,
```

Relationships

The relationship between issue state and the issue is 1:n.

14.10.40. Data Relative to the Article

The table of the article contains information related to the articles published in a magazine issue. The articles can be associated to an issue, to a category, to a gallery or to a gallery item. For each, the types of information which can be managed include: id., title, subtitle, summary, publication origin, publication date, publication location, creator, author, language of original publication, language translated, category, copyright holder, keywords, associated editor, article parent, state, text of the article, cover, issue. All metadata are stored in digital repository and a pointer to this data is stored in ADARTS local table.

TABLE SCHEMA

```
`id` int(11) NOT NULL auto_increment,
`articleid` varchar(255) default NULL,
`customerid` int(11) NOT NULL default 'O',
`status` int(11) NOT NULL default 'O',
`magissueid` int(11) default NULL,
```

Relationships

The relationship between an article and a galleryitem is n:1.
The relationship between an article and an article associated to a category is n:1.
The relationship between an article and an article associated to a gallery is n:1.
The relationship between an article and an article associated to a galleryitem is n:1.
The relationship between an article and a customer is n:1.
The relationship between an article and the state of an article is n:1.
The relationship between an article and an issue is n:1.

14.10.41. Data Relative to the State of the Article

The table regarding the state of the articles contains information relative to the state of publication of an article and the type of information which is managed includes: id. and description. All metadata are stored in digital repository and a pointer to this data is stored in ADARTS local table.

The allowed states are:

preview: a prepublication state where the issue can be reviewed;
published: issue has been approved and is actually online visible to all portal visitors;
archived: the issue has been moved to the postal archive where it can be searched and retrieved in whole or in part.

TABLE SCHEMA

```
`id` int(11) NOT NULL auto_increment,
`descrption` varchar(255) default NULL,
```

Relationships

The relationship between the state of the article and the article is 1:n.

14.10.42. Data Relative to an Article Associated to a Category

The table of the article associated to a category includes information related to linking an article to a category and includes information such as: id., article id. and category id.

TABLE SCHEMA

```
`id` int(11) NOT NULL default '0',
`articleid` int(11) NOT NULL default '0',
`categoryid` int(11) NOT NULL default '0',
```

Relationships

The relationship between an article associated to a category and an article is n:m.

The relationship between an article associated to a category and a category is n:m.

14.10.43. Data Relative to Contacts Associated to the User

The table of contacts associated to the user contains the list of contacts for that particular user, organized hierarchically. For each contact, information such as: id, name of contact, user to which a contact is associated, state: active/inactive, new contact, city, province, state, country etc. (see below), including data geospatial such as latitude and longitude, utilized by external applications such as Google Map.

TABLE SCHEMA

```
`id` int(11) NOT NULL auto_increment,
`name` varchar(255) NOT NULL,
`userid` int(11) NOT NULL,
`active` int(11) NOT NULL,
`new` int(11) NOT NULL,
`town` varchar(255) NOT NULL,
`state` varchar(255) NOT NULL,
`country` int(11) default NULL,
`address` varchar(255) NOT NULL,
`zipcode` varchar(20) NOT NULL,
`phone1` varchar(25) NOT NULL,
`phone2` varchar(25) NOT NULL,
`fax` varchar(20) NOT NULL,
`opendate` date NOT NULL,
`closedate` date NOT NULL,
`note` varchar(255) NOT NULL,
`email` varchar(255) NOT NULL,
`site` varchar(255) NOT NULL,
`orderseq` int(11) NOT NULL,
`type` int(11) NOT NULL,
`laf` varchar(20) NOT NULL default '0.000000',
`lon` varchar(20) NOT NULL default '0.000000',
`description` varchar(255) NOT NULL,
`parent` int(11) NOT NULL,
`lff` int(11) NOT NULL,
`rgf` int(11) NOT NULL,
`level` int(11) NOT NULL,
```

Relationships

The relationship between a contact associate with a user and the user is n:1. The relationship between a contact associate with a user and a type of contact is n:1.

14.10.44. Data Relative to the Types of Contacts

The table regarding the type of contact contains a list of the types of contacts which a user can create. The types of information regarding each type of contact include: id., description of contact type in Italian, description of contact type in English.

TABLE SCHEMA

```
`id` int(11) NOT NULL auto_increment,
`lang_if` varchar(255) NOT NULL,
`lang_en` varchar(255) NOT NULL,
RELATIONSHIPS
```

The relationship between the type of contact and the user is 1:m.

14.10.45. Data Relative to a Country

The table related to the country includes information relative to the country and manages types of information such as: id., country code and country name.

TABLE SCHEMA

```
`id` int(11) NOT NULL auto_increment,
`code` char(2) NOT NULL,
`country` text NOT NULL,
```

Relationships

The relationship between country and user is 1:n.
The relationship between country and visitor is 1:n.

15. APPENDIX D—GLOSSARY

Glossary

The following disclosures are hereby incorporated by reference.

15.1. Harvester

A harvester is a client application that issues OAI-PMH requests. A harvester is operated by a service provider as a means of collecting metadata from repositories.

15.2. aDORe: A Modular, Standards-Based Digital Object Repository

The Computer Journal, 2005, 48(5):514-535;

Harvesters working on behalf of service providers collect DIDL documents from the aDORe environment, and build services with the contained Digital Objects. As a result, identifiers contained in the harvested DIDL documents become available in applications such as search engines.

15.3. OAI

The OAI Protocol for Metadata Harvesting [14] is a standard for sharing metadata across repositories. Client-side applications with flexible, configurable interfaces depend on the repository to provide very standardized views of the assets. Each object contains metadata that is specific to it. Metadata about relationships among the assets is assumed to be located in external databases, keyed to the repository by the persistent identifier of the object. Metadata about the assets is extracted for the objects and combined with data from external databases to feed the appropriate data to each application. This makes it possible for one digital asset management system to support multiple applications with differing demands.

15.4. Harvesting Interface

Pathways: Augmenting interoperability across scholarly repositories v1 50 ct 2006 International Journal on Digital Libraries The OAI-PMH is a well established harvesting technology within the digital library community and allows aggregation of metadata from compliant repositories using a date stamp based harvesting strategy. A harvest interface allows collecting or harvesting of surrogates of digital objects. In addition to the facility to harvest all the surrogates exposed by a repository, we believe it is necessary to provide a facility allowing some forms of selective harvesting. The simplest, and perhaps most useful, form of selective harvesting is to allow downstream applications to harvest surrogates only for those digital objects that were created or modified after a given date. This echoes the Open Archives Initiative Protocol for Metadata Harvesting (OAIPMH) [34] with the same motivation: downstream applications may need an up-to-date copy of all the surrogates from a repository in order to provide some service, and incrementally harvesting surrogates of newly added or modified digital objects is an efficient way to do this. A harvest interface could be implemented using various technologies such as the OAI-PMH, RSS or Atom, or with a subset of more complex technologies such as SRU/SRW. The OAI-PMH is a well established harvesting technology within the digital library community and allows aggregation of metadata from compliant repositories using a date stamp based harvesting strategy. Although the OAI-PMH was first conceived for metadata harvesting, it can be used to transfer any metadata or data format, including complex-object formats, expressed in XML according to an XML Schema [17]. The OAI-PMH is thus capable of providing the harvest functionality, and the ability to leverage existing OAI-PMH implementations is a significant benefit. To support the harvest interface, the underlying OAIPMH interface may follow these conventions:

Each OAI-PMH item identifier may match the preferred identifier of the Pathways Core digital object. This avoids the need for clients to record relationships between OAIPMH identifiers and digital object identifiers which can become complex in various aggregation scenarios.

The OAI-PMH date stamps may be the date time of creation or modification of the digital objects as discussed in [17].

It may provide a metadata format for surrogates. It is worth noting one possible issue. The OAI-PMH specification is bound to the HTTP protocol and the XML syntax for transporting and serializing the harvested records. While this approach proves to be satisfactory in the current technological environment, it may prove to be inadequate as technologies evolve. If this work were to be tightly bound with the OAI-PMH then an abstract model would need to be created. However, if OAI-PMH is used simply as one possible technology to implement harvest functionality then it could later be replaced.

15.5. Repository

A repository is a network accessible server that can process the OAI-PMH requests in the manner described in this document. A repository is managed by a data provider to expose metadata to harvesters. To allow various repository configurations, the OAI-PMH distinguishes between three distinct entities related to the metadata made accessible by the OAI-PMH.

15.6. Resource

A resource is the object or "stuff" that metadata is "about". The nature of a resource, whether it is physical or digital, or whether it is stored in the repository or is a constituent of another database, is outside the scope of the OAI-PMH.

15.7. Item

An item is a constituent of a repository from which metadata about a resource can be disseminated. That metadata may be disseminated on-the-fly from the associated resource, cross-walked from some canonical form, actually stored in the repository, etc.

15.8. Record

A record is metadata in a specific metadata format. A record is returned as an XML-encoded byte stream in response to a protocol request to disseminate a specific metadata format from a constituent item.

15.9. Digital Object

A Framework for Distributed Digital Object Services
Robert Kahn and Robert Wilensky, May 13, 1995.
Digital Object (DO):

We use the term digital object here in a technical sense, to be defined precisely below. Files, databases and so forth that one may ordinarily think of as objects with a digital existence are not digital objects in the sense used here, at least not until they are made into an appropriate data structure.

System works as follows: An originator, i.e., a user with digital material to be made available in the System, makes the material into a digital object. A digital object is a data structure whose principal components are digital material, or data, plus a unique identifier for this material, called a handle (and, perhaps, other material). To get a handle, the user requests one from an authorized handle generator. A user may then deposit the digital object in one or more repositories, from which it may be made available to others (subject, of course, to the particular item's terms and conditions, etc.). Upon depositing a digital object in a repository, its handle and the repository name or IP address is registered with a globally available system of handle servers.

Users may subsequently present a handle to a handle server to learn the network names or addresses of repositories in which the corresponding digital object is stored.

In the manner of the seminal Kahn and Wilensky paper[31] we use the notion of a digital object to describe compositions of digital information. This is purposely abstract, and is not tied to any implementation or data model. The principal aspects of a digital object are digital data and key-metadata. Digital data can be any combination and quantity of individual data streams, or physical streams of bits, and can includes nested digital objects. Key-metadata, at a minimum, includes an identifier that is a key for service requests on the digital object at a service point.

15.10. Composite Digital Objects (CDO Complex Digital Objects)

one can create subtypes of digital objects by introducing new fields of metadata; these may be arranged hierarchically. For example, one might create a subtype of digital object called computer-science-technical-report which has metadata for author, institution, series, and so forth. We shall informally refer to digital objects whose data is a set, one of whose elements is of type digital-object, as composite digital objects. A digital object that is not composite is said to be elemental. (Note that this definition explicitly excludes the application of the adjective composite to a digital object whose data is another digital object, i.e., whose data is of type digital-object, as distinguished from a singleton set of this type. Nothing precludes the existence of such objects, however.)

The terms and conditions of a composite object may implicitly or explicitly be unioned with those of its constituent objects to arrive at the terms and conditions for those constituent objects. Terms and conditions may be explicitly imposed only on the composite object, in which case they would apply to each constituent object; or each constituent may have its own separate terms and conditions in addition. (Of course, creating composite digital objects may be subject to copyright and any other legal restrictions pertaining to its constituent objects.)

Complex Digital Objects

Each of these services share with Pathways the notion of simple web-based interfaces for creating and accessing content over the web. However, a key distinction of Pathways is its focus on complex digital objects as units of content as compared to single-content byte streams (e.g., a file). Another distinction of the Pathways work is that it is primarily intended to be an interoperability model for managed repositories, as distinguished from more nebulous storage services on the open web.

This maps to the Kahn/Wilensky notion that digital objects can contain nested digital objects. An example of the utility of this recursive relationship is modeling of an overlay journal.
On Complex Digital Objects An Interoperable Fabric for Scholarly Value Chains An infrastructure that would leverage the value of the digital objects hosted by those repositories by making them accessible for use and re-use in many contexts. Digital objects are the building blocks of a global scholarly communication federation in which each individual digital object can be the starting point for value chains—a global workflow or value chain across repositories, with digital objects from repositories being the subjects of the workflow.
More on Complex Digital Objects Building a Distributed, Standards-based Repository Federation The China Digital Museum Project, Robert Tansley The principal aim of the China Digital Museum Project is to enable these universities to provide infrastructure based on DSpace1 to store, manage, preserve and disseminate the digitized versions of the artifacts. In the final phase of the project, there will be approximately 100 university museums with digital artifacts stored in federated DSpace installations.

Finally, a note on terminology used in this article: numerous potential terms exist to describe the various kinds of digital content in the system. Where the term Object is used capitalized, it refers to a complex digital object as in the Kahn/Wilensky framework [4], including some metadata and one or more bit streams. Bit stream is used to describe an individual file or DataStream, and to be consistent with the DSpace data model 15.11. Federated Repositories How should we rethink citation in a natively digital scholarly communication system? We think of citation as a particular type of re-use of the cited digital object in the context of the citing digital object. Imagine being able to drag a machine readable representation of a digital object hosted by one repository, and to drop it into the citing object that, once finalized, is ingested into another repository. Now imagine being able to do the same for the citing object, etc. Assuming that the machine-readable representations being dragged and dropped contain the appropriate properties, the result would be a natively machine-traversable citation graph that might span repositories worldwide.

There are numerous other examples in scholarly communication of workflows across distributed repositories. These include the mirroring of digital objects for preservation purposes, the creation of repositories that host virtual collections of objects that are physically hosted in other repositories, the progression of units of scholarly communication through the registration-certification-awareness-archiving chain [1], and the re-use of datasets hosted by various repositories for the creation and publication of a new dataset. In order to enable such workflows, participating repositories will need some common interface to the world.

Determining the nature of this interface is the subject of our Pathways explorations, and this article reports the insights that we have gained thus far.
15.12. The Complex Nature of the Assets MPEG-21

The complex nature of the assets led to an investigation regarding existing approaches to wrap constituent data streams into a single wrapper structure that could function as an Open Archival Information System [15] Archival Information Package (OAIS AIP).

This quickly led to an interest in representing assets by means of XML wrappers, which itself resulted in the selection of the MPEG-21 Digital Item Declaration (MPEG-21 DID) [17,43] as the sole way to represent assets as Digital Objects in aDORe.
15.13. Surrogate We use the term surrogate to indicate concrete serializations of digital objects according to our data model. The purpose of this serialization is to allow exchange of information about digital objects from one service to another and thus propagate them through value chains. We use RDF/XML for constructing our surrogates, because it is useful for representing arbitrary sub-graphs.

15.14. Quantistic Pathways: Augmenting interoperability across scholarly repositories arXiv:cs.DL/0610031 v1 50 ct 2006 International Journal on Digital Libraries To understand this expanded view of citation, imagine being able to drag a machine readable representation of a digital object hosted by some repository, and to drop it into the citing object that, once finalized, is submitted into another repository. Now imagine being able to do the same for the citing object ad infinitum.
15.15. Open URL Pathways: Augmenting interoperability across scholarly repositories Beyond meeting our basic requirements, the OpenURL Framework has the following attractive properties: it allows information about the context in which the obtain request took place to be conveyed. This information may allow delivery of context-sensitive service requests. Of particular interest is information about the agent requesting the obtain service (the Requester). This information could convey identity, and this would allow responding differently to the same service request depending on whether the requesting agent is a human or machine. Similarly, different humans could receive different disseminations based on recorded preferences or access rights. The OpenURL Framework is purposely generic and extensible, and would also support to convey the characteristics of a user's terminal, the user's network context, and/or the user's location via the Requester entity. Though, this type of context-related tuning may not be important when requesting surrogates of digital objects, it may prove to be essential when requesting rich services pertaining to data streams.
15.16. DOI: Unique Universal Digital Object Identifier The DOI System is for identifying content objects in the digital environment. DOI names are assigned to any entity for use on digital networks. They are used to provide current information, including where they (or information about them) can be found on the Internet. Information about a digital object may change over time, including where to find it, but its DOI name will not change. The DOI System provides a framework for persistent identification, managing intellectual content, managing metadata, linking customers with content suppliers, facilitating electronic commerce, and enabling automated management of media. DOI names can be used for any form of management of any data, whether commercial or non-commercial.
15.17. XSLT Transformations Extensible Stylesheet Language Transformations (XSLT) is an XML-based language used for the transformation of XML documents. XSLT is designed to transform XML documents into other XML or "human-readable" documents. The original document is not changed; rather, a new document is created based on the content of an existing one. The new document may be serialized (output) by the processor in standard XML syntax or in another format, such as HTML or plain text. XSLT is most often used to convert data between different XML schemas or to convert XML data into HTML or XHTML documents for web pages, creating a Dynamic web page, or into an intermediate XML format that can be converted to PDF documents. XSLT can also be considered as a template processor.

15.18. Topic Maps

Garshol, "Metadata? Thesauri? Taxonomies? Topic Maps!"

15.19 Ontology

Steve Pepper

The XML Papers: Lessons on Applying Topic Maps

The term was taken over by the Artificial Intelligence community and one classic text book ([Russell 1995]) gives several definitions, including: "A particular theory of the nature of being or existence." John Sowa, in his highly recommended book, Knowledge Representation Ontology ([Sowa 2000]), provides the following, more precise definitions:

The subject of ontology is the study of the categories of things that exist or may exist in some domain. The product of such a study, called an ontology, is a catalog of the types of things that are assumed to exist in a domain of interest D from the perspective of a person who uses a language L for the purpose of talking about D. (p. 492)

Ontology: A classification of the types and subtypes of concepts and relations necessary to describe everything in the application domain. (p. 454)

15.20 The aDORe Architecture

This disclosure is hereby incorporated by reference. (pg. 3/28, 3/29) aDORe Project site:

What is claimed is:

1. A method for generating and managing polyhierarchical metadata descriptions of artifacts using multiple standard metadata schemas, the method comprising:
    registering each of a plurality of standard metadata schemas, the registering comprising assigning a unique Universal Resource Identifier (URI) to the standard metadata schema, registering the standard metadata schema in a Resource Description Framework (RDF) triple store, registering the standard metadata schema in a system topic map, and registering the standard metadata schema in a repository index;
    generating a polyhierarchical metadata description of an artifact, using at least two of the standard metadata schemas, wherein the polyhierarchical metadata description of the artifact comprises at least two Points of View (POV) of the artifact, each of the at least two POVs including a metadata description of the artifact using a different standard metadata schema among the plurality of standard metadata schemas, and the POV including the URI of the standard metadata schema;
    assigning a URI to each of the at least two POVs;
    encapsulating, as a digital object (DO), a datastream, the at least two POVs, the URI of each of the two POVs, and the URI of the standard metadata scheme used for the POV's metadata description, and including in the DO a URI, the URI being unique to the DO, wherein the datastream is a digital surrogate of the artifact;
    cataloging the DO and registering the DO;
    ingesting a description of the cataloging and the registering of the DO into a digital preservation repository for long term preservation;
    harvesting and ingesting a surrogate copy of the DO into a digital repository for digital asset management and aggregation;
    upon ingesting the surrogate copy of the DO, registering the DO in the repository resource index, wherein registering the DO in the repository resource index includes registering each metadata description in the DO, the URI of metadata description, and the URI of the DO in a RDF triple store as RDF, and on a topic map;
    aggregating the surrogate copy of the DO with another resource, and encapsulating a result of the aggregating as a complex digital object (CDO);
    registering the CDO in the digital repository for digital asset management and aggregation;
    filtering metadata and datastreams of the CDO; and
    disseminating a result of filtering metadata and datastreams of the CDO to a distribution channel.

2. The method of claim 1, wherein the DO is formatted as an eXtended MarkupLanguage (XML) wrapper.

3. The method of claim 2 wherein the XML wrapper is according to an XML wrapper type, the XML wrapper type being an MPEG-21 format document.

4. The method of claim 2 wherein the XML wrapper is according to an XML wrapper type, the XML wrapper type being a METS document.

5. The method of claim 2 wherein the XML wrapper is according to an XML wrapper type, the XML wrapper type being an OAI-ORE named graph document.

6. The method of claim 1, wherein at least one of the at least two POV's respective metadata descriptions of the artifact comprises metadata of a class among descriptive metadata class, rights metadata class, preservation metadata class, annotation metadata class, collections metadata class, technical metadata class, and citation metadata class.

7. The method of claim 1, wherein at least one other of the at least two POV's respective metadata descriptions of the artifact comprises metadata of another class among the descriptive metadata class, rights metadata class, preservation metadata class, annotation metadata class, collections metadata class, technical metadata class, and citation metadata class.

8. The method of claim 1, wherein at least one of the at least two POV's respective metadata descriptions of the artifact is according to a standard metadata scheme in a set of standard metadata scheme, the set consisting of Dublin Core (DC), Metadata Object Description Schema (MODS), United Nations Standard Products and Services Code® (UNSPSC®), Preservation Metadata Implementation Strategies (PREMIS), Digital Library for Earth System Education (DLESE) annotation framework, and IDECS standard (Infrastructure de Dades Espacials de Cataluny.

9. The method of claim 8, wherein at least one other of the at least two POV's respective metadata descriptions of the artifact is according to another standard metadata scheme in the set of standard metadata scheme.

10. The method of claim 1, wherein at least one of the POVs includes a first metadata description of the artifact and a second metadata description of the artifact, the first metadata description of the artifact being according to a first standard metadata scheme among the plurality of standard metadata scheme, and the second metadata description of the artifact being according to a second standard metadata scheme among the plurality of standard metadata scheme, and the at least one POV including the URI of the first standard metadata scheme and the URI of the second standard metadata scheme.

11. The method of claim 1, wherein at least one of the at least two POVs of the artifact comprises a structure, wherein the structure includes a POV type model.

12. The method of claim 1, further comprising cataloging the CDO and registering of the CDO in the digital repository for digital asset management and aggregation.

\* \* \* \* \*